(12) United States Patent
Gatto

(10) Patent No.: US 6,681,211 B1
(45) Date of Patent: *Jan. 20, 2004

(54) SECURITY ANALYST ESTIMATES PERFORMANCE VIEWING SYSTEM AND METHOD

(75) Inventor: Joseph G. Gatto, San Francisco, CA (US)

(73) Assignee: Starmine Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/577,317

(22) Filed: May 24, 2000

Related U.S. Application Data

(60) Division of application No. 09/524,253, filed on Mar. 13, 2000, and a continuation-in-part of application No. 09/296,620, filed on Apr. 23, 1999.
(60) Provisional application No. 60/082,868, filed on Apr. 24, 1998.

(51) Int. Cl.[7] .............................................. G06F 17/60
(52) U.S. Cl. .............................. 705/36; 705/1; 705/35; 705/37
(58) Field of Search ............................... 705/1, 35, 36, 705/37

(56) References Cited

U.S. PATENT DOCUMENTS

| | | |
|---|---|---|
| 3,270,190 A | 8/1966 | Lambert |
| 5,006,998 A | 4/1991 | Yasunobu et al. |
| 5,132,899 A | 7/1992 | Fox |
| 5,365,425 A | 11/1994 | Torma et al. |
| 5,500,795 A | 3/1996 | Powers et al. |
| 5,502,637 A | 3/1996 | Beaulieu et al. |
| 5,608,620 A | 3/1997 | Lundgren |
| 5,613,072 A | 3/1997 | Hammond et al. |

(List continued on next page.)

FOREIGN PATENT DOCUMENTS

| | | |
|---|---|---|
| JP | 2000090150 A | 9/1998 |
| WO | WO 01/80124 A2 | 10/2001 |

OTHER PUBLICATIONS https://www.invesars.com/home.asp (printed Mar. 26, 2001).
I/B/E/S Internation Inc., Active Express.
The Journal of Finance, vol. XXXIII, Mar. 1978, No. 1.
The Predictive Value of Interim Reports for Improving Forecasts of Future Quarterly Earnings, Apr. 1978.

(List continued on next page.)

Primary Examiner—Eric W. Stamber
Assistant Examiner—Raquel Alvarez
(74) Attorney, Agent, or Firm—Mintz Levin Cohn Ferris Glovsky and Popeo PC

(57) ABSTRACT

A system and method for measuring, analyzing, and tracking the past performance of security analysts' earnings estimates and recommendations. The present invention provides a database of historical data relating to security analyst earnings estimate predictions wherein a historical model enables users to view the historical data as a time series of earnings estimates for each analyst selected, for a selected period of time, for a predetermined earnings event. Users may define a model to automatically create enhanced composite estimates wherein an improved prediction of the quantity being estimated, such as company earnings, revenue or cash flow is obtained. Users may view performance screens and historical performance data for a particular contributor or various contributors for a given security. Other views may be available.

38 Claims, 33 Drawing Sheets

U.S. PATENT DOCUMENTS

| | | | |
|---|---|---|---|
| 5,675,746 A | 10/1997 | Marshall | 395/235 |
| 5,749,077 A | 5/1998 | Campbell | |
| 5,761,442 A | 6/1998 | Barr et al. | |
| 5,774,880 A | 6/1998 | Ginsberg | |
| 5,774,881 A | 6/1998 | Friend et al. | |
| 5,802,518 A | 9/1998 | Karaev et al. | |
| 5,812,988 A | 9/1998 | Sandretto | |
| 5,819,271 A | 10/1998 | Mahoney et al. | |
| 5,852,811 A | 12/1998 | Atkins | |
| 5,864,871 A | 1/1999 | Kitain et al. | |
| 5,893,079 A | 4/1999 | Cwenar | |
| 5,909,669 A | 6/1999 | Havens | |
| 5,911,136 A | 6/1999 | Atkins | |
| 5,918,217 A | 6/1999 | Maggioncalda et al. | |
| 5,946,666 A | 8/1999 | Nevo et al. | |
| 5,948,054 A | 9/1999 | Nielsen | |
| 5,950,176 A | 9/1999 | Keiser et al. | |
| 5,956,691 A * | 9/1999 | Powers | 705/4 |
| 5,963,922 A | 10/1999 | Helmering | |
| 6,012,042 A | 1/2000 | Black et al. | |
| 6,012,043 A | 1/2000 | Albright et al. | |
| 6,021,397 A | 2/2000 | Jones et al. | |
| 6,064,986 A | 5/2000 | Edelman | |
| 6,119,103 A * | 9/2000 | Basch et al. | 705/35 |
| 6,125,355 A | 9/2000 | Bekaert et al. | |
| 6,154,732 A | 11/2000 | Tarbox | |
| 6,236,980 B1 | 5/2001 | Reese | |
| 6,253,192 B1 * | 6/2001 | Corlett et al. | 705/36 |
| 6,317,726 B1 * | 11/2001 | O'Shaughnessy | 705/36 |
| 6,370,516 B1 | 4/2002 | Reese | 705/36 |
| 6,510,419 B1 | 1/2003 | Gatto | 705/36 |
| 2002/0019791 A1 | 2/2002 | Goss et al. | 705/36 |
| 2002/0022988 A1 | 2/2002 | Columbus et al. | 705/11 |
| 2002/0082966 A1 | 6/2002 | O'Brien et al. | 705/36 |

OTHER PUBLICATIONS

Financial Analysts Journal/Jan.–Feb. 1996 "Analyst Forecasting Errors and their Implications for Security Analysis: An Alternative Perspective".

The Journal of Portfolio Management "Analysts can Forecast Accuragely" Brown et al.

Journal of Forecasting, vol. 2 325–330 1983) "Perspective on Forecasting Research in Accounting and Finance".

Journal of Accounting Research, vol. 24 Supplement 1986 "Evidence on the Incremental Information Content of Additional Firm Dsisclosures made Concurrently with Earnings" Hoskin et al.

Financial Analysts Journal, Mar./Apr. 1997 "Earnings Suerprise Research: Synthesis and Perspectives" Brown.

The Journal of Finance, vol. LIV, No. 5 Oct. 1999, "What os the Intrinsic value of the Dow", Lee et al.

The Journal of Finance, vol. XLIX, No. 3, Jul. 1993 Market Integration and Prive Execution for NYSE–Listed Securities.

The Journal of Finance, vol. XLVIII, No. 2 Jun. 1993 "Summing Up".

The Journal of Finance, vol. XLVIII, No. 2 Jun. 1993 "Yes, Discounts on Closed–End Funds are a Sentiment Index".

The Review of Financial Studies 1993, vol. 6, No. 2 pp. 345–374 "Spreads, Depths and the Impact of Earnings Information: An Intraday Analysis".

International Journal of Forecasting, vol. 11, No. 3 (1995) pp. 361–500.

Financial Analysts Journal, Jan./Feb. 1996.

Accounting Organizations and Society, vol. 21, No. 7/8/ Oct./Nov. 1996.

Financial Analysts Journal Mar./Apr. 1997.

Journal of Accounting & Economics vol. 9 1987 (MSG.V. 9 No. 3).

Journal of Accounting & Economics vol. 9, No. 2 Jul. 1987.

The Accounting Review vol. 67, No. 4 Oct. 1992.

Financial Analysts Journal Nov./Dec. 1997.

The Journal of Canadian Academic Accounting Association, vol. 14, No. 1, Spring 1997.

The Journal of Canadian Academic Accounting Association, vol. 16, No. 1, Spring 1999.

Journal of Accounting Research vol. 23, No. 1 Spring 1985.

International Journal of Forecasting, vol. 9, No. 3 (1993) pp. 295–436.

"A Journal of Accounting, Finance and Business Studies" vol. 30, No. 1 Mar. 1994.

Journal of Accounting Auditing & Finance vol. 9, No. 4 (new series) Fall 1994.

The Journal of the Canadian Academic Accounting Association vol. 11, No. 1–1 Summer 1994.

The CPA Journal May 1995.

International Journal of Forecasting, vol. 12, No. 1 (1996) pp. 1–192.

Journal of Accounting Research vol. 25, No. 1 Spring 1987.

International Journal of Forecasting vol. 7, No. 3 (1991) pp. 257–408.

Journal of Accounting Research Col. 29, No. 2 1991.

The Accounting Review Quarterly Journal of the American Accounting Association vol. LX Apr. 1985 No. 2.

The Journal of Portfolio Management vol. 23, No. 4 Summer 1997.

Journal of Accounting Research vol. 38, No. 1 Spring 2000.

The Accounting Review, vol. 68, No. 3, Jul. 1993.

Journal of Accounting Research vol. 17, No. 2 Autumn 1979.

Journal of Business Finance & Accounting, vol. 19, No. 4 Jun. 1992.

The Journal of the Canadian Academic Accounting Association, vol. 14, No. 2 Summer 1997.

The Journal of Finance, vol. 46, No. 1 Mar. 1991.

Accounting Horizons, vol. 11, No. 4 Dec. 1997.

Accounting Horizons, vol. 13, No. 4 Dec. 1999.

Journal of Accounting and Economics vol. 25, No. 3 Jun. 1998.

Contemporary Accounting Research vol. 8, No. 1 Fall 1991.

CA Magazine Apr. 1996.

The Journal of Finance vol. 46, No. 2 Jun. 1991.

The Journal of Finance, vol. 55, No. 5 Oct. 2000.

Financial Analysts Journal, vol. 55, No. 5 Sep./Oct. 1999.

Journal of Accounting & Economics, vol. 15, No. 2/3 Jun./Sep. 1992.

Accounting Horizons, vol. 10, No. 3 Sep. 1996.

Accounting Horizons, vol. 10, No. 4, Dec. 1996.

"Profiling From Predicting Earnings Surprise", Brown et al. 1998.

"Enhancing Earnings Predictability Using Individual Analyst Forecasts", Herzberg et al. Summer 1999.

"Do Stock Prices Fully reflect the Implications of Current Earnings for Future Earnings for AR1 Firms" Brown et al. 2000.

"The Information Content of Analyst Stock Recommendations" Kirsche et al. Aug. 8, 2000.

http://www.findarticles.com/m4PRN/1999_Oct_14/ 56284107/p1/article.jhtml (printed Feb. 5, 2001).

http://my.zacks.com/?ALERT+www.zacks.com (printed Feb. 2, 2001).
http://www.cianet.com (printed Feb. 5, 2001).
http://www.factset.com (printed Feb. 5, 2001).
http://www.iexchange.com (printed Feb. 5, 2001).
http://www.validea.com/home/home.asp (printed Feb. 5, 2001).
http://www.bulldogresearch.com/default.asp (printed Feb. 5, 2001).
"Predicting Individual Analyst Earnings Forecast Accuracy", Brown et al. Sep. 29, 1999.
The Journal of Finance vol. XLIX, No. 1 Mar. 1994.
International Search Report.
Brown et al. Composite Analyst Earnings Forecasts: The Next Generation. Journal of Business Forecasting, Summer 1990. vol. 9 Issue 2.
Ho et al. Market Reactions to Messages From Brokerage Ratings Systems. Financial Analysts Journal. Feb. 1998 vol. 54, Issue 1.
Lamonica et al. The Best and Worst: Bloomerberg's Second Annual Analysts Survey, and the Top Analysts Top Picks. Financial World Jan. 30, 1996. vol. 165. Issue 2.
http://interactive.wsj.com/public/current/summaries/best00.htm (Jan. 5, 2001).
http://interactive.wsj.com/public/current/articles/SB963945297966625438.htm (Jan. 5, 2001).
http://interactive.wsj.com/public/current/articles/SB963945742428637569.htm (Jan. 5, 2001).
http://interactive.wsj.com/public/current/articles/SB963945478117361937.htm (Jan. 5, 2001).
http://interactive.wsj.com/public/current/articles/SB963944657420928118.htm (Jan. 5, 2001).
http://interactive.wsj.com/public/current/articles/SB963945615772798263.htm (Jan. 5, 2001).

Herzberg et al. Enhancing Earnings Predictability Using Individual Analyst Forecasts. The Journal of Investing. Summer 1999.

Charles Schwab Introduces Analytics Fund; Utilizes Quantitative Techniques To Seek Above–Market Returns, Business Editors.

Mozes et al. Modeling Earnings Expectations Based on Clusters of Analyst Forecasts The Journal of Investing Spring 1999.

* cited by examiner

Contributor Search

| Analyst Name: | Dube |
|---|---|

| Analyst Name | Analyst ID |
|---|---|
| Dube B | 18084 |
| Dube S | 7919 |
| Dubeau C | 18847 |

220

[Ok] [Cancel]

FIG. 3

SECURITY ANALYST ESTIMATES PERFORMANCE VIEWING SYSTEM AND METHOD

CROSS-REFERENCE TO RELATED APPLICATION

This application is a divisional of U.S. application Ser. No. 09/524,253, filed Mar. 13, 2000, and is related to, and a continuation-in-part of, U.S. application Ser. No. 09/296,620, filed Apr. 23, 1999, which claims priority from provisional application Ser. No. 60/082,868, filed Apr. 24, 1998, which are incorporated by reference.

FIELD OF THE INVENTION

The invention relates to a system and method for managing and viewing historical data including security analysts' predictions (e.g., earnings estimates and buy/sell recommendations) and actual reported data; for measuring, analyzing, and tracking the historical performance of security analysts' predictions; and creating, managing, backtesting, and using models that use such historical and performance data, attributes and other information to automatically produce better predictors of future events (e.g., corporate earnings or stock-price performance).

BACKGROUND OF THE INVENTION

Many individuals and institutions analyze financial data, financial instruments, such as equity and fixed-income securities and other things, at least in part to predict future economic events. Such individuals may include, for example, security analysts. The role of the security analyst is generally well-known and includes, among other things, issuing earnings estimates for securities, other financial estimates concerning future economic events (e.g., revenue), recommendations on whether investors should buy, sell, or hold financial instruments, such as equity securities, and other predictions. Security analyst estimates may include, but are not limited to, quarterly and annual earnings estimates for companies whether or not they are traded on a public securities exchange.

Security analysts generally predict a stock's quarterly or annual earnings well in advance of the time the actual earnings are announced, and from time to time, update their predictions. These predictions are recorded, for example, in the Institutional Brokers Estimates Service ("IBES") database and other commercial databases. The IBES Detail History is complete in its record of estimates and actuals, but limited in its summaries and reports. While IBES provides a summary history database with sunimary-level information per security per fiscal period, it does not provide daily summaries.

Many investors use the simple average of analysts' estimates, often referred to as the "consensus," to predict a stock's earnings, and to make investment decisions based on the consensus earnings estimate. However, this consensus is a naïve average created by placing equal weight on each analyst's estimate, regardless of whether the estimate was created recently or months ago, regardless of whether the analyst is a seasoned veteran with a great track record or a rookie, regardless of any historical bias, and regardless of other factors that may be relevant.

Usually more than one analyst follows a given security. Analysts often disagree on earnings estimates and recommendations and, as a result, analysts' earnings estimates and recommendations often vary.

A number of financial information services providers ("FISPs") gather and- report analysts' earnings estimates and recommendations. At least some FISPs report the high, low, and mean (or consensus) earnings estimates, as well as mean recommendations for equity securities (as translated to a FISP's particular scale, for example, one to five). In addition, FISPs may also provide information on what the earnings estimates and recommendations were seven and thirty days prior to the most current consensus, as well as the differences between the consensus for a single equity security and that of the relevant industry. Moreover, for some clients, FISPs provide earnings estimates and recommendations on an analyst-by-analyst basis. An advantage of the availability of analyst-level estimates and recommendations is that a client may view the components of the mean estimate or recommendation by analyst. Various drawbacks exist, however, with these approaches and other known techniques.

For example, prior approaches include a software program that displays all current estimates. For a particular fiscal period, for a particular security, the software provides the ability to simply "include" or "exclude" each estimate or recommendation from the mean. This is problematic for several reasons. First, commercially available databases of estimates and recommendations contain "current" data on thousands of stocks. Each stock may have estimates from 1 to 70 or more analysts. In addition, each analyst may provide estimates for one or more periods. The data may be updated throughout the day. Manually dealing with this volume of information may be time consuming and tedious.

A second drawback is that with current techniques, if an individual were inclined to determine which estimates (or recommendations) should get more weight, and which estimates should get less or no weight, the large volume of analysts makes it extremely difficult to determine which analysts provide more useful information than others. Current techniques lack sufficient ability to intelligently measure historical analyst performance and beneficially use such measurements.

A third drawback is that while it is possible to imagine various weighting systems or algorithms, it is difficult to effectively implement or test them. Current systems do not provide the ability to effectively devise new estimate (or recommendation) weighting algorithms; nor do they provide the ability to easily test a historical performance.

A fourth drawback with current techniques is that there are limited tools for easily and effectively analyzing historical estimates and recommendations. While the data is available, often times unique code is written to conduct a specific analysis. Changing the analysis often requires rewriting code.

These and other drawbacks exist with existing systems.

SUMMARY OF THE INVENTION

An object of the invention is to overcome these and other drawbacks with existing systems and methods.

Another object of the invention is to provide an improved computer implemented system and methods for use with a database of historical data relating to security analyst earnings estimate or other predictions.

Another object of the invention is to include within such a system and methods, a history view module to enable users to view the historical data for a given security either: i) as a time series of earnings estimates and revisions for each analyst selected, for a selected period of time, for a selected earnings event; or ii) in a "snapshot" view with calculated metrics as of a given date.

Another object of the invention is to provide a computer implemented system and methods to enable a user to custom define a model that can be applied to current estimates from a plurality of selected sources to generate an enhanced composite estimate, and to enable a user to manage, backtest and view results of such models.

Another object of the invention is to provide a computer implemented system and methods that enable a user to view, measure and analyze the past performance for a particular contributor (e.g., a broker, an analyst or a broker/analyst pair), or for a given security the various contributors that have qualifying estimates. Other views may also be available.

These and other objects of the invention are accomplished according to various embodiments and aspects of the invention, as described below. The various features and functions of the invention may be used alone or in combination to form a system and method for managing, viewing and analyzing historical security analyst data, and generating enhanced composite estimates to better predict future earnings, stock-price performance, or other events.

According to one embodiment, the invention uses a modular design, including one or more of the following modules: Contributors, Stocks, Models, History, and Performance. Other modules may also be used. Under the Contributors module, the user may select an analyst, broker, security, and other categories and view relationships therebetween. Under the Stocks module, the user may define stock filters and group stocks into stock sets. The stock sets may be used, for example, to facilitate testing and use of user-defined models, and for other purposes. Under the Models module, the user may create, manage and edit models, backtest the models against the historical database, view results of the backtest and perform other functions. Under the History module, historical estimate and actual data may be viewed in chart or in grid format. For example, a chart view may display estimates and actual data graphically and allow for visually backtesting models and analyst performance. The snapshot view displays detailed data in tabular format for a selected "As Of Date." Other historical data and formats may also be used. Under the Performance module, the user may create and display metrics for analyzing analyst performance, analyst and/or broker accuracy reports, aggregated by analyst, broker, ticker, any combination thereof, or in other aggregations. In each of the above identified modules, other options may be available to the user.

According to one aspect of the invention, a software tool and methods are provided (e.g., a graphical user interface (GUI)) to enable a user to easily view historical data relating to earnings estimates (and other information) from a plurality of sources (e.g., analysts). The historical data is stored in a database and is commercially available from one or more vendors such as First Call, IBES, etc. The invention also calculates and selectively displays daily summary-level statistics such as Calculated Low, Calculated Mean, Calculated High, and Number of Analysts. The software tool preferably includes a graphical user interface that enables the historical data to be presented in the form of a chart, a graph, or other format.

The graphical view preferably comprises a time series view (e.g., estimate values on the y-axis, time on the x-axis) of each or selected analyst's estimates and revisions for a selected security, and earnings event over a selected period. Other information may be simultaneously displayed, such as actual reported earnings.

Sources of estimates (or other predictions) may include analysts, brokers, analyst broker pairs and other sources. The software may also treat the high estimate, low estimate, consensus estimate, enhanced composite estimates (detailed below) and other calculated or derived values as sources, and enable a user to selectively show each as a time series display. Preferably, a user control portion of the GUI enables a user to selectively cause the display to show or hide the time series for any one or more or all sources, by selecting and deselecting individual sources, or through a select all or deselect all feature. Other features and options may also be available to the user. Through the display, the user may simultaneously view a time series of earnings estimates and revisions for one or more selected sources for a selected security, for a selected earnings events.

According to another aspect of the invention, a stock price time series may be juxtaposed with or overlaid on the selected sources time series. This is particularly useful to see if there is a correlation between one or more analysts' estimates or revisions thereto, and stock price movement.

Another feature of the display is a user selected "As-of Date" which may be displayed as a vertical bar, for example. The user may view historical data as of a user selected date and simultaneously display summary estimate data and other information as of that date. Summary estimate data may comprise, for example, data derived from a distribution of estimates and enhanced composite estimates. The user may select the snapshot view to view detailed information for each activated analyst as of the selected date.

Another aspect of the invention enables individuals to create models that give more weight to analyst predictions that are more likely to be accurate and less weight to those less likely to be accurate. When the models are applied to current estimates, the present invention produces earning estimates that may more accurately predict earnings than a consensus estimate (or other estimate), depending on the accuracy of the model created. The present invention enables the user to develop, test and refine models by comparing the estimates of the models with the historical estimate data.

According to another embodiment of the present invention, a Model module enables users to create, backtest, and manage a model. Other functions are also available. The model may comprise user defined rules that are applied to selected data for a plurality of contributors to create an enhanced composite prediction. The user may specify certain rules or factors by which to exclude one or more data items, contributors, or other criteria. In addition, the user may assign weights to various factors involved in contributors' predictions to obtain an enhanced composite.

A user may create a model by identifying various factors to be taken into account in the model. For each factor, a user specifies rules by which each non-excluded analyst is assigned an N-score (normalized) according to the rules. Such factors may include, for example, accuracy, All Star (or other) rating, broker list, experience, estimate age, and other factors. Each factor is assigned a weight to enable a user to place greater emphasis on one or more factors for a given model. For each model, the analyst's N-score for each factor is multiplied by the factor weight and those weighted N-scores are summed for each analyst. The actual emphasis placed on an analyst's current estimate is determined by taking the sum of the analyst's weighted factor scores divided by the sum of the weighted factor scores for all analysts.

The user may specify certain exclusion factors. For example, exclusion factors may include excluding estimates that are older than a particular number of days and estimates that are more than a user specified number of standard deviations from the mean. In addition, an exclusion may be specified for estimates older than a user-specified amount of time before or after a company's last earnings report date. Exclusion factors can exclude an entire group or class of estimates from being considered, such as all estimates that are older than 100 days.

The present invention enables the user to view, in a single display screen, current analyst data commingled with analyst performance data and attributes, values and elements of models on an analyst-by-analyst basis. For example, the snapshot view details analyst estimate data, such as the current estimate, the current estimate date, the age of the estimate in days, the previous estimate, the date of the previous estimate, the change between the two most recent estimate, and other data. The user may readily compare the current analyst data for each analyst for a given stock and simultaneously view values and elements that comprise a selected model, such as factors, N-scores, exclusions, weights, and other elements.

Through these and other tools, the user may intelligently develop models that more accurately predict estimates by viewing and analyzing the components of a model. For example, a user may determine where particular groupings of estimate revisions (e.g., a cluster) exist and more intelligently create accurate models taking clusters into account. The present invention enables a user to easily compare actual current estimates with enhanced composite estimates that are a result of a model. Various algorithms for comparing these values may be used and various alerts may be issued when the difference satisfies user specified criteria.

The present invention enables the user to view a model as a "clear box", as opposed to a "black box". In other words, the user may easily view factors, N-scores, factor weights and other information that comprise a model. For example, by viewing the specific weights and N-scores, along with other information, the user may readily determine why an enhanced composite deviates from a consensus estimate. Specific detailed numerical values relating to analysts performance and attributes are also provided to the user for comparing, sorting, and ranking. Through the snapshot view, the user may view detailed analyst estimate data, including historical and current data, that informs the user what factors, weights, and N-scores comprise a model. The ability to analyze models on a detailed level enables the user to identify important factors, values, and trends to develop more accurate models.

Another aspect of the invention includes a Performance module to further assist the user in developing more accurate models. The Performance module also enables the user to measure and compare analysts' performance, in absolute terms and relative to other analysts, sources or other data in estimating stock earnings. This feature is useful for determining how well analysts in a particular brokerage are doing, or which analyst has the best performance for a particular ticker. For example, information regarding a particular stock and multiple contributors; one particular contributor and multiple stocks; and a unique contributor-stock pair may be displayed. This enables a business model that provides the ability to rank analysts based on user-selected objective criteria.

In displaying a particular stock and multiple contributors, each contributor who made an estimate in the selected fiscal period or periods for a selected security may be displayed. Summary performance metrics; aggregate performance metrics; and other information may be displayed for each contributor. Further, a portion of the display may display period-by-period performance for a selected security for each period in the selected fiscal periods. The user may also elect to filter the displayed list of contributors who made an estimate in the selected fiscal period or periods to those contributors who have a current estimate, so that either all contributors, only current contributors or some other group may be shown.

In displaying a particular contributor and multiple stocks, each security for which that contributor has made an estimate for a selected contributor, in a selected fiscal year may be shown. Further, aggregate performance metrics may be displayed for the selected contributor and each displayed security. The aggregate performance metrics may be displayed for a selected time frame and aggregated over each period in the selected period. In addition, a portion of the display may display period-by-period performance for the selected contributor, for one or more securities for each period in the selected fiscal periods.

In displaying a unique contributor-security pair, the user may select a contributor-security pair where period-by-period performance metrics for each period in the selected fiscal periods may be shown.

The present invention provides a graphical environment for quantitative researchers and other entities, to create, investigate, backtest and apply models to create more valuable estimates. Individuals, such as portfolio managers, may easily apply these models to assist with stock selection strategies and measure the performance of analysts. The present invention also provides research departments, for example, regular and objective reports on the performance of individual analysts compared to other analysts following the same stocks (or other benchmarks), as well as the performance of the research department as a whole. Individual investors may also receive information generated by models (e.g., enhanced composite estimates) through a web-site implementation of the present invention, through internet finance portals, and other portals. Additionally, subscribers may receive information alerts, e.g., when an enhanced composite estimate changes when it differs from the consensus estimate by certain user specified or other criteria or at other times. Various other business methods may be implemented using the technology described herein.

BRIEF DESCRIPTION OF THE DRAWINGS

FIG. 3 illustrates an example of a Contributor search screen according to an embodiment of the present invention.

DETAILED DESCRIPTION OF THE PREFERRED EMBODIMENTS

Figure 1:
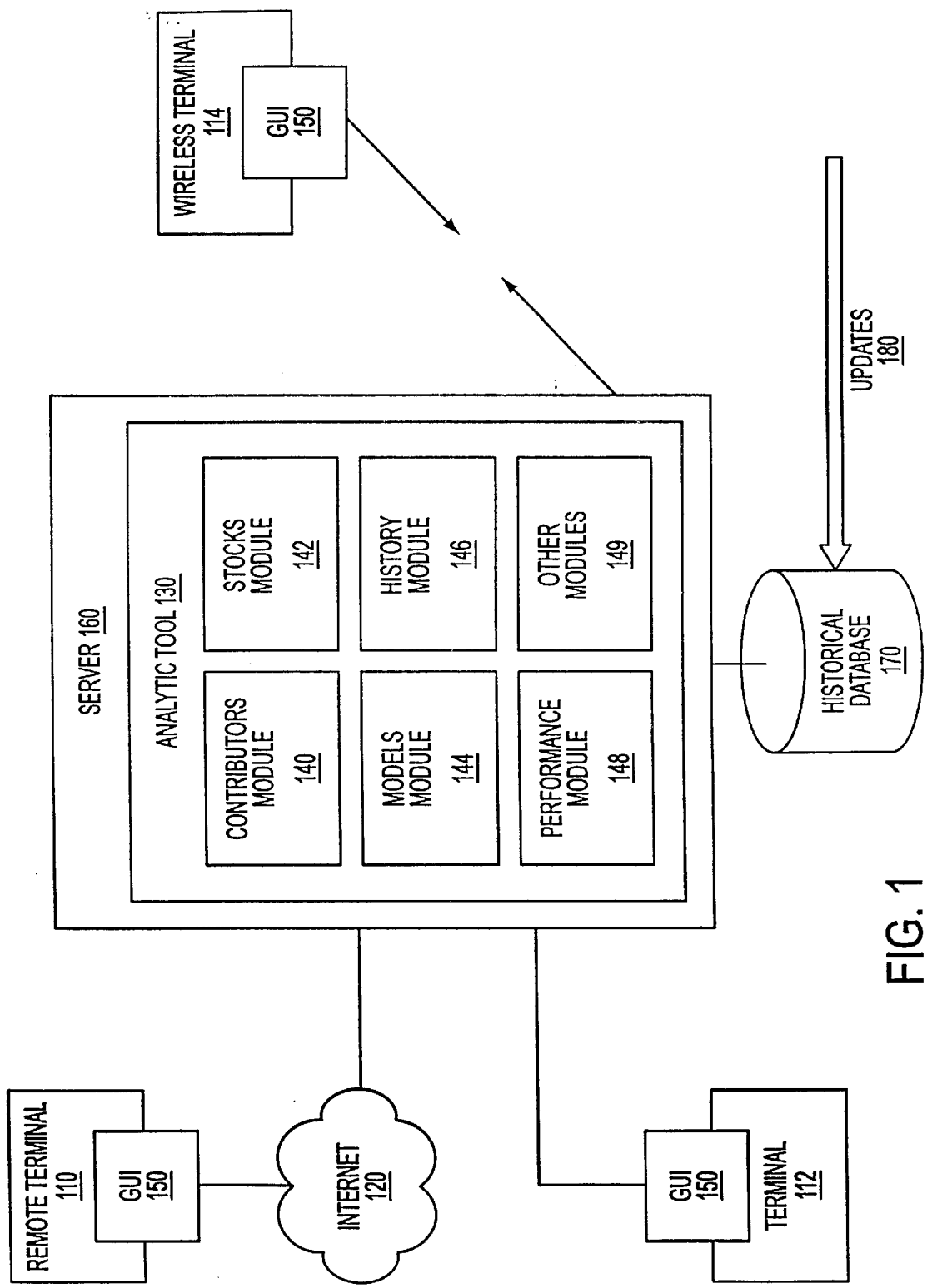
FIG. 1 illustrates a block diagram overview of an embodiment of the present invention.

With reference to FIG. 1, one embodiment of the invention comprises a computer implemented system and method for use with a historical database pertaining to predictions from a plurality of sources. The predictions may include one or more of analysts or broker estimates of earnings for a security, buy/sell/hold recommendations, revise estimates, stock price target estimates, and other predictors. The sources may include security analysts, institutions (e.g., brokerages), combinations thereof, calculations and other sources. For simplicity, in many cases, this specification refers to analysts estimates. It is to be understood that the invention is not so limited.

As shown in FIG. 1, an example of such a system may include at least one historical database 170 operatively connected to server 160. Historical database 170 may receive updates 180 so that the most recent information and estimates are maintained by the system. Historical data relating to predictions from a plurality of sources related to securities (or other items) are stored in database 170. The predictions may include earnings estimates, revisions to such estimates, and other information, along with actual reported earnings. Preferably, server system 160 is programmed with software that implements the various features and finctions described herein. In operation, one or more users may access the system through an interface.

By way of example, the server may be a web server and the user interface may comprise a web browser. Other client/server and network configurations may be used. According to one embodiment, the interface comprises a graphical user interface (GUI) 150. Preferably, the GUI may display various modules and finctions available to the user. The GUI 150 may be displayed via a terminal 112, such as a PC or other user terminal, networked to the server 160. The user may also access server 160 through GUI 150 displayed on remote terminal 110 via the Internet 120. Also, the user may access server 160 through GUI 150 displayed on wireless terminal 114, such as a wireless phone, PDA, or portable computer.

Analytical tool 130 comprises software that enables the user to perform various functions and features described herein. It enables analysis, use and display of the data in database 170. The analytical tool 130 preferably is processor. Contributors module 140, Stocks module 142, Models module 144, History module 146, Performance module 148 and other modules 149. In another embodiment of the invention, a Lookup module may be used in place of a Contributors module. One or more of the modules can be combined. For some purposes, not all modules are necessary.

Figure 2:
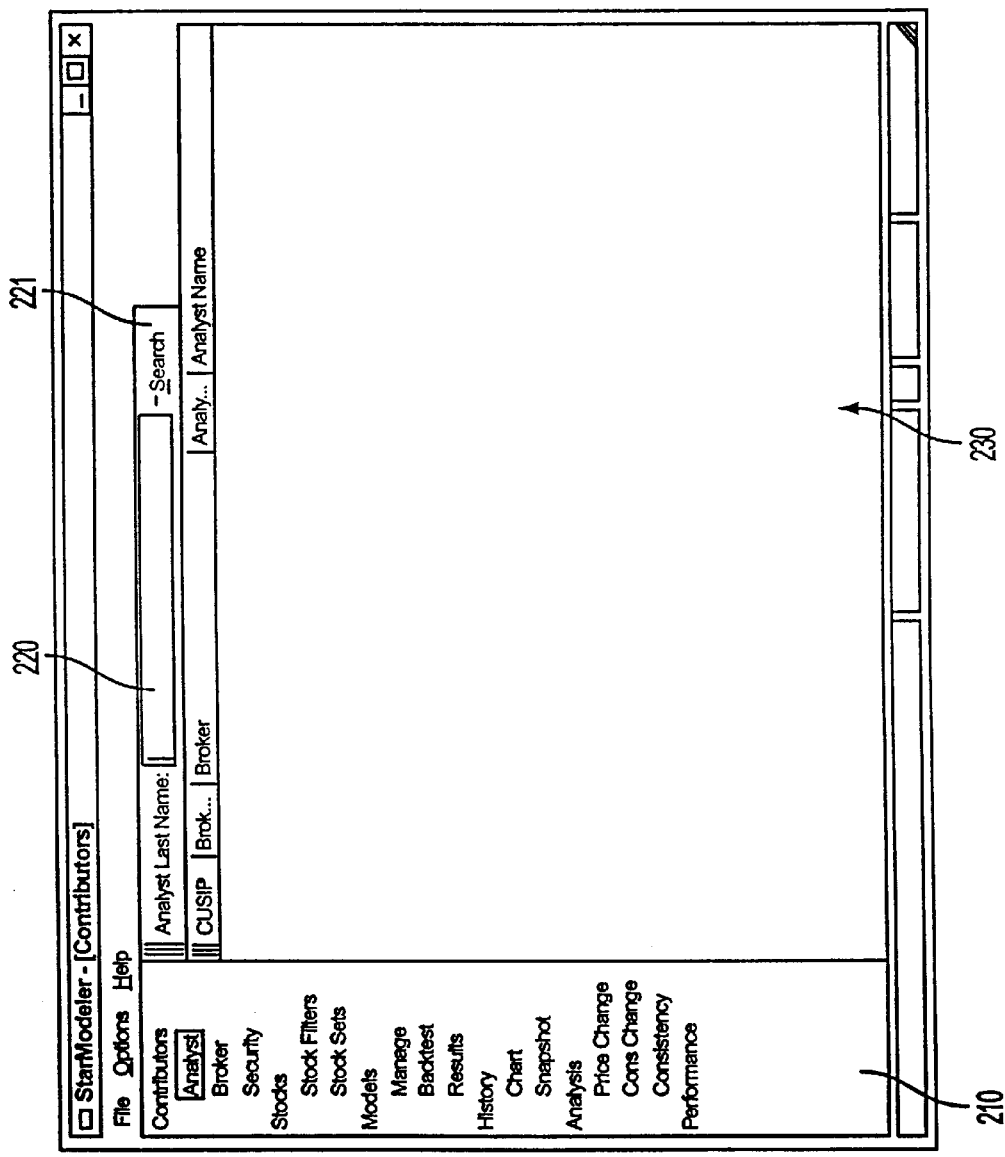
FIG. 2 illustrates an example of a Contributor/Analyst module according to an embodiment of the present invention.

FIG. 2 illustrates an example of a screen display that a user may see in GUI 150 according to one aspect of the invention. The display screen comprises a Navigator pane 210 that provides various options to the user. For example, as shown the options may include the ability for the user to select from among a plurality of modules. Under the Contributors module, the user may select a contributor from one or more of an analyst, broker, security, or other categories.

Under the Stocks module, the user may define stock filters and group stocks into stock sets to facilitate testing of models and for other purposes. Under the Models module, the user may create, manage, edit and perform other finctions for models. The models may be used to generate enhanced composite estimates, backtest the model using the historical database, and view results of the backtest.

Under the History module, historical estimate and actual data may be viewed in chart format, snapshot format, or otherwise. For example, according to one embodiment, the chart view displays user selected estimates and actual data (e.g., earnings) graphically as time series data. The snapshot view displays detailed data in tabular format for a selected "As Of Date." Under the Analysis module, the user may analyze estimates according to price change, consensus change, and consistency. Under the Performance module, the user may analyze analyst and/or broker accuracy and performance, aggregated by analyst, broker, ticker, or any combination thereof. In each of the above identified modules, other options may be available to the user.

Under the Contributors module, the user may locate analysts, brokers and stocks and review their associations with each other and for other purposes. The Contributor module may be used to review information about analysts, brokers, and stocks in a general way. For example, a user may select the Contributors/Analyst module in Navigator 210, as shown in FIG. 2. The user may search by analyst and view the stocks covered by that analyst, and the brokerages for which the analyst has worked. The user may enter an Analyst's Name in analyst name bar 220 and select (e.g., click on) the search button 221. Also, when entering an analyst's name, the user may select a search option where the system will search an analyst name that begins with, contains, ends with, or exactly matches the entered string. The user may also use wild cards when searching for analysts. Main Display window 230 will display the results.

With reference to FIG. 3, for example, if the user enters a name that has more than one match, such as "Dube", preferably all names that correspond to the entered string 220 and their analyst ID will be displayed. The user may then select the desired analyst from the list of matches (e.g., by clicking on the desired analyst).

Figure 4:
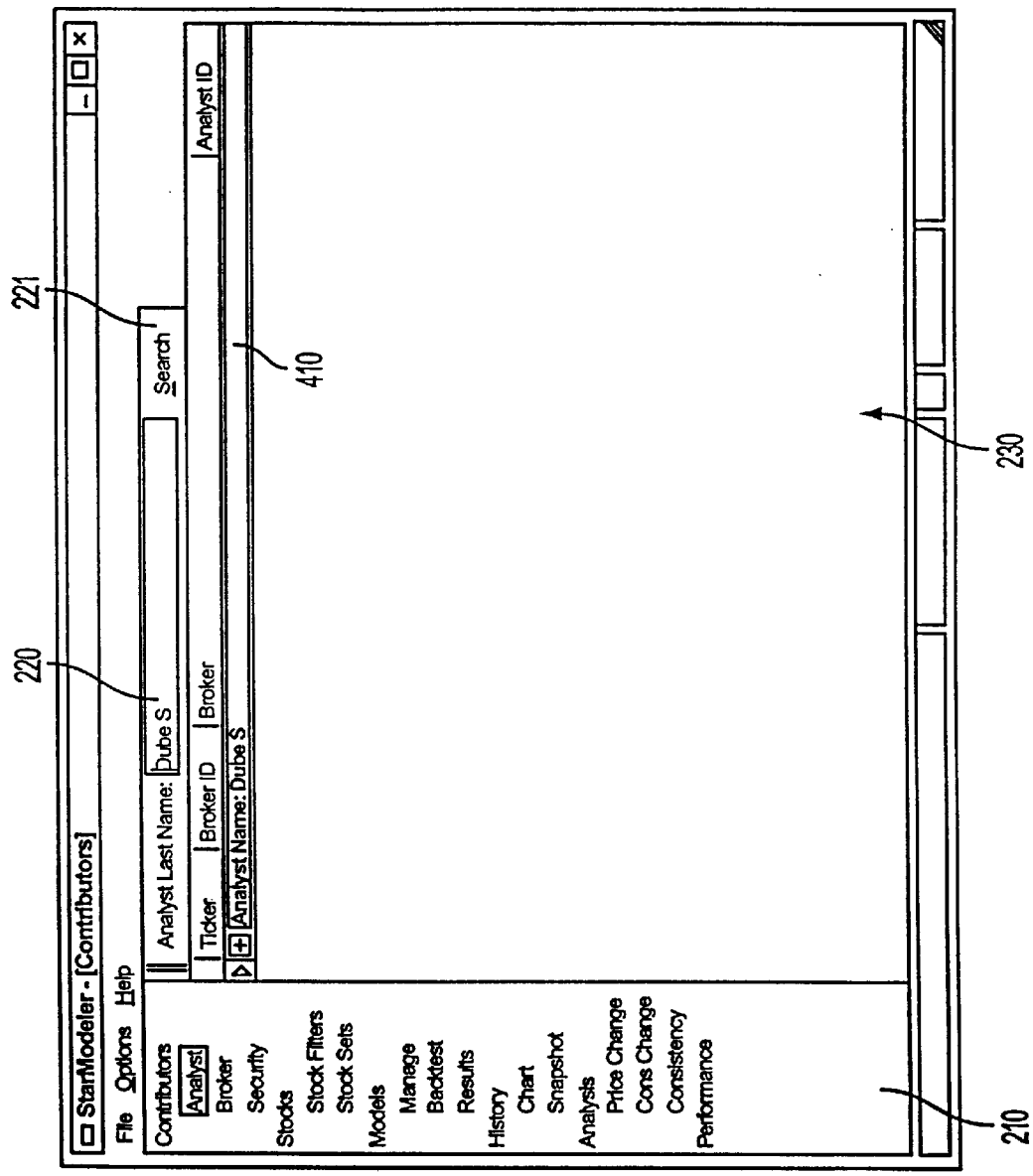
FIG. 4 illustrates another example of a Contributor/Analyst module according to an embodiment of the present invention.
Figure 5:
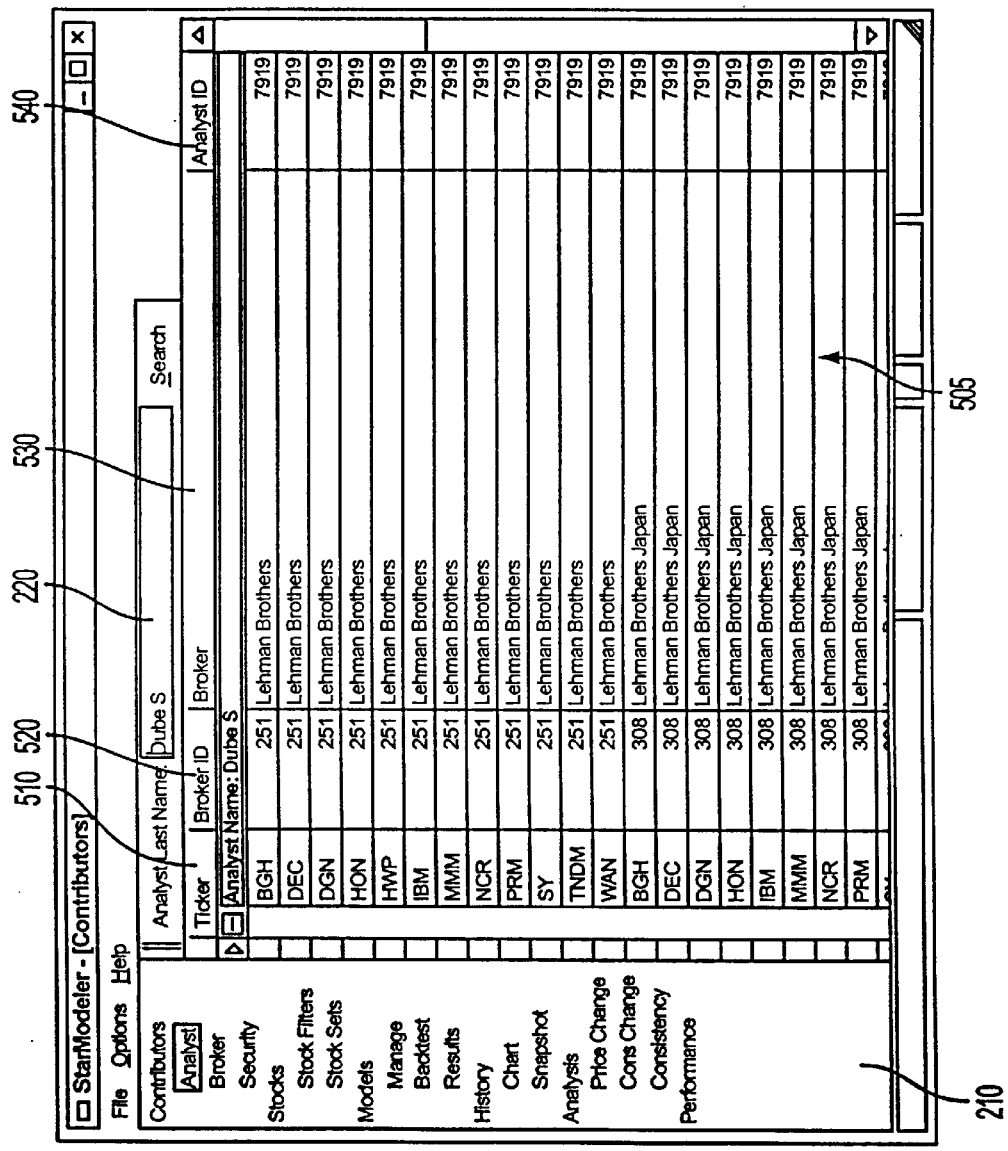
FIG. 5 illustrates an example of results of a Contributor/Analyst module according to an embodiment of the present invention.

As shown in FIG. 4, a resulting grid displays the selected analyst matching the search criteria in Main Display window 230. Clicking the plus-sign button next to the analyst's name in line 410 (or through other selection mechanisms) causes the system to display the analyst's record, as shown in FIG. 5. The grid 505 displays a list of the stocks for which estimates have been created by the selected analyst (in this example "Dube S") and other information. For example, grid 505 may include a list of stocks by Ticker 510, Broker ID 520 and Broker name 530 for brokers with which the analysts is or has been associated when estimates were made, the analyst ID 540, and other desired information. A user can click any column head to sort the table, then click again to reverse-sort. The Contributor/Analyst module thus enables a user to search by analyst and find the stocks and brokers associated with that analyst.

Figure 6:
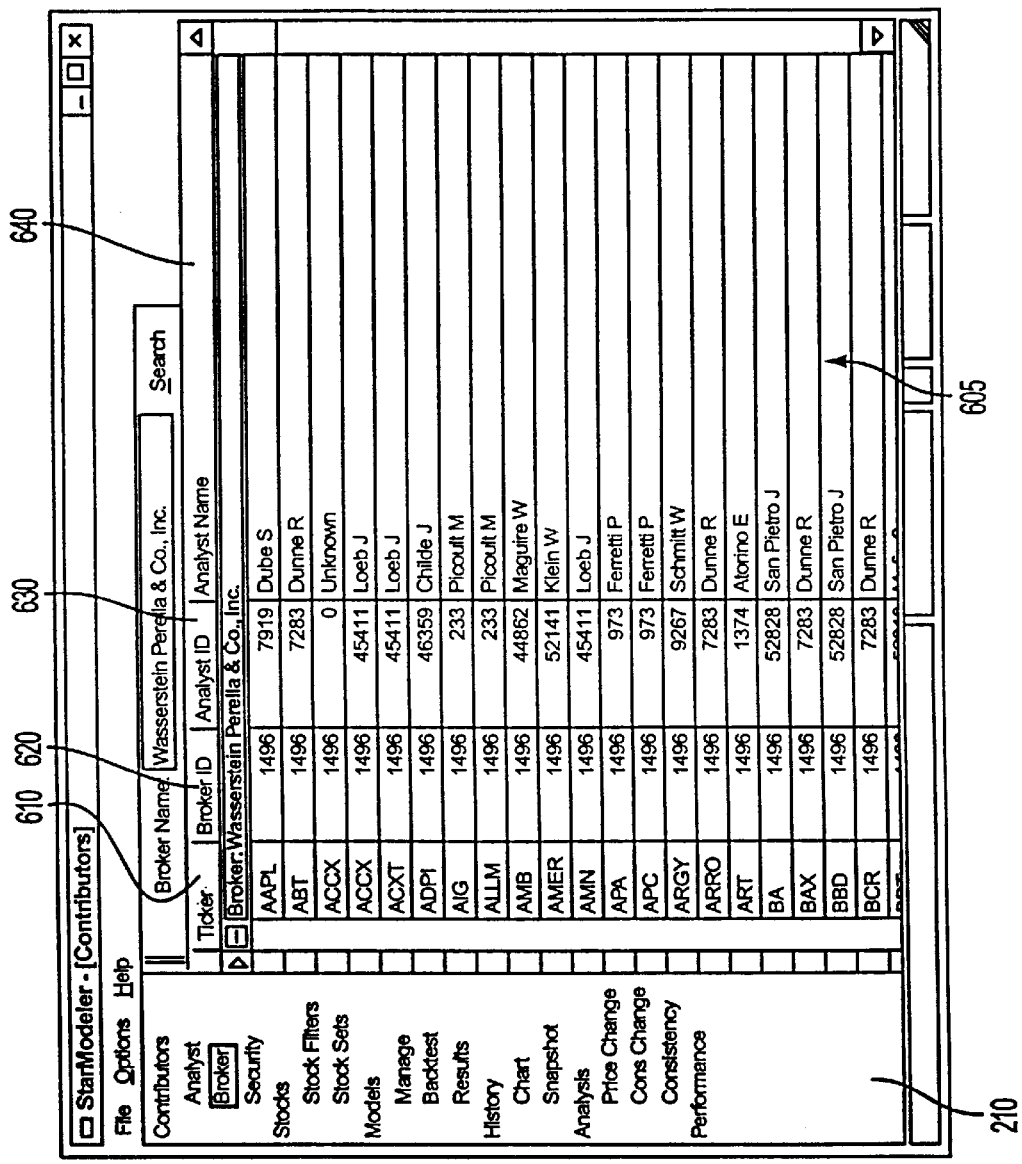
FIG. 6 illustrates an example of a Contributors/Broker module according to an embodiment of the present invention.

Similarly, the user may choose to search by broker. For example, as shown in FIG. 6, a user may select the Contributors/Broker module in Navigator 210, search by broker and view a list of analysts associated with the selected broker, as well as other information, as shown in grid 605. For example, grid 605 may display a list of the stocks for which estimates have been created by the selected broker. The grid includes a list of stocks by Ticker 610, Broker ID 620, Analyst ID 630, analyst name 640, and other desired information. A user can click any column head to sort the table, then click again to reverse-sort. Thus, the Contributor/Broker module enables a user to search by broker and find the stocks and analysts associated with that broker.

Figure 7:
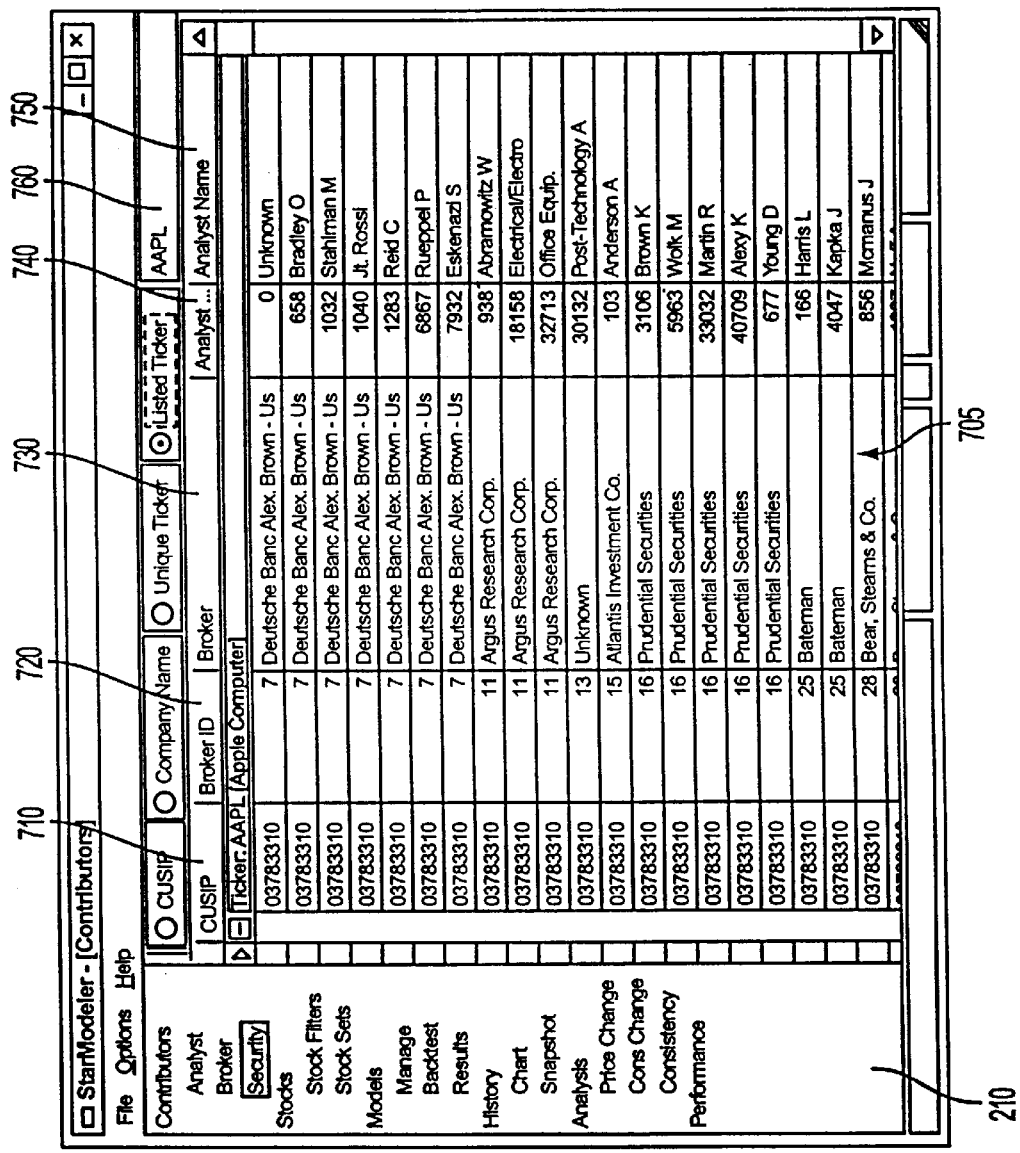
FIG. 7 illustrates an example of a Contributors/Security module according to an embodiment of the present invention.

As shown in FIG. 7, by selecting the Contributors/Security module in Navigator 210, a user can search for a particular security via text box 760. Once a user selects a stock (or other security), a list of the analysts and brokers who have issued estimates for this stock may be displayed along with other information, as shown in gird 705. The search can be done by CUSIP, Company Name, Unique Ticker, or Listed Ticker. If a company has changed ticker symbols it is useful to aggregate over a unique ticker. For example, when America OnLine moved from the NASDAQ to the NYSE, its ticker symbol changed. Other modes of searching for a ticker are also available. Clicking the plus-sign button next to the stock (not shown) will cause the system to display estimate details and show a minus sign next to the security. The system will display in grid 705, for example, a list of all analysts and brokers that have made estimates for that stock and other information. For example, the system may display CUSIP number 710, Broker ID 720, Broker Name 730, Analyst ID 740, analyst name 750, and other information.

In another embodiment of the invention, a Lookup Module enables the user to call up analysts, brokers and stocks, and review their associations with each other. For example, when an analyst is selected from a Lookup/Analyst module, the resulting grid displays the analyst's association with brokers, and the stocks for which the analyst has created estimates. When a broker is selected from a Lookup/Broker module, list of stocks estimated by that broker and the analysts who estimated each stock will be displayed. When a stock is selected from a Lookup/Security module, a list of analysts and brokers who have prepared estimates for this stock will be displayed. Also, start date, end date, id numbers, and other information may be available in each view.

Under the Stocks module, the user may create and apply Stock Filters and Stock Sets. A Stock Filter is a set of screening rules specified by a user to identify a group of stocks satisfying the rules. For example, a stock filter may include rules specifying stocks with a market capitalization in the top 500 of all stocks and a PE ratio less than 20. Stock filters may be used to update the list of stocks to be included in an analysis on a periodic basis. A stock set is a group of stocks, determined by a stock filter, manually or otherwise, that is saved under an assigned name. A user creates stock sets by creating a stock set name and adding stocks to it. A user can copy another stock set under a new name, and make changes to the list of stocks. Stock sets are stored on a system server. According to one embodiment, in a multi-user environment, stock sets may be created by an Owner and only accessible to that owner (e.g., a company) or others who are given access to a company's stock sets.

When a user wants to test a model against a group of stocks in the Models/Backtest module, the user calls up the name of the stock set they want to use. The model is tested against all stocks in the set in a single operation.

Figure 8:
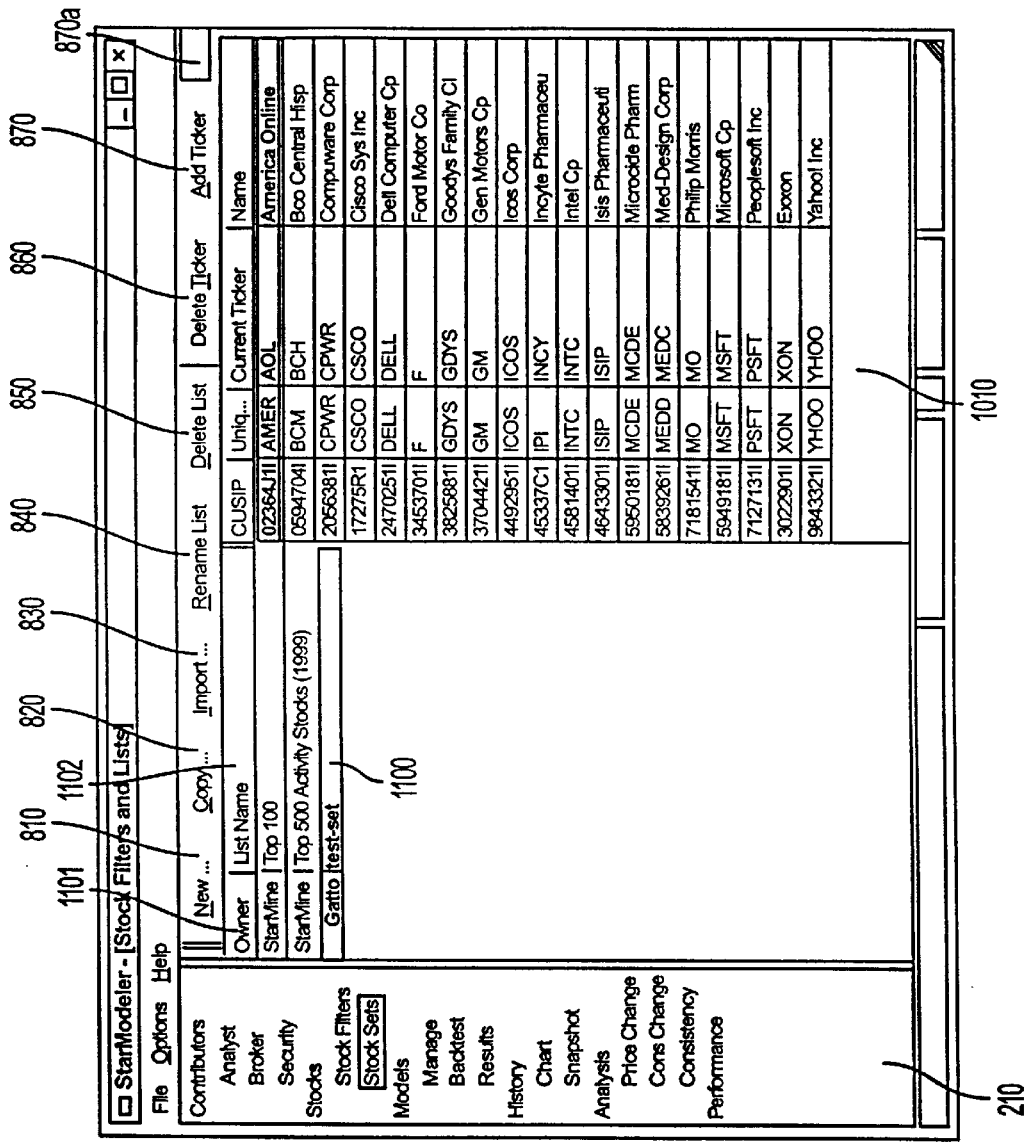
FIG. 8 illustrates an example of a Stocks/Stock Sets module according to an embodiment of the present invention.

FIG. 8 illustrates a screen display illustrating an example of what a user may see when the Stocks/Stock Sets module is selected. A portion of the display may list stock sets by owner names (1101) and stock set names (1102). For example, as shown, all or some stock sets owned by the web-site operator (e.g., Starmine) may be available to all users or certain users. Stock sets created by the user (e.g., Gatto)may also be available. In the example, the user has selected the "test-set" list 1100. This causes the Stock Display window 1010 to display the stocks of stock set "test-set." The displayed information may include, for example, the CUSIP, unique ticker, current ticker, name and other desired information.

Among other things, the Stock Set feature makes it easy for a user to group stocks into "sets" and call up those sets during the backtesting process or for other purposes. Thus, a model can be tested against all the stocks in the set, in one operation.

To create a stock set:

1. From the Navigator 210, a user can select Stocks/Stock Sets.

2. By clicking New 810 on the menu bar, a New Stock Set Name dialog box will appear.

3. By typing the name of the new stock set, the new Stock Set list name will be displayed with the owner's name.

4. With a stock set name selected, the user can type into the text box 870*a* or otherwise add the tickers the user wants to add to the stock set. By clicking Add Ticker 870 after entering a stock name, the added tickers will be displayed in the list shown in Stock Display window 1010. To delete a ticker, the user can select it and click the Delete Ticker 860 button.

The user also has the option to rename a stock set under Rename List 840, copy a stock set under Copy 820, import a list from another source under Import 830, and delete a list under Delete List 850. Other options to customize stock sets and filters are also available.

Figure 9:
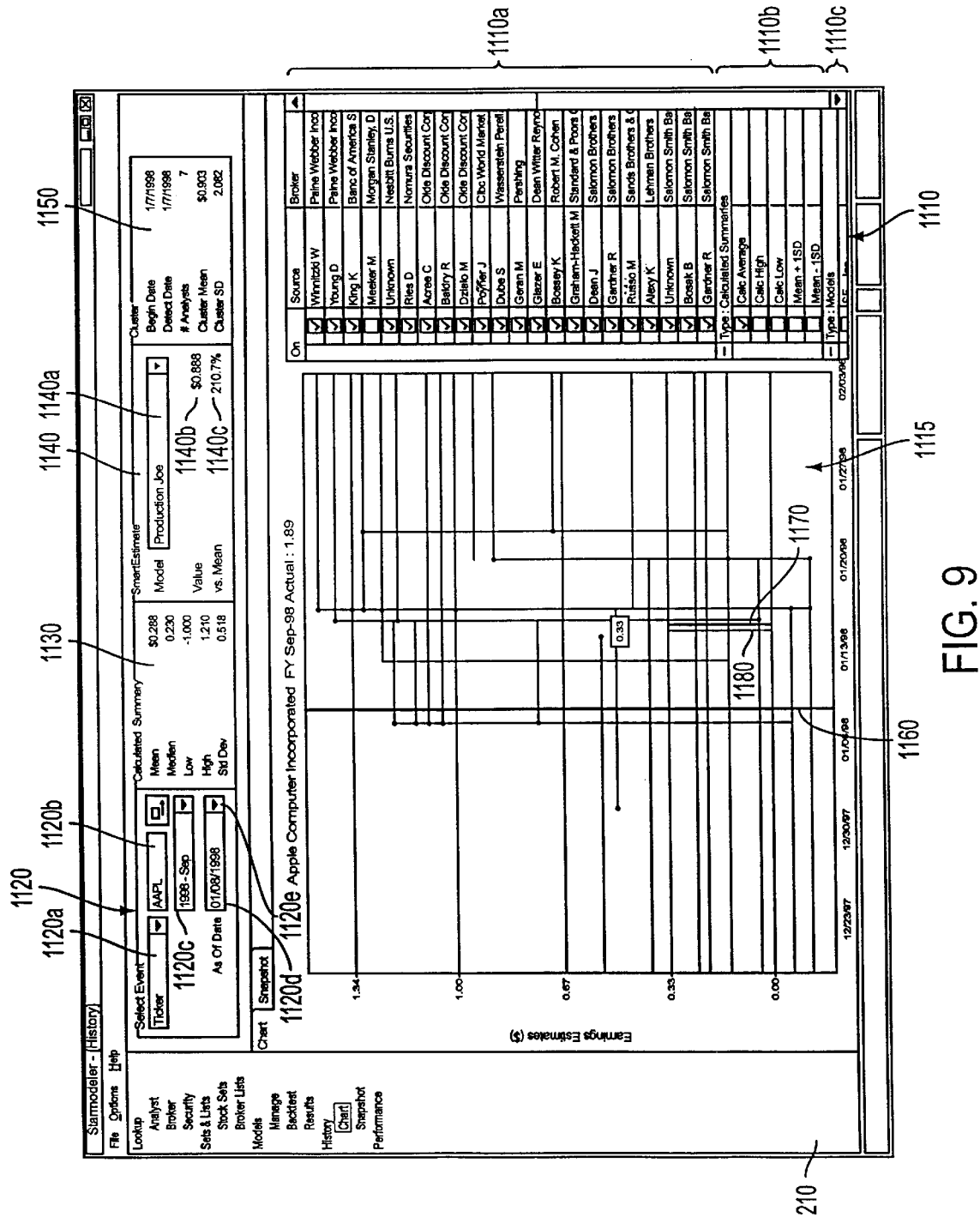
FIGS. 9 and 10 illustrates an example of a historical chart view according to an embodiment of the present invention.

As shown for example in FIG. 9, another aspect of the invention is the History module. The History module includes at least a History/Chart module and a History/Snapshot module. The History/Chart module displays for a selected stock and event, a graphical representation of historical estimates (and other information) as a time series over a selected time period. The History/Snapshot module displays in a grid format details of estimates (and other information) for the selected stock and event for a selected "As Of Date". A user may easily toggle back and forth between chart and snapshot view. In both views, the software provides the user great flexibility in controlling the data to be included in the view, including the analyst or analysts data to be displayed, the calculated or derived values (e.g. high estimate, low estimate, mean), any enhanced composite estimates or other sources. Various other user selections described herein give the user powerful analytic ability.

The History/Chart module displays a graphical representation of the historical performance of a selected security including selected analysts' estimates and revisions, actual reported earnings and other information. When the user selects a stock, an earnings event, an event period (e.g., annual or quarterly) and an event date, estimates and revisions are charted as a time series display, preferably along with the actual reported earnings of the selected stock for the event. The chart enables the user to visually analyze historical data for an event along with different analysts' estimates for an event. It enables a user to graphically identify analyst's whose estimates were close to the actual earnings and, importantly, how soon before the reported earnings an analyst made that estimate. The chart view also allows the user to simultaneously display calculated or derived values for display as a time series. For example, a user can select a model and view estimates generated by applying the model at any point in time prior to the period report date. Thus, a user can visually compare the model estimates to a consensus estimate or other source. The user also may selectively view one or more analysts' estimates simultaneously with one or more of an average, high or low estimate.

Figure 10:
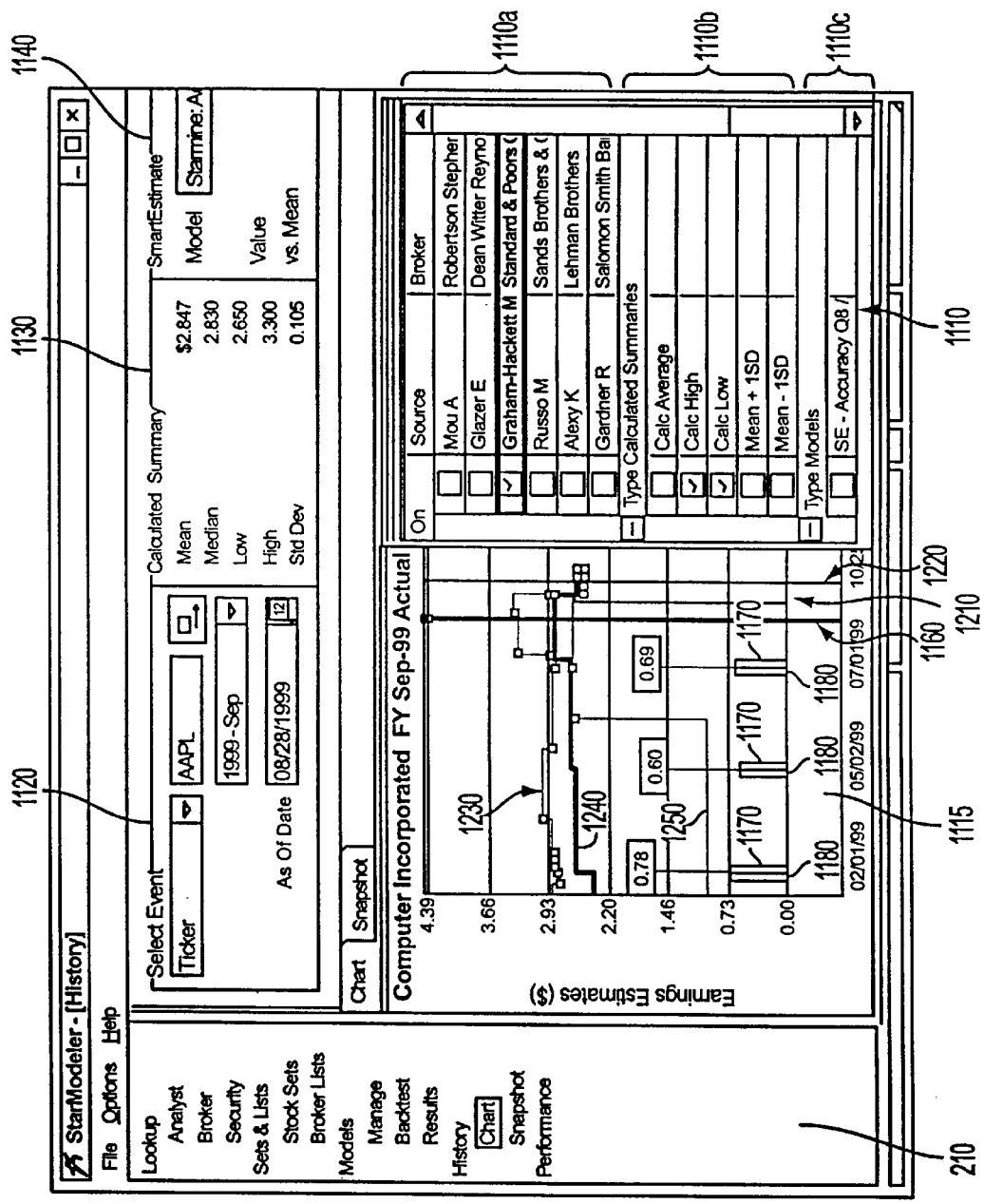
Figure 12:
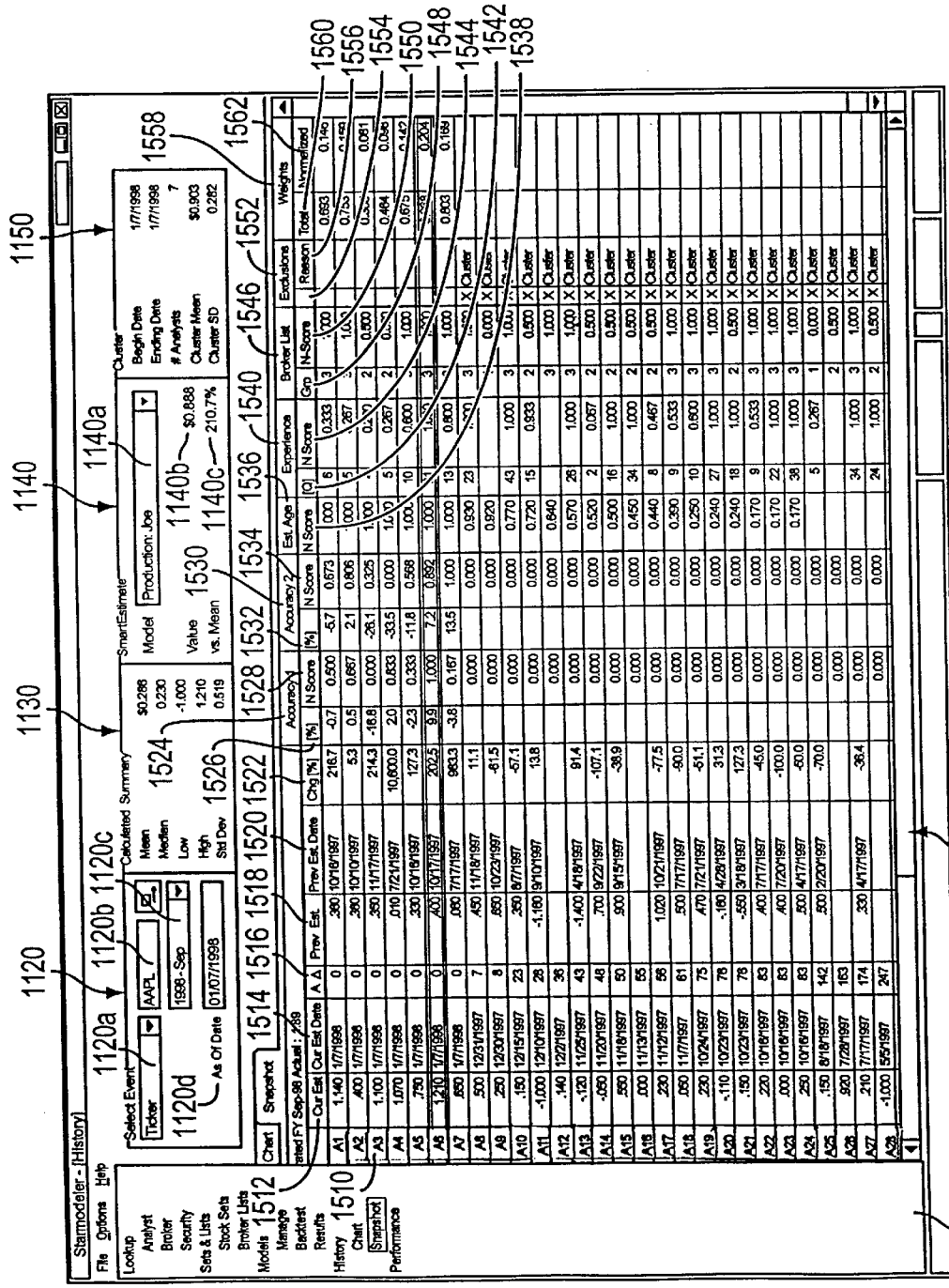
FIG. 12 illustrates an example of a snapshot view according to an embodiment of the present invention.

FIGS. 9 and 10 illustrate examples of History/Chart modules. FIG. 12 illustrates an example of a History/Snapshot module. According to one embodiment, both views may have certain common display elements. For example, both views may include the Navigator 210. Both may also include a Selected Event area 1120, a Calculated Summary area 1130, a Model Selection area 1140, a Cluster area 1150, a Main Display window 1115, and other desired information.

In Select Event area 1120, the user may select a security and earnings event, the security may be selected by Ticker, Unique Ticker, Company Name, CUSIP number, or other category using text box/drop down list 1120a. In FIG. 9, the user has chosen to select the security by ticker, for example. In text box 1120b, the user may enter the ticker (or other information to identify the security). In this example, the user has selected Apple Computer by entering AAPL. In box 1120c, the user may select the event period type (e.g., annual or quarterly) and event date (e.g., a year or quarter-ending June-99). In this example, the user has selected the quarter ending September 1998. The user may also select an "As Of Date" at 1120d. As detailed elsewhere herein, calculated and derived values are calculated and displayed as of the "As Of Date".

The user may select the "As Of Date" in various ways. For example, under the Select Event area 1120, the user may click the Calendar icon 1120e to display a Calendar and pick a date by clicking double arrows for years, single arrow for months, and finally a day of the month from the displayed month. Alternatively, the user may manually type a date in the "As Of Date" box 1120d. In the History/Chart module, the user may drag an "As Of Date" bar (e.g., 1160) to a desired date displayed in Main Display window 1115. Bar 1160 graphically indicates the "As Of Date". Also, the user may simply click on the X-axis on the desired date and the "As Of Date" bar 1160 will move to that date. Other ways of changing the "As Of Date" may also be available. In each case, the displayed "As of Date" will be changed to the selected date.

In the example of FIG. 9, the "As Of Date" is Jan. 18, 1998, as shown by vertical bar 1160 and indicated in box 1120d. The "As Of Date" enables the user to specify a specific date for detailed analysis, e.g., the date for which historical information is calculated and displayed in the snapshot view. Summary information as of the "As Of Date" may be calculated and displayed in Calculated Summary area 1130. For example, Calculated Summary area 1130 may display summary information such as the mean estimate, median estimate, low estimate, high estimate, standard deviation, or other calculated or derived information with respect to the estimates, as of the "As Of Date".

In Model Selection area 1140, a user may select a model (created using the Models module described elsewhere herein) which when applied against analyst estimate data, creates an enhanced composite estimate that can be displayed in the chart or snapshot view. This enables a user to analyze, test, and compare the results of the selected model with selected analysts, consensus and other estimates or other information. In Model Selection area 1140, the user may select a model from a model list shown by clicking on a drop down window at 1140a. At 1140b, the value of the selected model's estimate as of the "As of Date" may be shown and the deviation from the mean may be shown at 1140c (e.g., as a %, actual or other difference). Other comparisons and information may be used and displayed to assist the user in analyzing the selected model's estimates and identify the significance of it.

Cluster information may be displayed in Cluster area 1150. As detailed below, a cluster is a group of estimates satisfying user specified criteria. When new information about a company becomes available, some analysts may promptly revise their estimates. A group of such revisions may constitute a cluster. Such revised estimates tend to be more accurate than estimates made before the clusters. Cluster information displayed in Cluster area 1150 may include a begin date, detect date, number of analysts, cluster mean, cluster standard deviation, and other information. Clusters assist users in identifying potentially significant trends and changes in estimates.

Main Display window 1115 may display estimate data in either chart or snapshot format, as selected by the user.

Where the user selects a chart format, Source Selection panel 1110 may display a list of sources, or group of sources, which may include analysts, brokers and other potential sources in Source section 1110a, calculated averages, calculated high, calculated low, and other calculated summaries in Calculated Summaries section 1110b, and selected models in Models section 1110c. Other sections may also be available to display other relevant information.

With reference to FIG. 9, for example, once a stock, event and time frame are selected, the selected analyst's estimates and revisions are charted as a time series display along with actual reported earnings for the stock. Other features and options may also be selectively displayed. For example, using Source Selection panel 1110, the user may conveniently select and deselect individual sources, including analysts, calculated or derived summary data (e.g., high, low, and consensus estimate) and enhanced composite estimates generated by one or more models. Thus, the user may simultaneously view a times series of earnings estimates for one or more selected analysts or other sources for a selected security and predetermined earnings event.

From the Source Selection panel 1110, the user can select, in Source section 1110a, a check box of the analyst whose estimate history the user wants to display. For example, the user may click on the check box to activate the source. Preferably, a unique identifier for each analyst or source is used for that source's time series. For example, according to one embodiment, each check box in source selection panel has a unique color and a line the same color as the check box area appears on the chart, showing the analyst's estimate history for that stock. The user can select/deselect as many analysts as the user want individually, or as a group. To select all analysts, or to deselect them, the user may right-click anywhere in the Analyst list and use a Show/Hide command that enables a user to show all or hide all analysts.

The user can select a calculated estimate, for example, to compare an analyst's estimate record with the consensus or other calculated estimate, in Calculated Summaries section 1110b. For example, the user may compare analysts' estimates with a calculated average, a calculated high, a calculated low, a mean plus standard deviation, a mean minus standard deviation, and other calculated estimates.

The time series is generally displayed as a step function comprising a plurality of nodes, data points or data markers, connected by horizontal lines. The nodes, data points or data markers represent start dates, revision dates, or end dates. The selection of a node (e.g., by clicking on it) may cause a display of data associated with that node, data point, or data marker, including one or more of the sources, the value of the estimate corresponding to that node, data point or data marker and other information. Discontinuities in a time series may be graphically displayed A discontinuity may occur if an analyst stops covering security then restarts. The discontinuities may be displayed as a gray mark, for example, in the time series. To facilitate reading and interpreting the graph, each source's earnings estimate may be displayed in different colors (or other designator, such as symbols, different line type or line width, etc.) and a legend to correlate the various time series to the corresponding source.

When two or more time series are displayed (e.g., a contributor's time series and a calculated estimate time series) the present invention may provide a mechanism to ensure the visibility of both when for a given time period the numbers are the same value. For example, the graphical interface user may display one of the time series (e.g., consensus) as a thicker line than the other, where the thicker line is in the background and the thinner line is in the foreground. In this way, even if the values are the same for a given time period, both lines will be visible. Additionally, a selected source's time series may be displayed as a thicker line to easily focus on that source's time series. In the example of FIG. 9, calculated average is shown as a thicker line thereby indicating that this feature was selected.

Various display control features may be provided to enable a user to control the display in Main Display window 1115. For example, the user may select from various viewing options by right clicking in the chart view. For example, the user may use the right click option to select a different time frame in Main Display window 1115. The user may display data corresponding to selected time intervals before the report date in increments of one month to two years, or Maximum for the longest available time frame. For example, Vertical Max view displays the widest discrepancies of the lines on the y-axis. The chart will then redraw the Main Display window 1115 to display the time period the user selected. The right click option may also provide Get High Analyst and Get Low Analyst options. The user may view an Analyst Name, Broker Name, Estimate Date, Estimate Value, and other information regarding the high analyst and low analyst. The user may also select to view the mean on the report date as well as the mean value. Other options include the ability to export the history to a file, save the chart to a clipboard, print the chart, and other options. The user may also select to view a corresponding price chart that may appear as a separate chart directly below and time correlated to the chart view of estimate data, as discussed in greater detail below in FIG. 11. The options available through the right click mouse button may also be made available through other selection means.

The user also has the ability to narrow in on a section of Main Display window 1115. For example, the user may box a portion of the Main Display window 1115 (e.g., by holding down the left mouse button to draw a box around an area) to view estimate data in greater detail in chart format. This feature is useful when estimate data from different sources are displayed closely together so that it becomes difficult to differentiate the estimates in chart format.

Additionally, other information may also be displayed, such as actual reported earnings, which may be shown through vertical Earnings bar 1170 on the corresponding dates the earnings were reported. Previously reported earnings may also be shown as a vertical bar indicating the actual reported earnings. Mean estimate bar 1180 indicates the mean value on the report date. The value of the bar may be shown above the Earnings bar 1170 and/or Mean bar 1180.

FIG. 10 illustrates a chart view of an identified analyst compared to a calculated high and calculated low. In this example, analyst Graham-Hackett M has been selected as indicated by the checked box in Source section 1110a to display this analyst's estimates for AAPL stock, as shown in Select Event area 1120. FIG. 10 displays a calculated high shown by line 1230, a calculated low shown by line 1250, and estimates provided by the identified analyst, shown by line 1240. In this example, the user may visually compare Graham-Hackett's estimates with the actual reported amount as indicated by Actual bar 1210. A Period bar 1220 may be displayed as a thinner line or other indicator. The Period bar 1220 signifies the end of a period. In this example, the position of the Period bar 1220 indicates that the period for that quarter has ended just after the actual earning was calculated, as shown by the Actual bar 1210. Earnings bars 1170 indicate previous reported earnings for each quarter. When the height of Mean bars 1180 are compared to the height of Earnings bars 1170, the user may easily see that the mean values were slightly lower than the actual earnings in this particular window of time. The "As Of Date" bar 1160 indicates a date of Aug. 28, 1999. The Calculated Summary data in area 1130 along with the Value, vs. Mean in area 1140, and Cluster information (not shown) are displayed to the user where these values are current as of the "As Of Date".

Figure 11:
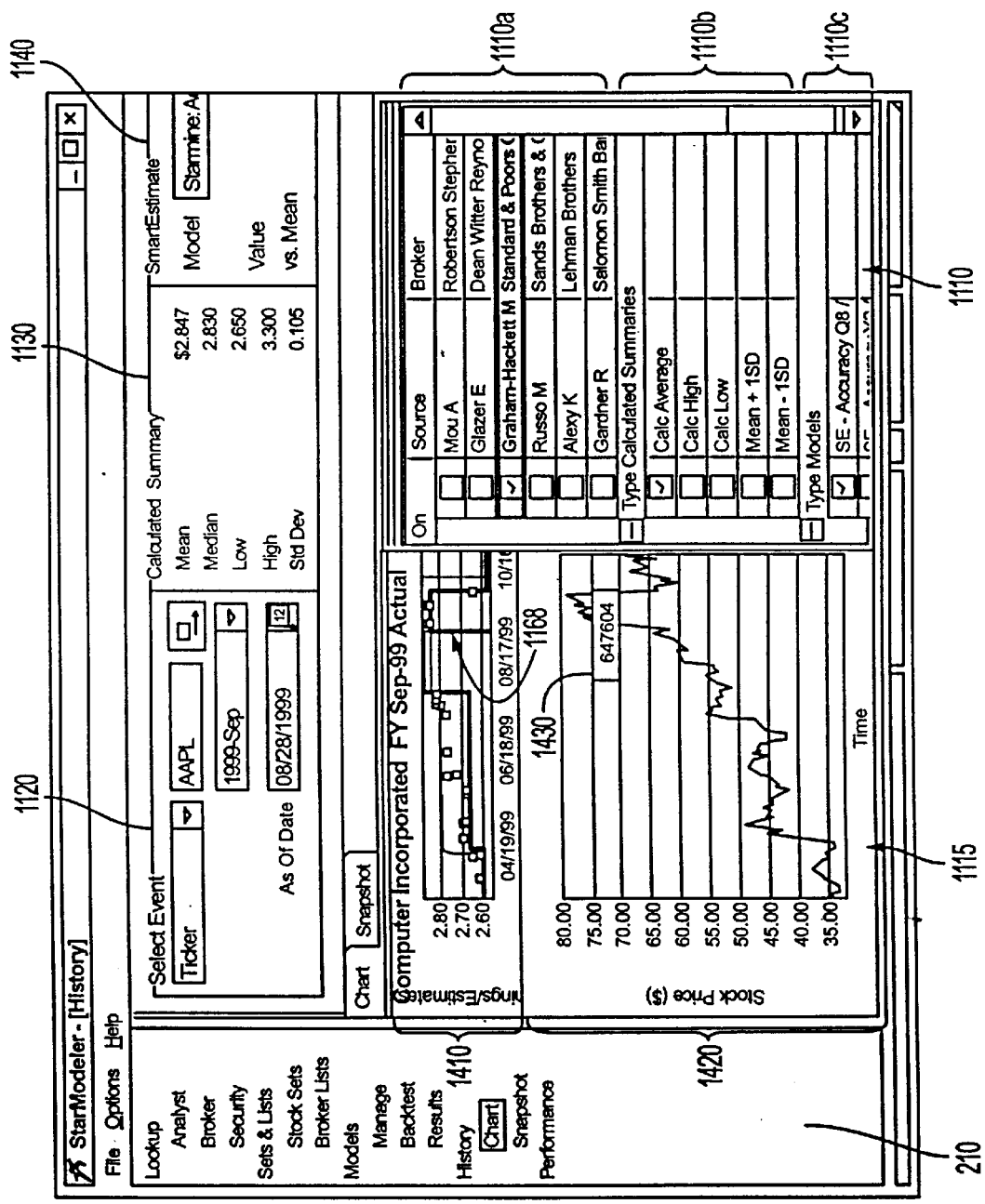
FIG. 11 illustrates an example of a Price Chart view according to an embodiment of the present invention.

FIG. 11 illustrates a Price Chart option that may be invoked through a right click option or other selection means. FIG. 11 illustrates that a time series display of the price of the security in juxtaposition with the time series of earning estimates for the security. This is particularly useful to see if there is any correlation between estimates and revisions thereto, and stock price movement. By selecting the Price Chart option, estimate data displayed in chart format is displayed in Chart window 1410 and the corresponding stock prices are displayed in Price Chart 1420, in Main Display window 1115. The user may drag the Chart window 1410 by holding down the right mouse button (or other dragging mechanism) to view estimates of other time frames thereby changing the times series view. The stock prices shown in Price Chart 1420 correspond to the time series estimates in Chart window 1410. Thus, as the user drags the Chart window 1410 to change the time frame, the stock prices displayed in Price Chart 1420 accordingly follow the user's change in time frame. In addition, the stock price for the "As Of Date" may be displayed in Stock Price box 1430 in Price Chart 1420. When the user selects a new "As Of Date", the stock price of the new "As Of Date" will be displayed in Stock Price box 1430.

FIG. 12 illustrates an example of a snapshot view. In contrast to the chart view which provides a time series view, the snapshot view enables the user to focus on a single date (the "As Of Date"). For that date, the user may view various data, metrics, and other information associated with the estimates current on that date.

The snapshot view is a powerful tool that provides significant detail for a given date in one view. Among other things, the view provides a clear breakdown of estimate data, source performance and attribute information and other information on an analyst by analyst basis. Detailed data regarding various factors e.g., factors used to calculate weights assigned to each analyst may also be displayed on a factor by factor basis.

For example, FIG. 12 shows a display wherein a snapshot view shows source, current data, historical data, factor-related data and other information. Under source column 1510, analyst information may be displayed as represented by A1–A28, which may include analyst's name, broker information and other source information. The snapshot view may also show current and historical estimate data as well as other information. For example, under current estimate data, the snapshot view may current estimates column 1512, current estimate date column 1514, estimate age column 1516 and other current estimate data. Historical estimate data may also be displayed including previous estimate column 1518, previous estimate date column 1520, change from last estimate to current column 1522 and other historical information.

The snapshot view simultaneously displays performance, attribute data, exclusion data and factor weights on a source by source basis. For example, performance data may be provided under Accuracy 1 column 1524, Accuracy 2 column 1530, Estimate Age column 1536, and other forms of performance data. Under each performance column, the actual score attributed to that performance as well as an N-score may be displayed. For example, under Accuracy 1 column 1524, the percentage of accuracy is displayed in column 1526 and an N-score is displayed in column 1528. In another example, under Accuracy 2 column 1530, the percentage of accuracy is displayed in column 1532 and an N-score is displayed in column 1534. In another example, under Estimate Age column 1536, the N-score assigned by user-defined criteria may be displayed in column 1538.

Attribute data may be provided under Experience column 1540, Broker List column 1546, and other types of attribute data. Under each attribute data, attribute information and an N-score may be displayed. For example, under Experience column 1540, the number of periods (e.g., quarters) an analyst has provided an estimate is displayed in column 1542 and the score assigned to the number of periods an analyst has provided an estimate is provided in column 1544. In another example, under Broker List column 1546, the group that the broker has been assigned to is displayed under column 1548 and the N-score assigned to that group is displayed in column 1550.

Exclusion data is also displayed in the snapshot view. For example, the user may view which analysts were excluded as clusters by examining Exclusion column 1552. In this example, the user may easily see the estimates excluded by a model and the reason for the exclusion. The example of FIG. 12 shows a cluster has been detected. Thus estimates outside the cluster are excluded under the clusters exclusion factor as indicated by an "x" mark, or other identifying mark in column 1554. Other estimates may be excluded for other reasons where the reasons are displayed under the reason column 1556.

The snapshot view as shown in FIG. 12, enables the user to view current analyst data commingled with a plurality of data values and N-scores for a selected model on an analyst-by-analyst (or source-by-source) basis. The user may readily compare the current analyst data for each analyst for a given stock with the elements that comprise the model, such as factors, N-scores, Exclusions and Weights. The user may also sort by the factors that are of particular interest to the user in defining and refining a model. For example, by sorting the estimates in the order of most recent estimate, the user may view estimates in the order of recency.

It will be appreciated that viewing the historical estimates of a plurality of analysts in the manner described above may often provide a context within which an individual source's estimates and revisions may be better understood, such as by providing insight into an analyst's estimate revision patterns and the relative accuracy of those revisions over time as they relate to a company's actual reported earnings. As such, this historic information may be valuable in appraising future revisions made by an analyst to his current estimates, and in deciding whether to act, or to not act, based upon the revisions. The visual display in chart view can clearly illustrate a bias error pattern of individual analysts such that, patterns, if any, in an analyst's earnings estimations may be investigated and analyzed. Other advantages exist.

According to another embodiment of the present invention, the user may create a model that can be applied to analysts' estimates for one or more stocks or stock sets to create an enhanced composite estimate for the stock or stocks. The enhanced composite often improves the ability to predict a quantity being estimated, such as company earnings, revenue, cash flow, buy/sell/hold recommendations or other predictions. According to one embodiment, the model preferably comprises one or more of user defined exclusions, rules, selected factors with user specified rules for assigning a factor score (N-score) to each source or non-excluded source, and Factors Weights that are applied to each factor. Preferably, the user can identify certain exclusions by which certain data items (e.g., estimates), contributors (e.g., analysts and brokers), or other sources are excluded from consideration for a particular model (e.g., if a source's estimate is older than a certain number of days, or if an analyst has not covered a stock for a minimum number of periods). Based on the exclusions, factors, rules, and Factor Weights, the model is applied to current estimates to create an enhanced composite estimate. The model may be backtested against historical data (visually and/or analytically), refined and when desired put in production mode. In production mode, the model is run against current data to generate current enhanced composite estimates (e.g., nightly or other frequencies). Various analysis of the current enhanced composite estimate may be made to identify significant situations (e.g., where the enhanced composite estimate generated by a model deviates from the consensus estimate (or other bench mark) by certain user specified criteria.

Figure 13:
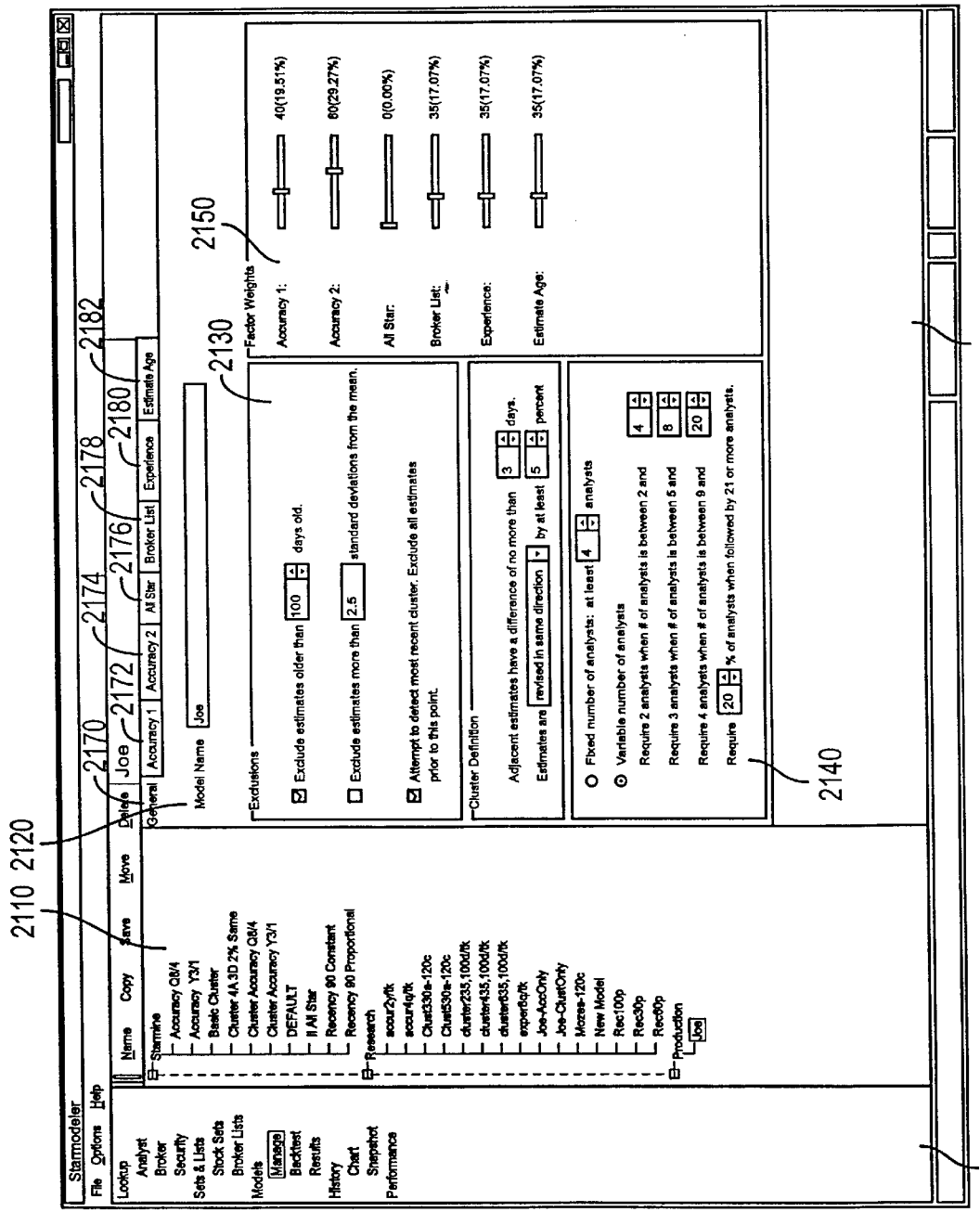
FIG. 13 illustrates an example of a Model/Manage module according to an embodiment of the present invention.

With reference to FIG. 13, Models functions are accessed from the Models/Manage module in Navigator 210, as shown, includes options to manage models, backtest models and show results. The Models/Manage module enables a user to create, edit, move, copy, delete or perform other functions on a model. As user creates a model by naming the model, specifying exclusion rules (including cluster definitions), identifying model factors, defining scoring rules, and assigning factor weights to the factors. The user may also perform other model managing functions such as saving a model, copying a model, moving a model and deleting a model.

A Models Folder window 2110 preferably contains model libraries and model names. Other organizational techniques and systems may be used. Models Folders window 2110 displays the available models to the user. Models classified under Research may be in the process of being tested. Models classified under Production are in actual use to calculate enhanced composite estimates. Other categories are also available to the user for classification.

The Models/Backtest module enables a user to test and refine models for accuracy and other criteria. The Models/Results module displays the results of the Backtests to the user. In addition, the user may visually test models through the History/Chart and History/Snapshot modules.

An example of how a user may create a model and how the model is used will now be explained. A user may create a model by identifying various exclusions and factors to be taken into account in the model and the Factor Weight to be assigned to each factor. Other steps and options may be used. According to one embodiment, the user may specify exclusions using an exclusions template 2130 as shown in FIG. 13. For each selected factor, a user may specify rules by which each non-excluded analyst is assigned an N-score (normalized score) according to the rules. The user can assign a Factor Weight to each factor to place greater emphasis on one or more factors for a given model. For each model, the analyst's N-score for each factor is multiplied by the Factor Weight to generate a Weighted N-score. These Weighted N-scores are summed for each analyst to generate a Total Factor Score for each analyst. The actual Total Weight for an analyst's current estimate is determined by normalizing the analyst's Total Factor Score, i.e., dividing it by the sum of the Total Factor Scores for all analysts. In this way, the sum of the Total Weights will equal 1.

For example, in one model a user may specify certain exclusions that will exclude certain analysts or estimates. Then assume the user selects three factors F1, F2, and F3 to use in the model. Next, the user may specify rules for each factor to assign N-scores for each non-excluded analyst. Then the user assigns Factor Weights to each of the three factors. For exemplary purposes, assume that based on these rules, three analysts A1, A2, and A3 are assigned the following N-scores and Factor Weights as detailed below.

| FACTOR | ANALYST | ANALYST N-SCORE BY FACTOR (N) | FACTOR WEIGHT (W) |
| --- | --- | --- | --- |
| F1 | A1: | N1 = 0.7 | F1W = 0.6 |
|  | A2: | N2 = 0.2 |  |
|  | A3: | N3 = 0.1 |  |
| F2 | A1: | N1 = 0.5 | F2W = 0.3 |
|  | A2: | N2 = 0.5 |  |
|  | A3: | N3 = 0.5 |  |
| F3 | A1: | N1 = 1.0 | F3W = 0.1 |
|  | A2: | N2 = 1.0 |  |
|  | A3: | N3 = 1.0 |  |

Factor Weights ("FW") may be assigned for each factor depending on the relative importance as determined by the user. For example, for this model, the user determined Factor 1 to be most important and assigned it a Factor Weight of 0.6. Factor 2 was assigned Factor Weight of 0.3 and Factor 3 was assigned a Factor Weight of 0.1. The analysts' N-scores for each factor is then multiplied by the Factor Weight and those Weighted N-scores are summed for each analyst to generate a Total Factor Score for each analyst.

For A1, Total Factor Score=(0.7×0.6)+(0.5×0.3)+(1.0×0.1)=0.67

For A2, Total Factor Score=(0.2×0.6)+(0.5×0.3)+(1.0×0.1)=0.37

For A3, Total Factor Score=(0.1×0.6)+(0.5×0.3)+(1.0×0.1)=0.31

The Total Factor Score for each analyst is then divided by the sum of the Total Factor Scores for all analysts to determined a Total Weight. In this example, the sum of the Total Factor Scores for all analysts is: 0.67+0.37+0.31=1.35

Thus, the Total Weight for analyst is calculated as follows:

For A1, Total Weight=0.67/1.35=0.496

For A2, Total Weight=0.37/1.35=0.274

For A3, Total Weight=0.31/1.35=0.230

To generate the enhanced composite estimate in this model, these analysts' current estimates are multiplied by the analysts' Total Weight.

For example, assume A1 has a current estimate of 1.50, A2 has a current estimate of 1.20 and A3 has a current estimate of 1.25. The calculated mean equals (1.50+1.20+1.25)/3=1.317. However, if the model described above is applied to the estimates, the enhanced composite estimate equals (1.50×0.496)+(1.20×0.274)+(1.25×0.23)=1.36. Thus, the enhanced composite estimate differs from the consensus by 0.11 or nearly 10%. This may signal that the stock is undervalued.

With reference to FIG. 13, a more detailed explanation of how models are created will now be provided.

To create a model, from the Navigator 210, the user can select Models/Manage. The general appearance of the display will include the Navigator 210, a Models folders section 2110, a Main Display window 2160 including an Exclusions area 2130 (or other mechanism to enable selection display of various factors and other criteria relating to models) and a Factor Weights display and selection mechanism 2150. A tool bar (or other mechanism) will also be displayed to enable a user to select one or more of New, Copy, Save, Move, Delete or other functions.

By clicking New on the menu bar, a dialog box will appear with a text box for entering the name of the user's new model. The user can type the name of the new model. As shown, the user has entered the name "Joe". The model name appears in a model name header in box 2120.

The user can define the factors for the new model, as detailed below.

By clicking Save, the new model is saved to the server (or elsewhere). By default, the new model may be saved in the Research Library as shown in Models Folders window 2110.

One aspect of the invention is the great flexibility offered to users in defining the factors for a model. For example, FIG. 13 illustrates an example of a screen for defining a model according to one embodiment. According to an embodiment, for each factor that the user may select from, a corresponding tab number is provided. When the user selects a tab, a factor template is displayed in Main Display window 2160. The user may also define Factor Weights in Factor Weights area 2150. For example, a user may assign Factor Weights for a given model for various factors such as one or more of Accuracy, All Star rating, Broker List, Experience, Estimate Age, and other factors attributes or performance metrics (e.g., Accuracy 1 and Accuracy 2, or other metrics). The user may assign relatively greater or lesser importance or weight to a Factor. One mechanism for doing this is sliding scale bars as shown in Factor Weights area 2150. By sliding scale bars to the right (for more importance) or left (for less importance). By assigning a zero weight to a factor, the user can effectively exclude a factor from a particular model.

The factors are elements of a model that enables a user to filter out or place less weight on weak analyst estimates and include or place more emphasis on ones which based on historical data, likely will be more accurate. Factors may be based on known predictors of estimate accuracy. For each factor, the user may define the rules for assigning a value for each factor. For example, the user may define rules for determining relative error percentage with respect to Accuracy 1. In addition, the user may also assign an N-score to each factor. For example, in assigning an N-score to an All Star factor, the user may assign an N-score of 1.00 to an analyst with All Star status while providing 0.25 to an analyst with non-All Star status.

In the example of FIG. 13, the user has defined a model by first assigning a model name (e.g., "Joe") under General tab 2170. The user may specify certain exclusion factors in Exclusion area 2130. For example, various exclusion factor options may be presented to the user. The user can select (e.g., by check box) exclusion factors to be used and can customize each option by specifying user selected exclusion factor criteria on a model-by-model basis. For example, as shown in FIG. 13, the displayed exclusion factors include: (1) estimates that are older than a user-specified number of days; and (2) estimates that are more than a number of standard deviations from the mean. This system may also give a user an option to detect clusters (detailed below). Other exclusion factors may be provided or created by a user. For example, an exclusion may be provided for estimates older than a user-specified amount of time before or after a company's last earnings report date. In the example of FIG. 13, as shown in Exclusions area 2130, the user has selected the exclude days old factor and cluster detection. In the exclude days old factor, the user has specified 100 days as the cut-off. One advantage of the modular nature of the invention is that in creating models a user can view estimate data while creating a model to assist in deciding on user-specified values. In this example, the user has not selected the exclude standard deviations factor in Exclusion area 2130, so it is not used in this model.

Another aspect of the invention is the ability to define and use cluster detection factors. The user may define clusters and cluster factors in Cluster Definition area 2140. A cluster is a grouping of estimates or revisions made by one or more different contributors satisfying certain conditions, e.g., estimates or revisions made within a certain interval of time or other conditions. Clusters can assist users in identifying potentially meaningful trends, changes in conditions, or other occurrences. For example, if a number of analysts suddenly revise estimates, those estimates may be based on recent news. Clusters can be used to help identify more meaningful estimates. Preferably, a user may define the criteria by which the user wants to define a cluster. For example, the user may specify the maximum time between one estimate and another estimate of another analyst for the two estimates to be considered part of the same cluster or cluster candidate. In FIG. 13, for example, a cluster definition template is displayed to facilitate the definition of a cluster. As shown, the time between estimates has been defined as 3 days in Cluster Definition area 2140. Further parameters may be specified by the user in qualifying a cluster candidate as a cluster. For example, parameters may include enabling a user to specify restrictive, qualifying criteria on revisions including the condition that only revisions in the same direction (or any direction) qualify, or that only revisions of at least a user-specified magnitude qualify. In addition, the user may specify the minimum number of new estimates or qualifying revisions that are required to define a cluster. The number of new estimates or qualifying revisions may either be a fixed number of analysts or a variable number of analysts, for example, depending on the number of analysts with active estimates for the event as of the day for which the enhanced composite estimate is being calculated. The user may specify the number of analysts needed to define a cluster as a finction of the number of analysts, or a percentage of analysts, following the stock. Further, an exclusion factor may include a user-selectable option to exclude estimates that are older than the date of the last-detected user-defined cluster.

FIGS. 14–18 further illustrate examples of how a user can select factors for inclusion in a model, define rules and N-score criteria for the factor and other features. For example, with reference to FIG. 14, the user may specify various selections associated with a first performance metric, referred to as Accuracy 1, by clicking on the Accuracy 1 tab 2172. The factor's potential components and other information will appear in Main Display area 2160. The user can select details in the text boxes, check boxes, etc. Preferably, a template is displayed including a performance Metric Definition area 2210 and a N-score definition area 2220.

As shown, the Accuracy 1 metric may be used to calculate each analyst's (or source's) average Relative Error % according to user specified criteria. For example, as shown, the user may select: the number and type of fiscal periods (e.g., years, quarters, etc.); the minimum number of periods of coverage for an estimate to be included; and a window of time (e.g., number of months) prior to a report date to limit the estimates to be included for this metric. The algorithm for the average Relative Error % (and other metrics used as factors) may be created and stored in the Performance Module, described elsewhere herein.

Based on these user specified parameters, each non-excluded analyst's average relative error percentage may be calculated. This metric may be converted to an N-score for this factor based on user specified rules as set forth in the N-score Definition area 2220. The N-score area 2220 enables certain analysts to be excluded (or give a zero score for this factor) and allows other analysts to be given a score by error rank.

In this example, an N-score may be assigned by Error Score, Error Rank, equally to all or a user specified number of top qualifying analysts (based on relative error percentage), or other options in N-Score area 2220.

Figure 14:
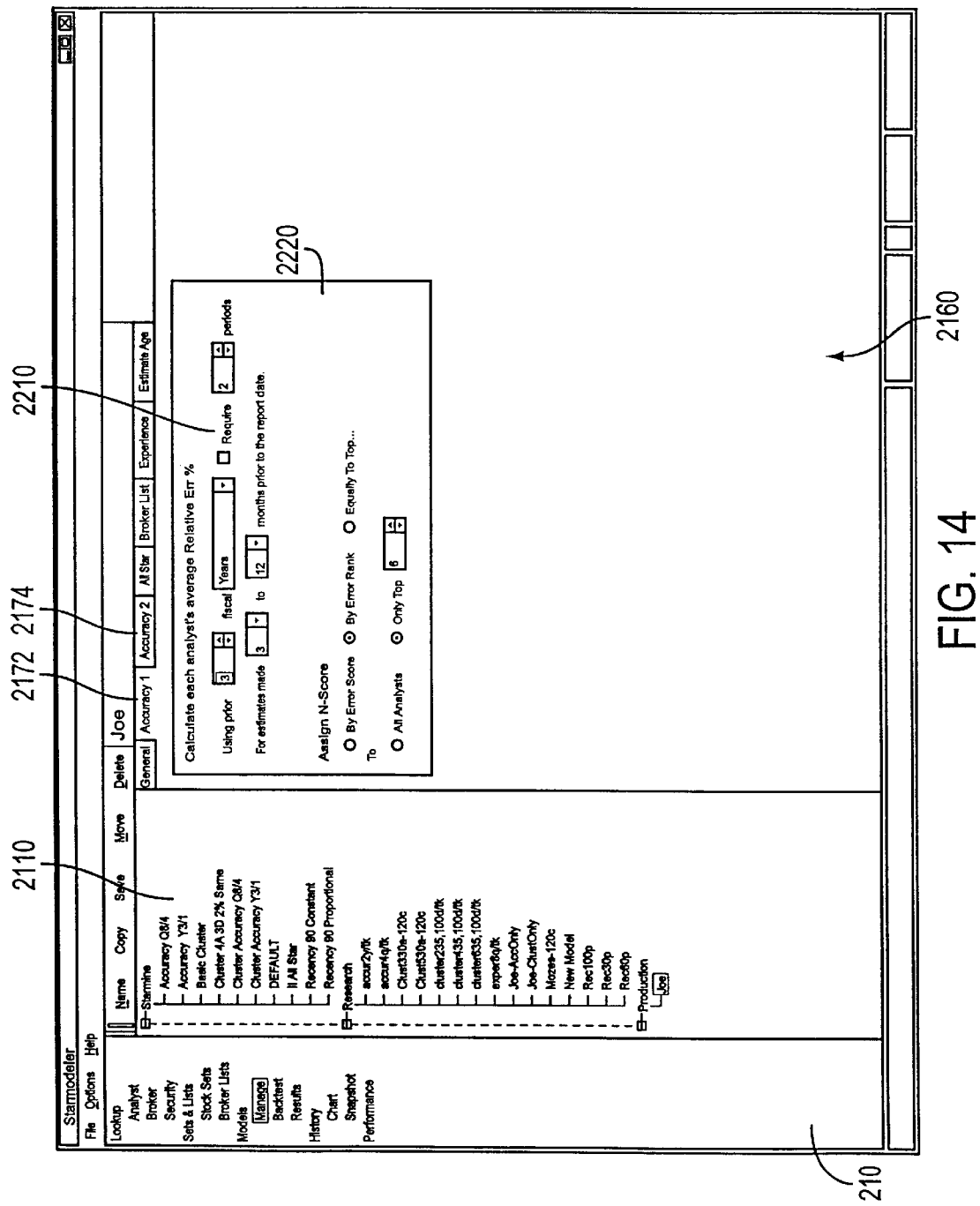
FIG. 14 illustrates an example of an Accuracy factor according to an embodiment of the present invention.

In the example of FIG. 14, a user has the option to use other performance metrics (e.g., a second accuracy metric as shown by Accuracy 2 tab 2174. Elsewhere is this application is a description of Performance metrics. One or more of these metrics and other metrics may be used in creating models. Preferably, each has a corresponding tab that when selected displays a template similar to that shown in FIG. 14 but customized for the particular metric.

Figure 15:
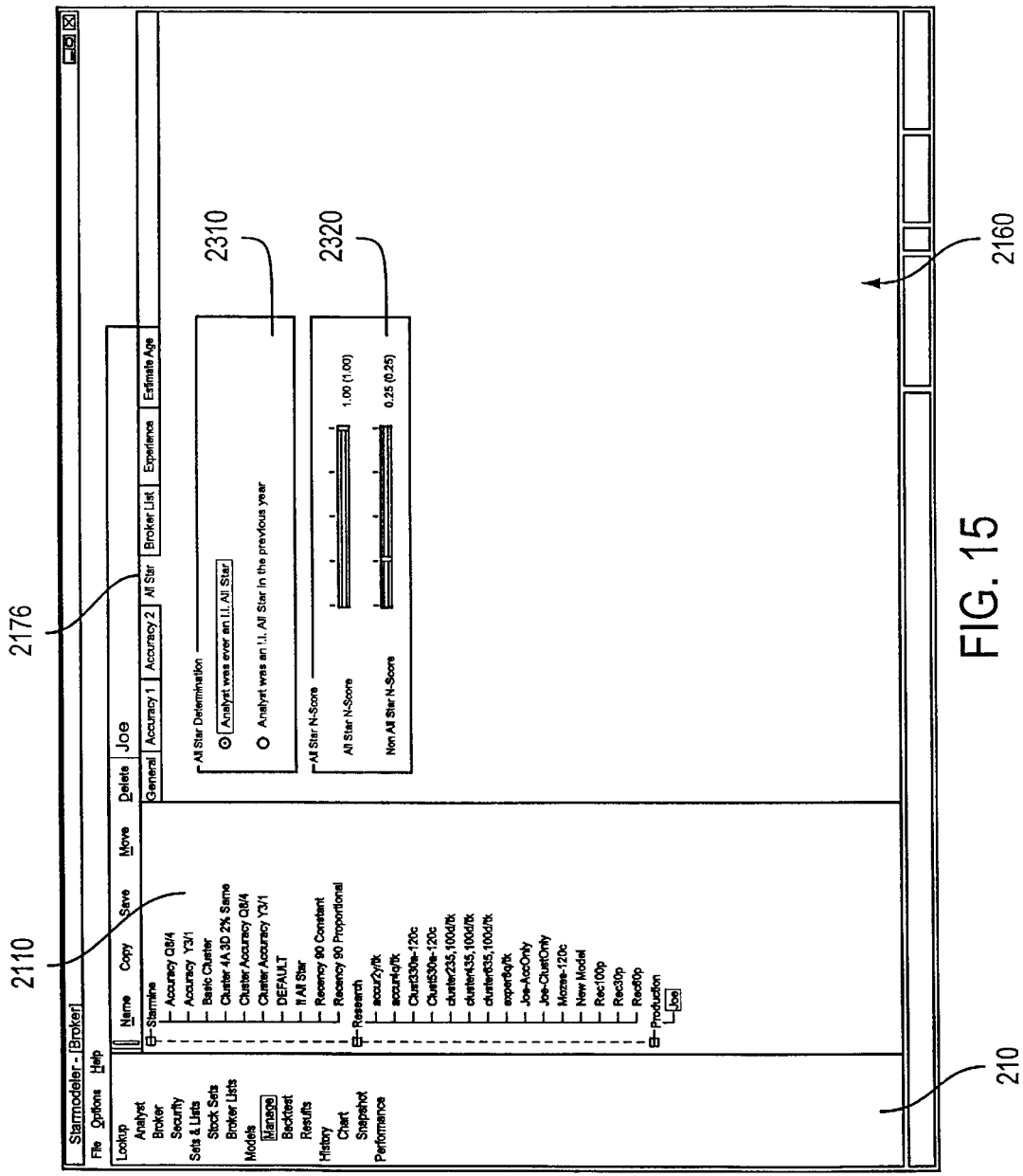
FIG. 15 illustrates an example of an All Star factor according to an embodiment of the present invention.

In addition to performance metrics, a model may include one or more analyst and/or broker attributes. Examples of such attributes may include All Star qualification, Broker List affiliation, Experience, and Estimate Age. Other attributes that may bear on estimate performance may be used. As shown in FIG. 15, for example, a user may include as a Factor Weight an All Star (or other) rating, by selecting All Star tab 2176. An All Star rating is a known rating given to some analysts by Institutional Investors based on a published analyst survey. If this factor is used, in All Star Determination area 2310, the user may specify the criteria relating to an All Star rating. As shown, the criteria may include whether the analyst was ever an All Star or whether the analyst was an All Star the previous year. Specific N-score may be assigned to All Stars and non-All Stars based on he parameters selected in All Star N-Score area 2320. For example, analysts meeting the All Star criteria specified in All Star Determination area 2310 may be given an N-score of 1 for this factor and those not meeting the criteria may be given a lower score (e.g., 0 or 0.25).

Figure 16:
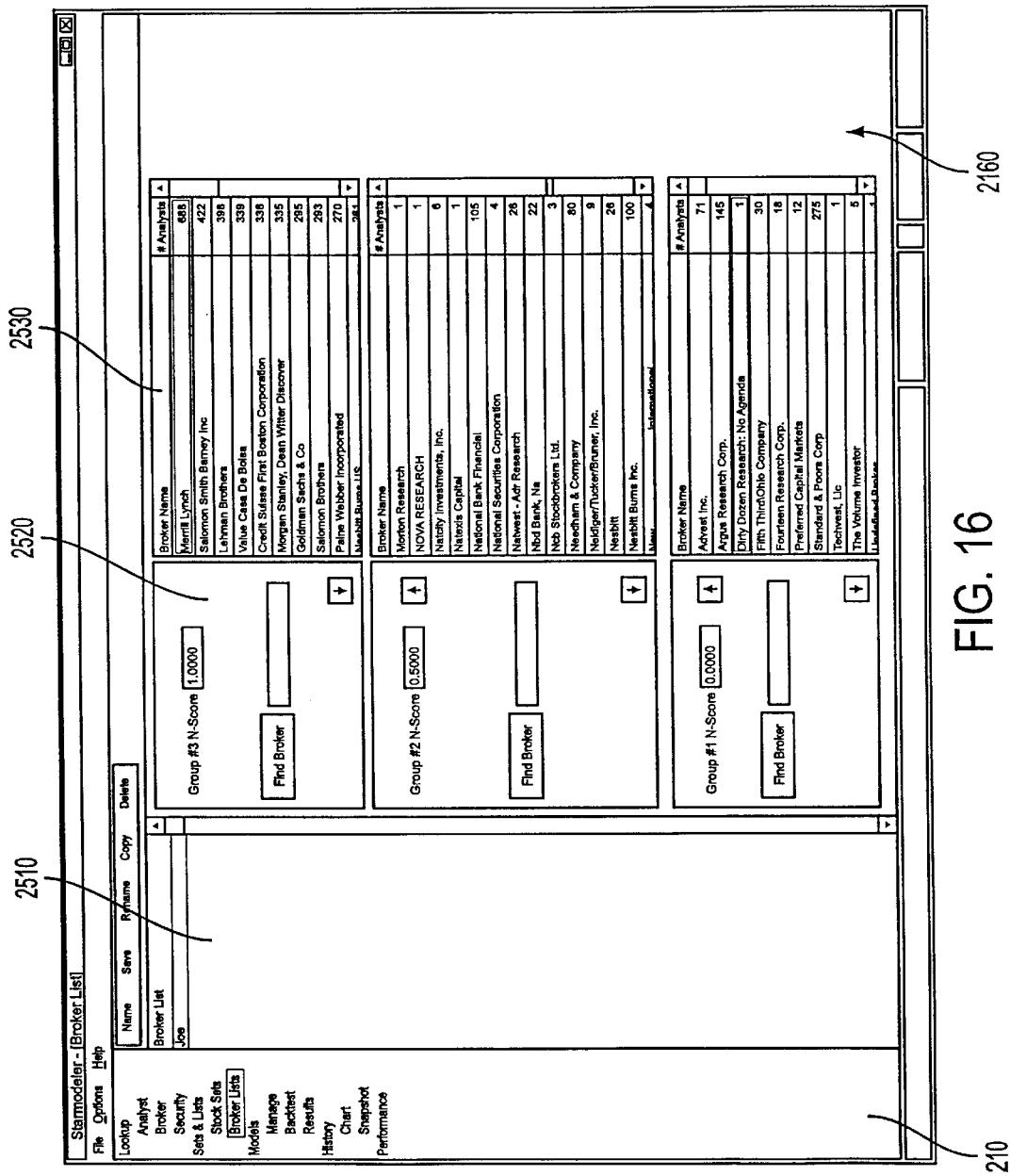
FIG. 16 illustrates an example of a Broker List factor according to an embodiment of the present invention.

As shown in FIG. 16, the user may include a Broker List factor in a model by selecting Broker List tab 2178 (FIG. 13). The Broker List attribute takes into account attributes of a particular broker (e.g., a broker with whom an analyst works). As shown, a user may create and store multiple broker lists (e.g., in Broker List Folders area 2510). Each broker list includes a list of brokers selected by a user, grouping criteria for grouping brokers in the list of brokers and rules for assigning an N-score to each group. A user may divide broker lists by size, reputation, historical accuracy, affiliation with a stock (e.g., market maker, etc.), or other criteria. FIG. 16 illustrates a Broker List definition screen including Broker List Folders area 2510 from which a user may select a broker list or to which a newly created list may be saved. In Group N-Score area 2520, the user may designate N-score values for each group. In Broker Name/info area 2530, the user may view the brokers and other information (e.g., size, status, historical metrics, etc.). User specified rules may be created to group brokers or it can be done manually. Other techniques may also be used. In the example of FIG. 16, the brokers in Group #3 are assigned an N-score of 1.000, the brokers in Group #2 are assigned an N-score of 0.5000, and the brokers in Group #1 are assigned an N-score of 0.0000.

For example, larger brokerage firms or firms with better reputations may be classified in Group #3 and given a higher N-score. The user may assign N-scores to each broker or group of brokers and store the set of N-scores in a broker list for use in other models.

Figure 17:
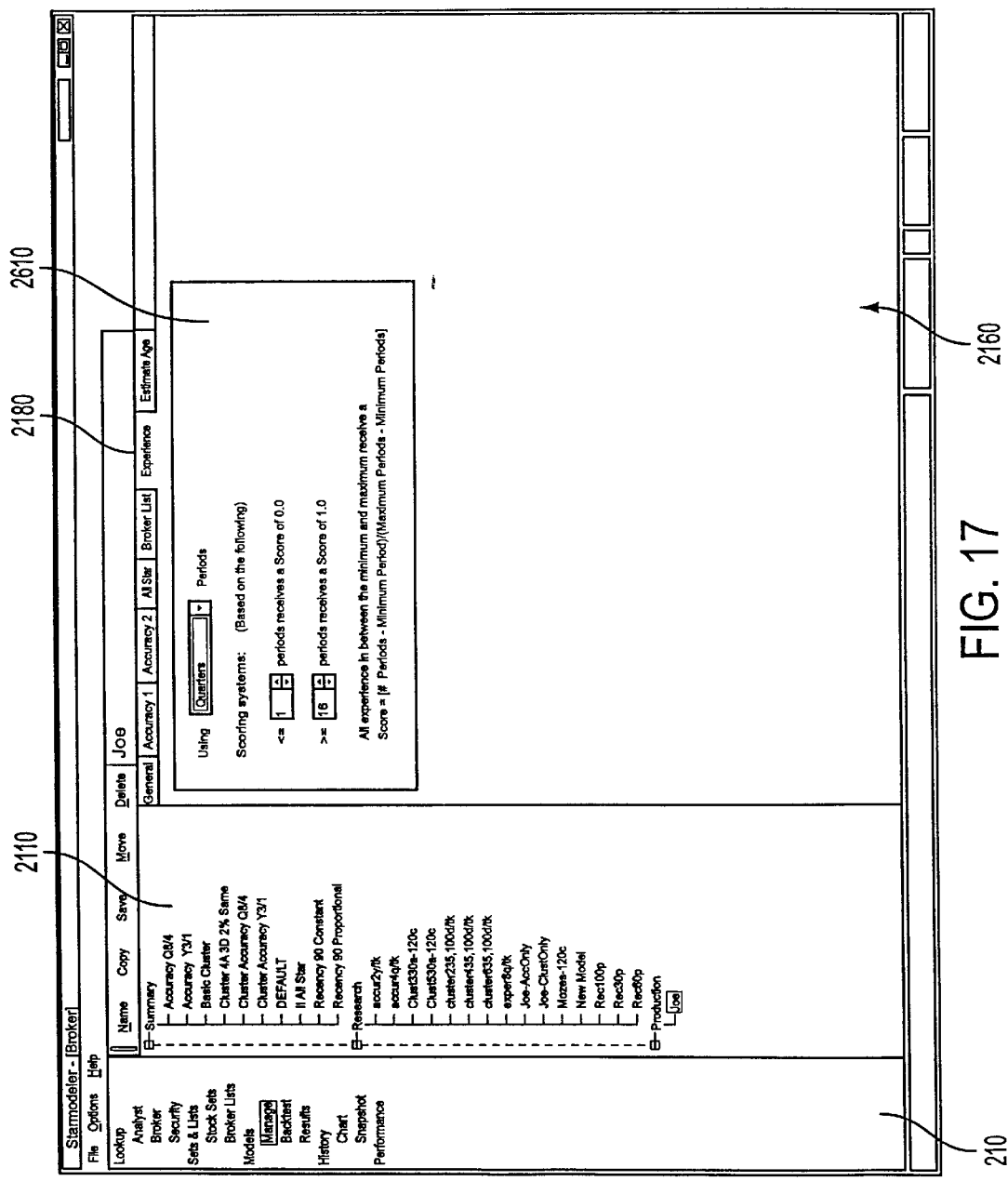
FIG. 17 illustrates an example of an Experience factor according to an embodiment of the present invention.

Another factor that may be used in creating a model is an analyst's experience (generally, with a particular stock, within a particular industry or other criteria), by selecting Experience tab 2180 (FIG. 13). As shown in FIG. 17, through Experience Definition area 2610, the user specify rules and criteria to assign an N-score to analysts based on the analyst's experience. For example, the score can be based on a designated period type, such as number of years or quarters for which the analyst has made estimates for a particular security. For example, the user may define a scoring system based on the amount of time an analyst has followed a stock, whereby if an analyst has estimates for less than a first selected number of periods, the analyst receives a score of 0.0 for this factor and if the analyst has estimates for greater than a second selected number of periods, the analyst receives a score of 1.0 for this factor. Optionally, analysts with experience between the first and second numbers of periods may be assigned a pro-rated score. For example, the N-score for each analyst may be defined as using the following formula:

$$N\text{-score}=(\#Periods-Minimum\ Periods)/(Maximum\ Periods-Minimum\ Periods).$$

In this case, the #Periods is the number of periods for which the analyst has covered the stock, Minimum and Maximum periods correspond to the first and second user-selected number of periods. Other functions for converting the number of periods of analyst coverage for a security into an N-score for the contributor experience factor for each analyst may also be used.

Figure 18:
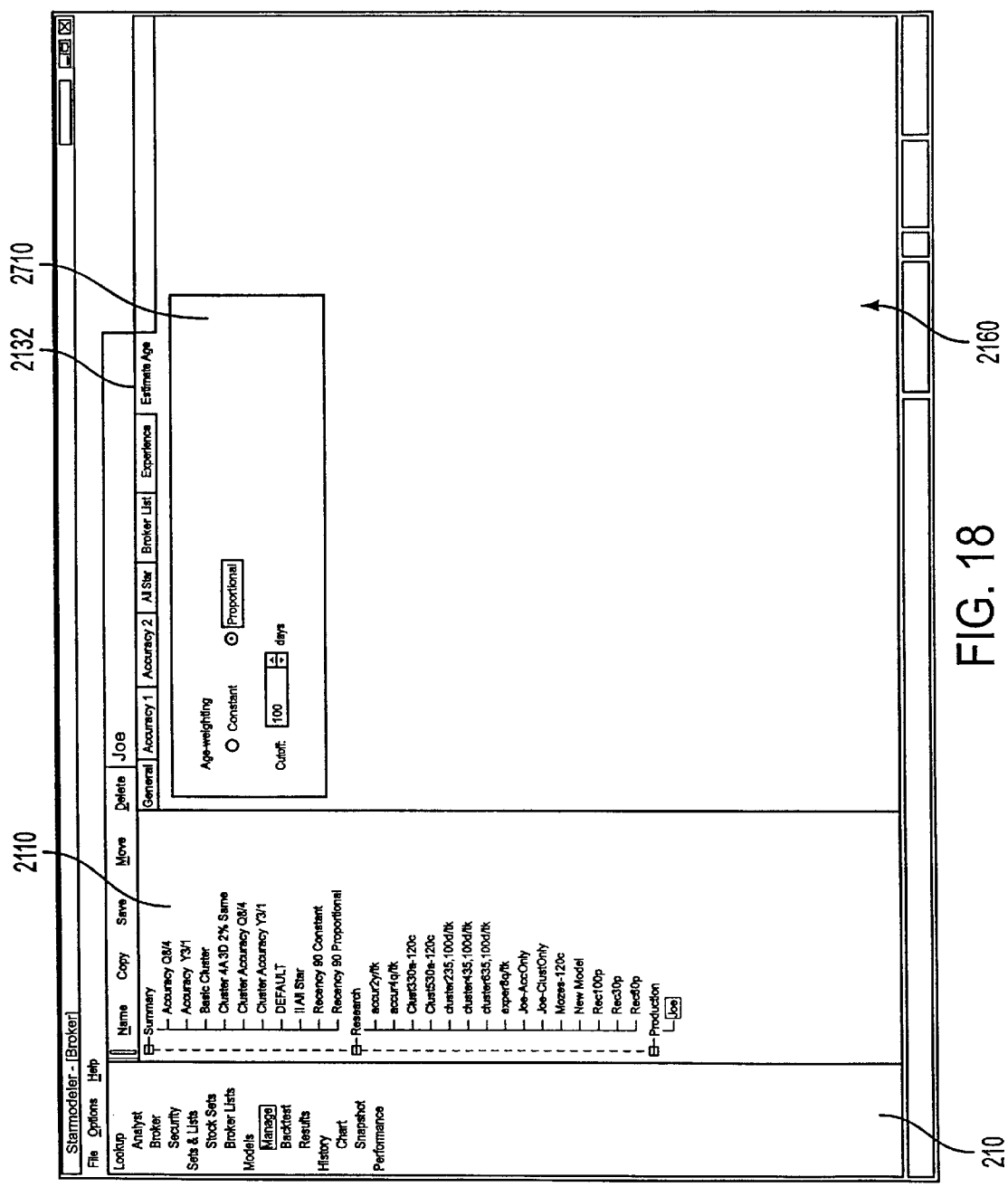
FIG. 18 illustrates an example of an Estimate Age factor according to an embodiment of the present invention.

As shown in FIG. 18 the user may include Estimate Age (or recency) as a factor, by selecting Estimate Age tab 2182. For example, a recency factor may exclude estimates from earnings calculations if they are older than a specified number of days. This may be based upon the assumption that a more recent estimate is likely to be based upon relatively new and accurate information which may affect a company's earnings potential and, therefore, is more likely to be predictive of a company's actual earnings. When applying the model with the recency factor to historical data, the resulting estimate typically is more accurate in predicting a stock's earnings because it has excluded old, less reliable, estimates. Age-weighting may be defined as constant or proportional with a user-defined cutoff in Estimate Age area 2710. Thus, the user may filter out estimates that are older than the number of days specified. By choosing constant age weighting, the same weight is given to all estimates, for this factor. By choosing proportional age weighting, less weight may be assigned to older estimates on a sliding scale.

Other factors may be assigned user-defined weights for more accurate results. For example, a leadlag score factor may be assigned a weight by the user. The leadlag score factor is the number of leading estimates minus the number of lagging over the total estimates. The scoring system may involve assigning a score of 0.0 or 1.0 depending on whether an analyst's leadlag score is lower or greater than a user defined number. In addition, the mean time between revisions may be included as a factor. This factor filters out estimates of analysts who revise estimates infrequently or relatively infrequently compared to other analysts. For example, an analyst with a mean time between revisions of less than 80 days may receive a score of 1.0 while an analyst with a mean time between revisions of more than 120 days may receive a score of 0.0.

A user may specify adjustments to be made to one or more non-excluded estimates, where the adjustments are based on one or more factors, such as historical analyst bias, historical aggregate analyst bias as a finction of time prior to period report date, analyst's firm's relationship with the security's issuer, the security's historical performance relative to consensus estimates, or other factors.

Based on the historical information for each analyst, an adjustment factor may be calculated. The adjustment factor may represent an analytical "bias" which may or may not be incorporated into each analyst's earnings estimate, for a particular security, over a given period of time. For example, an analyst who has, over a specified time period, issued earnings estimates for a particular company that were, in hindsight, on average 5% too high, might be assigned an adjustment factor of 0.95, such that the analyst's issued estimate over the specified time period is reduced by five percent. Conversely, an analyst who has historically issued estimates over a specified time period that were, in hindsight, on average too low might be assigned an adjustment factor of 1.10 for that performance analysis set, such that his actual reported estimate for that time period is effectively increased by ten percent.

Although the adjustment factor calculated for any given performance analysis set may be stored in the system's database, adjustment factors may be generated in real time in response to user-defined inputs. As indicated above, the calculation of an adjustment factor may be based, at least in part, upon a comparison of the historical earnings estimates issued by an analyst, for a given security followed by that analyst, over a particular time period. A user may define analysis parameters and metrics such that the determination of an adjustment factor may take into account an analyst's historical percentage error as compared to actual earnings, generally available consensus earnings estimates, custom composite adjusted earnings estimates, or other metrics.

The user may also assign a scaling factor to be applied in the calculation of the adjustment factor for a given performance analysis set. For example, a user may define a performance analysis set such that, for that analysis set, a particular analyst is shown to have issued estimates that were on average 20 percent greater than actual earnings. The user may then assign a scaling factor, such as 0.5, to be multiplied by the 20 percent error. Thus, the effective adjustment factor for that user-defined performance analysis set reflects a 10 percent and not a 20 percent adjustment—i.e., an adjustment factor of 0.9, rounded to the nearest tenth. Thus, in this particular example, the user "discounted" the analyst's earnings estimate bias as indicated by the system's calculations. A formula for the calculation of the adjustment factor is set forth below:

$$[1/(1+(\text{Error metric}*\text{Scaling factor}))]$$

The adjustment and weighting factors described above may be used alone or together to calculate a custom composite estimate to arrive at a more accurate estimation of a company's earnings. According to one embodiment, custom composite estimate is calculated by multiplying an analyst's current earnings estimate (for a given security, and event) by its corresponding adjustment and weighting factors for that given performance analysis set. The results for each estimate for each analyst of interest may then be summed to arrive at the custom composite estimate. Thus, the calculation of a custom composite estimate provides investment managers and others with an improved method for determining the accuracy of an analyst's earnings estimates and predicting the actual earnings of a company over any given period of time.

Under the Models/Manage module, the user may perform managing functions to maintain models. Such managing functions include for example, saving, copying, editing, moving, and deleting models.

The user can save models using commands in the Models/Manage module. The user can use the Save function to save changes in an existing the model, or save new models. To save a model:

1. From the Navigator 210, the user can select Models/Manage.
2. The user can select a model from Models Folder window 2110, or create a new model.
3. The user can create a new model or make the desired changes.
4. The user can click Save on the menu bar to save the selected model to a desired folder.

Models may be stored on a server so that authorized colleagues and other individuals may access these models. When a user runs a model against the historical database, the server applies the factors to the estimates specified by the user and produces an estimate based on the model. In addition, once a model has been designed, the user may apply the model to a range of stocks, such as a defined stock set. The user may then be provided with a full listing of performance metrics for analysis of the model's accuracy. Because historical data where the actual earnings are known is being used, accuracy is easily determinable.

In another embodiment of the invention, once one or more models are created, these models may be backtested against historical data. Resulting performance analysis sets and corresponding custom composite estimates may then be stored in the system's database for later retrieval. In this way, a user may test such models by applying them over any previous time period, thereby essentially creating a "virtual analyst" whose hypothetical prospective performance may be compared with the historical performance of a single or plurality of analysts, or even the average historical consensus estimates for any previous time period. By conducting such tests a user may refine a model to better predict earnings.

The backtesting capability verifies a model's viability against a range of stocks, analysts, and historical periods. The backtesting capability enables the user to measure the estimating performance of one or more models by calculating an extensive range of error metrics for the model. Over specified time periods and individual or groups of stocks, the user may measure the accuracy of the model using relative error percentages and by a variety of additional metrics. When performing a backtest, the present invention calculates what the estimates would have been at each sampling point in time against the stocks in the user's set, calculates the error metrics, then presents the results in grid format so that accuracy, consistency, and availability may be easily assessed, compared to each other and compared to the calculated average of the then-current estimates.

Figure 19:
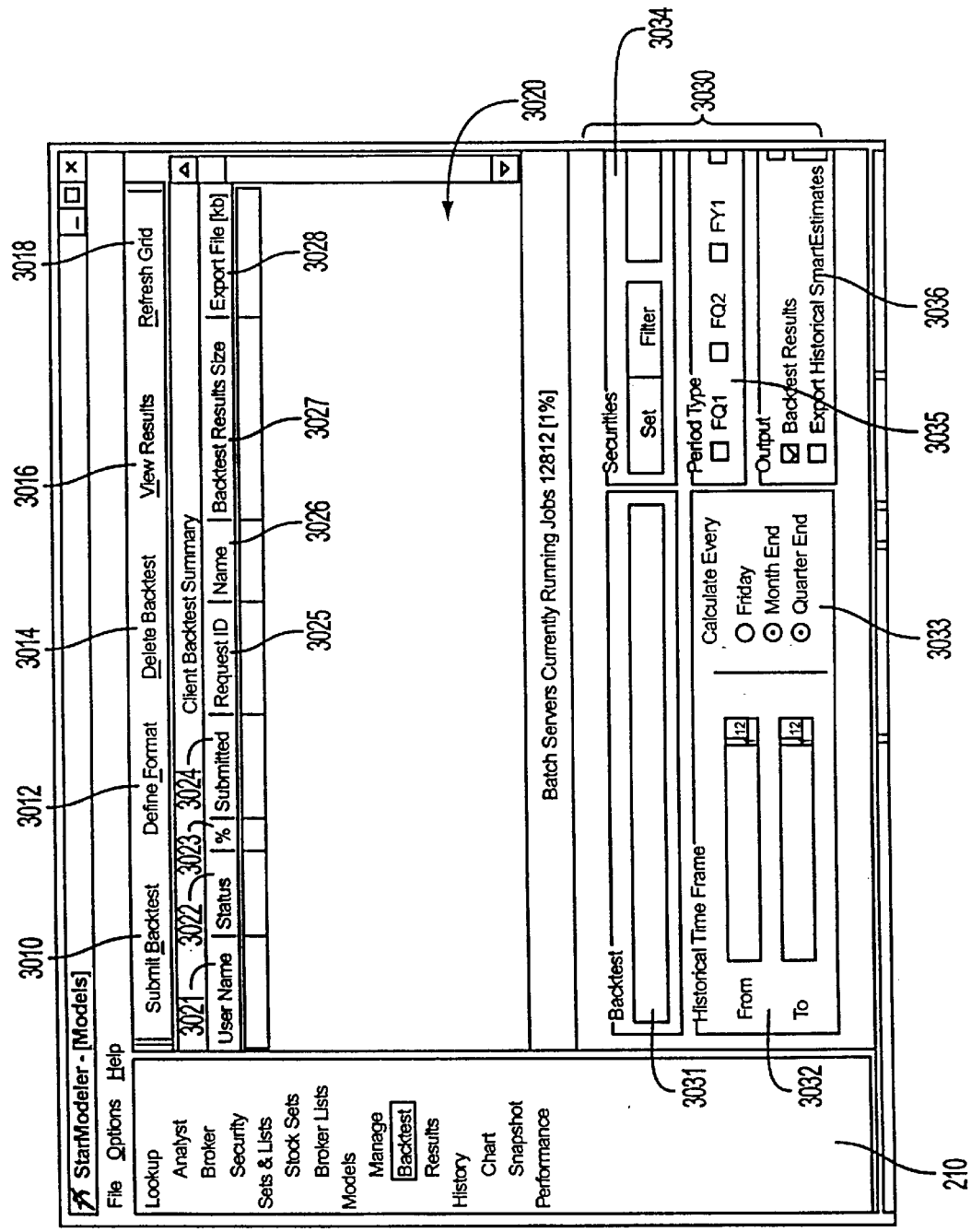
FIG. 19 illustrates an example of a Models/Backtest module according to an embodiment of the present invention.

With reference to FIG. 19, the backtester provides details about what models the user wants to test, on which stocks, over what historical time frame. Other criteria may also be specified. Once a user has created a model and stock sets to test them against, the Models/Backtest module may be used to submit the models for testing on the server using the historical database. Testing may be a batch operation at system location so each job will be queued with others. The grid in this screen shows the user the progress of the job and status of the batch server. Test results are saved on the server. To download the results, the user may select a test row and click View Results.

In FIG. 19, a user may run a backtest by selecting Models/Backtest module from Navigator 210. Various options are available to the user. For example, the user may select Submit Backtest 3010, Define Format 3012, Delete Backtest 3014, View Results 3016, Refresh Grid 3018, and other options. Backtest Summary area 3020 displays backtest information such as the name of the user who has submitted the test in User Name column 3021, the status of the job in Status column 3022, percentage of the job that is completed in % Completed column 3023, date and time the job was submitted in Submitted column 3024, an identifier assigned by the server to the job in Request ID column 3025, the name assigned to the particular backtest in Name column 3026, the file size (e.g., in KB) of the backtest in Backtest Results Size column 3027, and if the export option was used, the size of the TXT file created for export in Export file column 3028. Other information may also be available.

Backtest Summary area 3030 provides details about the currently selected backtest. This area may be read-only. To resubmit a backtest with changes, the user may right click on the backtest name and select Resubmit. The Backtest Summary area 3030 provides the information such as the backtest name in bar 3031, Historical time frame in area 3032, how often the backtest is calculated in area 3033, and the stock set or filter used, if any in area 3034. In addition, the period type in area 3035, output details in area 3036, and other information are displayed.

Figure 20:
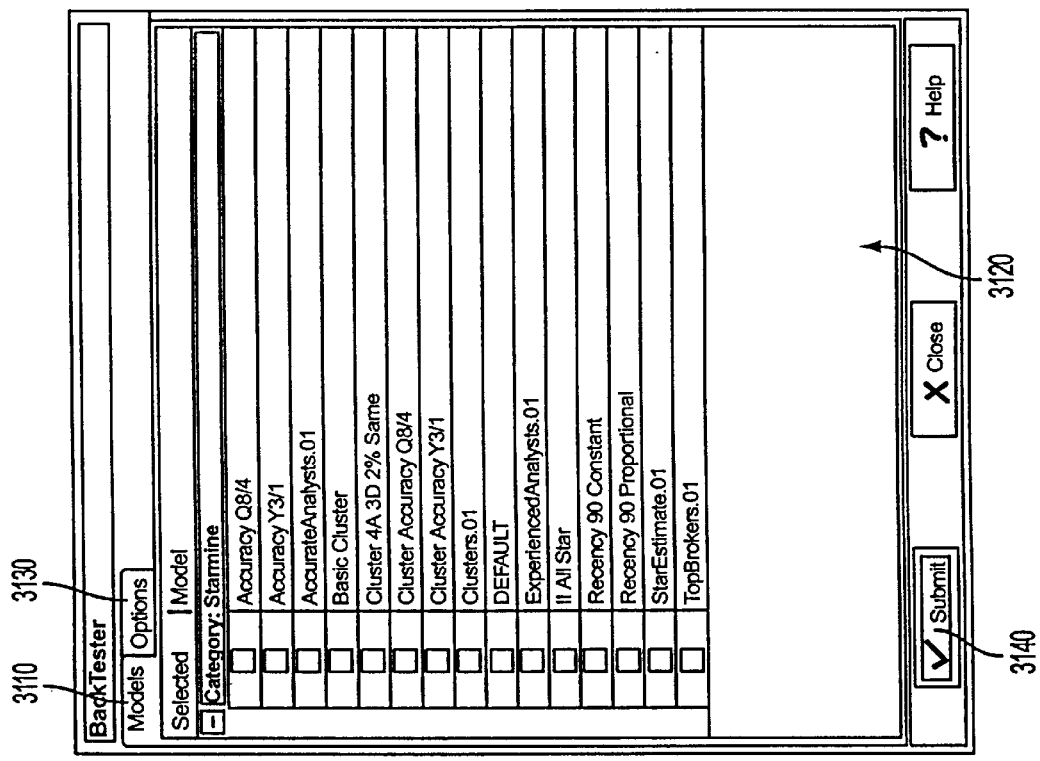
FIGS. 20–21 illustrate an example of a Backtester according to an embodiment of the present invention.
Figure 21:
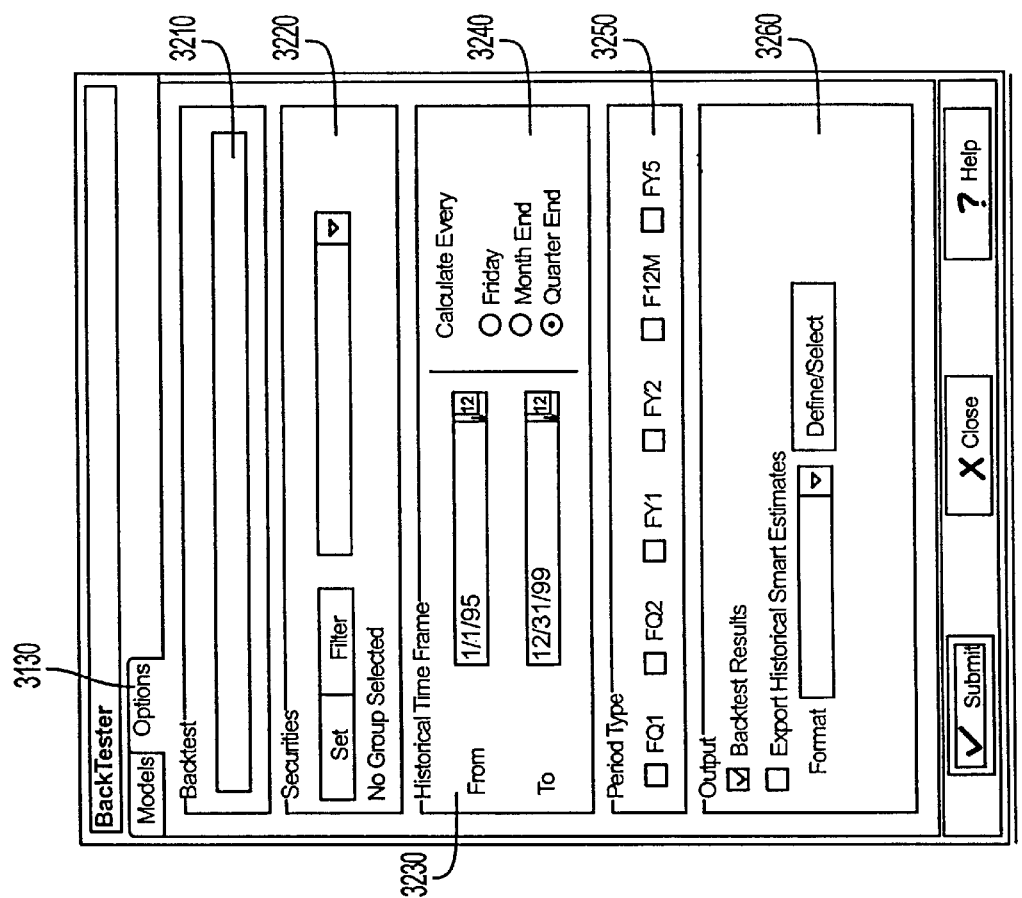

To run a backtest, the user may select Submit Backtest 3010 to display Backtester screen as shown for example, in FIG. 20, where the user may enter parameters of the test. Under Models tab 3110, the user may select the model to backtest in Backtester display 3120. By selecting the Options tab 3130, an Options screen as shown in FIG. 21 will be displayed. The user may enter a name for the backtest in Backtest bar 3210. If a name is not entered, the system will create one. In Securities area 3220, the user may select a stock set or filter to be used in the backtest. In Historical Time Frame area 3230, the user may specify the range of the backtest. In Calculate Every area 3240, the user may select how frequently the error statistics are to be sampled. The backtester will calculate enhanced composite estimates between the time frame identified in Historical Time Frame 3230 for every "As Of Date" on Friday, the calendar month end, or the calendar quarter end, or other period. In Period Type area 3250, the user may select the fiscal period type for the backtest. At a given "As Of Date", the backtester can create enhanced composite estimates for the next reported fiscal quarter after the "As Of Date" (FQ1), the next reported fiscal quarter after FQ1 (FQ2), the next reported fiscal year after the "As Of Date" (FY1), the next reported fiscal year after FY1 (FY2), other period types may also be available. In Output area 3260, the backtest results may be automatically stored in the server. When the user chooses to review the results, the results are automatically copied to the data directory on the user's workstation. The user may create a tab- or comma-delimited flat file for analysis by the user's own software by selecting the Export box in Output area 3260. This enables the user to further analyze the data in spreadsheet, database, or other software applications. The user may click on the Define/Select button to bring up a Field Specifier window, where the user may select the fields and format for an export file of backtest results.

Returning to FIG. 20, after the user has specified the parameters of the backtester under Models tab 3110 and Options tab 3130, the user may click the submit button 3140. The backtest parameters and data are then submitted to the server. When the test has been run, a Complete message will appear under Status column 3022. The user may view the test results by right-clicking on the test summary row in Backtest summary area 3020 (FIG. 19).

Figure 22:
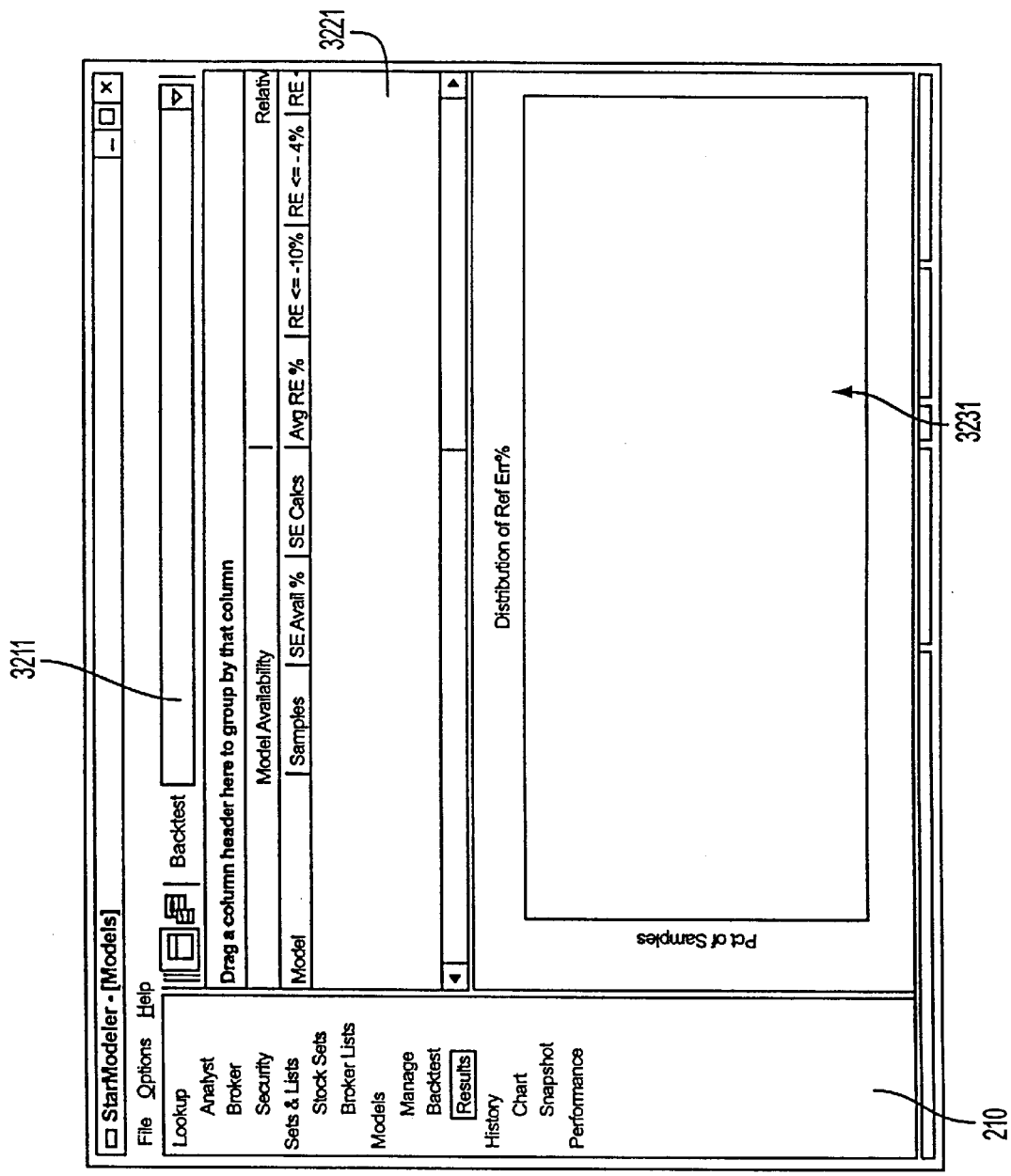
FIG. 22 illustrates an example of a Models/Results module according to an embodiment of the present invention.

To view the results of a backtest, the user may select Models/Results module in Navigator 210. In another example, the user may select View Results 3016 from Models/Backtest module as shown in FIG. 19. The name of the backtest is displayed in Backtest box 3211 (FIG. 22). From a View Format drop down list (not shown), the user may select viewing options of the results. For example, the user may select Summary Form where summary information of the models and data are displayed. The user may select to view the results by model which groups the results by model with lists of securities and data. The user may select to view the results by stock where the stocks are grouped with lists of models and data. The user may view the results in an ungrouped format which provides a sortable list of models and stocks. In Data area 3221, the user may view result information regarding Model Availability, Relative Error %, Outlier Performance, and other information. For example, under Model Availability, the user may view the Model name, Number of samples, Estimate Availability and Estimate Calculations. Under Relative Error %, the user may view the Average Relative Error Percentage, the Relative Error Percentage less than or equal to −10% or other percentage. Under Outlier Performance, the user may view 0.5 Standard Deviation, 0.5 Standard Deviation with RE factor, and other information. The user may also view the results in a chart format in Distribution chart 3231 which shows distribution of the current stocks' error metrics.

To find out quickly whether the user's new model is more accurate than the consensus, the user can test it against historical data for a single stock and compare its accuracy with the consensus in the History Chart.

Figure 23:
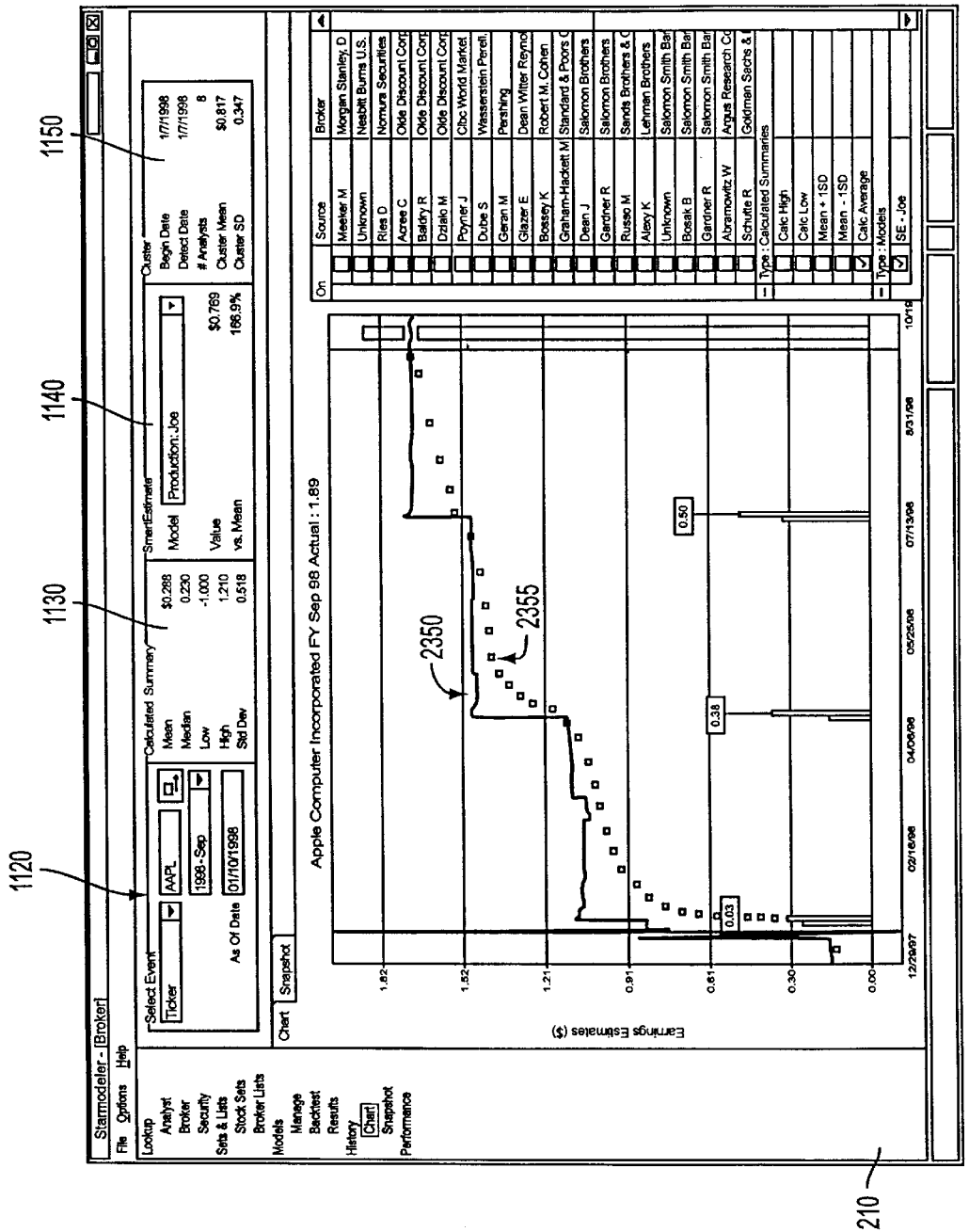
FIG. 23 illustrates an example of a model applied to historical data according to an embodiment of the present invention.

The present invention enables a user to visually test a model as applied to historical data. FIG. 23 illustrates a model applied to historical data. In this example, the user has selected "Production: Joe" as the model, as shown in Model Selection area 1140. The results of the model as applied to the time frame indicated by the chart are shown in a designated color (the bolder line 2350 in FIG. 23). The user may compare the model with the calculated average (shown as line, or other estimate, shown in the chart by a different color (the lighter line 2355 in FIG. 23). Although the two lines are similar in trend, appearance and final estimate, the model as applied to the historical data provides valuable information to the user. For example, the model as applied to the historical data shows increases (or jumps) in estimates before the increases in the calculated average. In other words, the model leads the consensus in estimate increases. In the example of FIG. 23, the model estimate jumped to 1.50 close to Apr. 6, 1998 while the calculated average estimate jumped to 1.50 close to Jul. 13, 1998. Similarly, the model estimate jumped to 1.65 shortly after Jul. 13, 1998 while the calculated average estimate jumped close to October, 1998. Thus, estimate and prediction information may be made available to the user several months in advance.

When developing a model, the user may chart its estimate record for any stock's historical data and find out instantly if the model is outperforming the consensus. By examining the chart lines closely, weak areas in the model may be detected. The user may then go back and refine the model, and chart again.

In another embodiment of the invention, alert services may be available to users. When a model is applied and an estimate exceeds the calculated average, or other factor, by a user-defined amount, the user may receive an alert or notification of such an event. The alert may be done via electronic mail or wireless communication or other mechanisms. The present invention when applied to stock estimates may serve to alert and inform the user of events that may persuade a user to purchase or sell a particular stock. According to one embodiment, a web site operator using the software of the present invention may offer a subscription service based on issuance of alerts. Other uses may be made of the enhanced corporate estimates.

Figure 24:
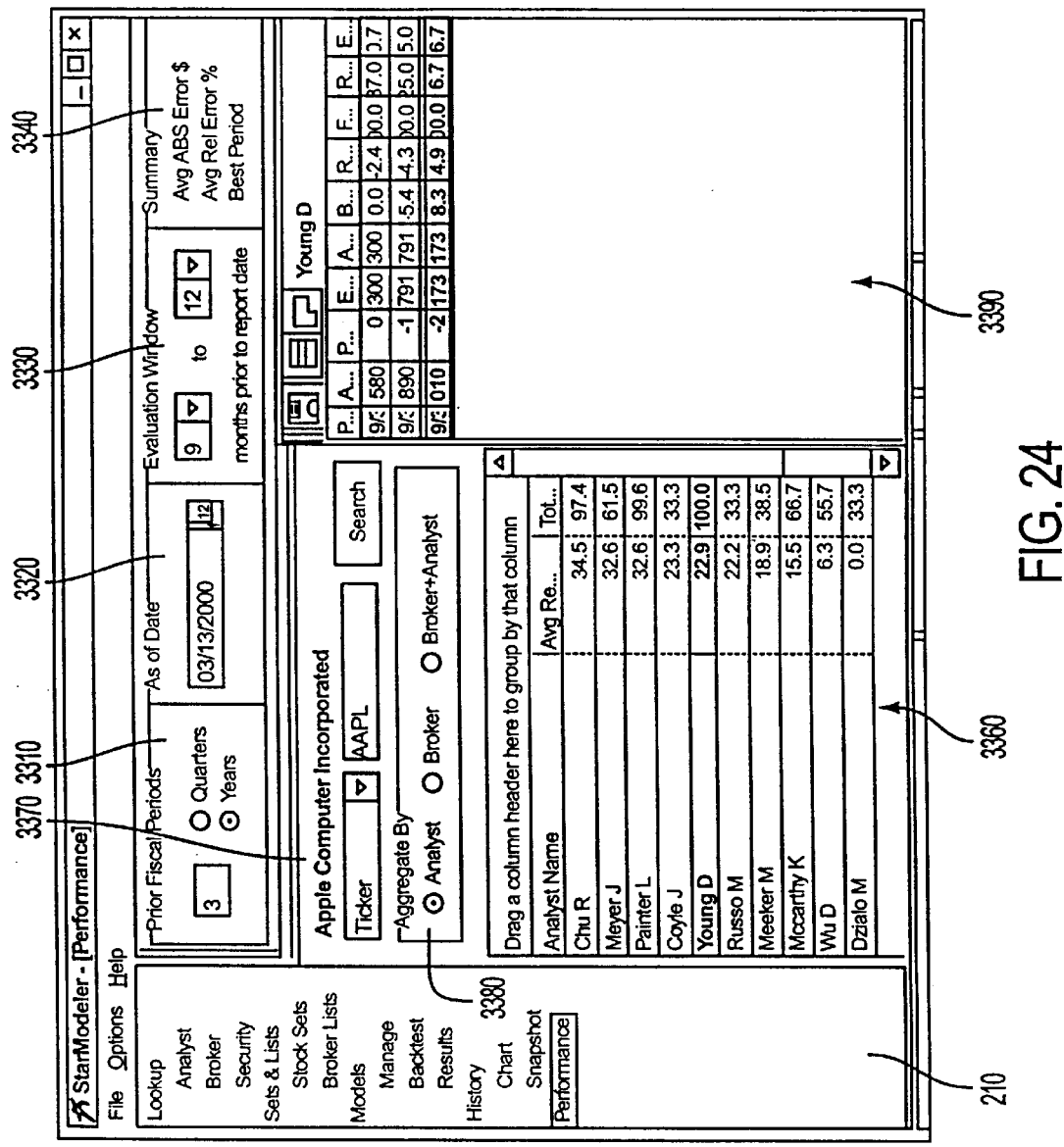
FIG. 24 illustrates an example of a Performance module aggregated by Analyst according to an embodiment of the present invention.

With reference to FIG. 24, the performance module enables a user to measure and compare analysts' performance, in absolute terms, and relative to other analysts, in estimating stock earnings. This feature is particularly useful when a user wants to determine how well the analysts in a brokerage house are doing, or which analyst has the best performance for a ticker, industry or other stock set. The performance module also provides error metrics in summary and detailed form for the analyst whose performance is being measured. The error metrics may include, for example, a raw error metric, a relative error metric, a bias error metric, a user-defined error metrics and other metrics.

A user can search by analyst or company (by ticker, company name, CUSIP, or unique ticker), and aggregate by ticker, broker and broker/ticker—or analyst, broker, and broker/analyst, respectively. Results are displayed in a grid containing various error metrics; sort by any column head with a click on the title. Graphic display of performance on a color chart.

A hierarchical sorting facility lets a user group summary or detail search results. Detail search results can be saved for further analysis.

An overview of FIG. 24 is described below.

1. From the Navigator 210, the user can select the Performance module.
2. From Search area 3370, the user can select a security for which to search. In this example, the user has elected to aggregate results by analyst.
3. If desired, the user can update search criteria at the top of the screen: Number and type of prior Fiscal Periods in Periods area 3310, "As Of Date" in Date area 3320 and a time frame in Evaluation area 3330. The invention will update the Summary Grids 3360 based on the new criteria. For the selected "As Of Date," summary metric details will appear at Summary area 3340.
4. The user can aggregate the findings in Aggregation area 3380 by selecting Analyst, Broker, or Broker+Analyst. The Summary Grid 3360 will update accordingly.
5. The user can select an analyst (e.g., D. Young) for further study in Data Screen 3390. The user can examine the detailed calculations that created them. Details behind selected summary calculations appear in Data Screen 3390. The user can rearrange the detail grid by moving its column headings. The user can right-click on a detail line for further options.

A user can aggregate the summary information by analyst, broker, or a combination of the two. When a user selects a summary line (e.g., an analyst), a complete range of error metrics is displayed in the Data Screen 3390 for further analysis.

One example of the significance of the aggregation feature is typified when an analyst switches from one brokerage firm to another. If a user selects to aggregate by analyst, all of the analyst estimates regardless of which brokerage team the analyst is affiliated with at the time the estimates is made may be sampled. In other circumstances, a user may wish to aggregate by broker, particularly if the user is trying to discern any pattern or trends with respect to broker bias with respect to a particular security. The ability to aggregate by broker/analyst pair is also a useful and powerful tool in that users may determine different historical performance characteristics for a particular broker/analyst pair. For example, if a particular analyst moves from one brokerage to another, any institutional bias that creeps into the analyst's estimates may be more readily discerned.

Figure 25:
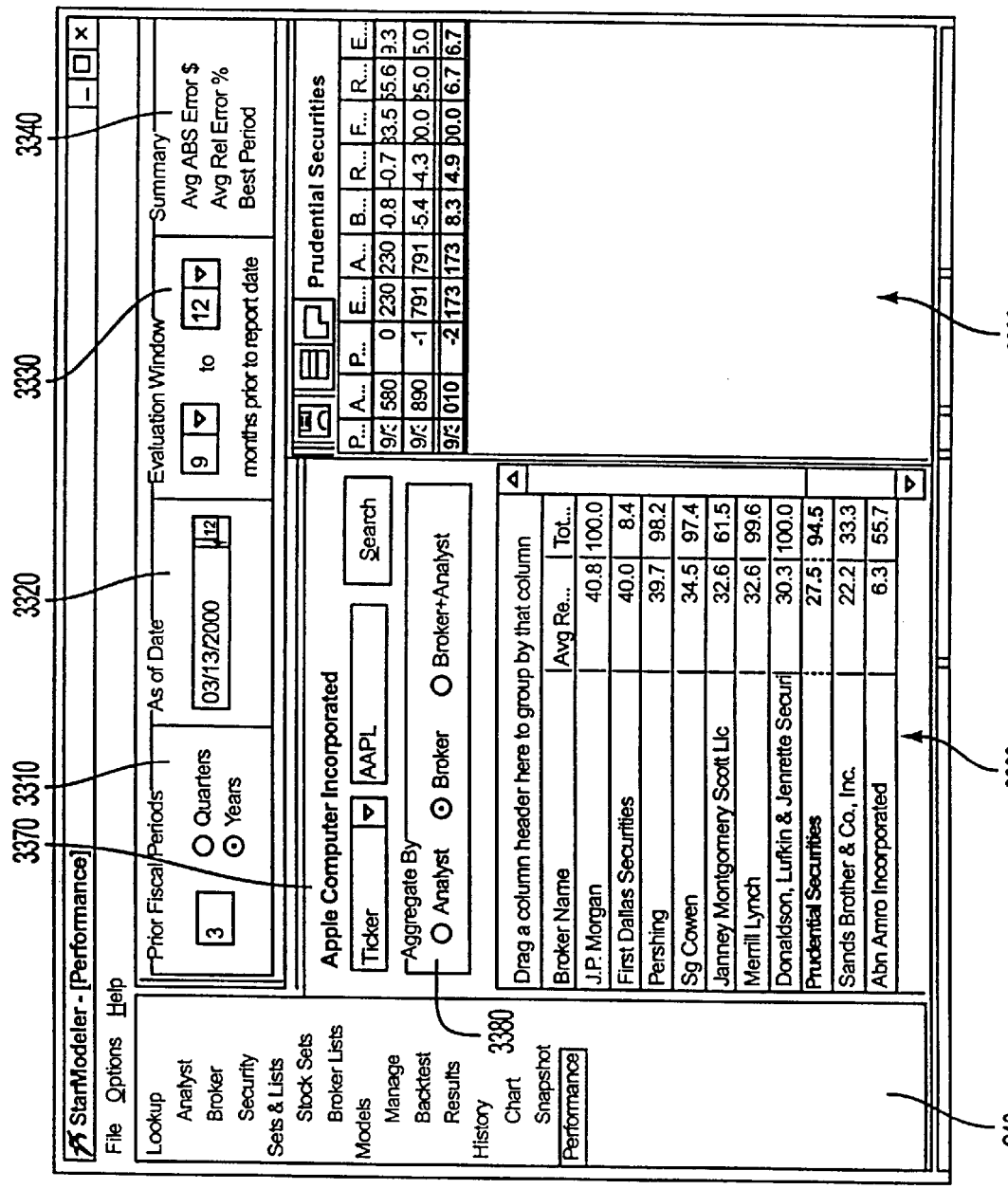
FIG. 25 illustrate an example of a Performance module aggregated by Broker according to an embodiment of the present invention.
Figure 26:
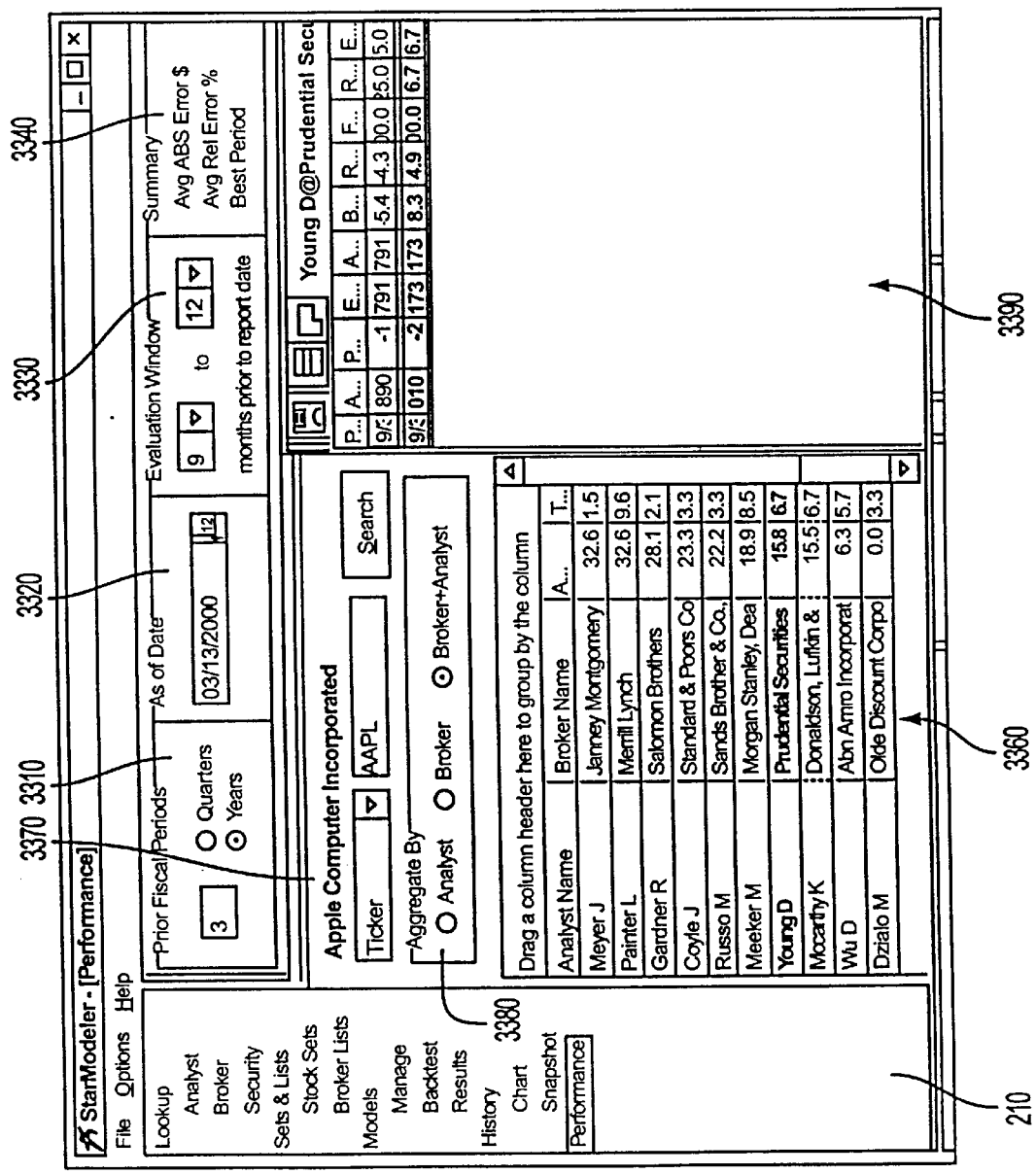
FIG. 26 illustrate an example of a Performance module aggregated by Broker and Analyst according to an embodiment of the present invention.

FIGS. 24–26 illustrate examples of performance screens and historical performance data where data related to the selected ticker or analyst may be aggregated by analyst (FIG. 24); broker (FIG. 25); or broker and analyst combination (FIG. 26). Other views are also available. By selecting the Performance module in Navigator 210, the user may view the performance of particular analysts, brokers, and other combinations. For example, the user may select a particular security (e.g., as shown AAPL) in Search area 3370. To provide great flexibility in the type and amount of data viewed, the user may select the number and type of fiscal periods to be analyzed as well as the type of fiscal periods, such as quarterly estimates or fiscal year estimates, in Periods area 3310. The user may select the "As Of Date" in Date area 3320. Other options may be applicable to other securities.

The number of prior fiscal periods enable a user to specify over how many periods the data should be viewed prior to the "As Of Date." For example, the user may set the numbers sufficiently high to enable a meaningful sampling of periods. However, the flexibility provided enables the user to review as many or as few periods as desired. The "As Of Date" enables the user to specify a cut-off period for an individual performance analysis.

Another useful feature that provides flexibility is the Evaluation Area 3330. A user may elect the time frame prior to the reporting dates over which to view data. In the example shown, the evaluation area goes from a beginning date selected by the user of 9 month to an end date selected by the user of 12 months. Therefore, in this case, estimates from 9 to 12 months prior to the report date will be analyzed. This enables a user to analyze performance by selected time bins to see if some analyst's are more accurate farther out or closer in to when estimates are reported.

The user may view summary data information in Summary area 3340. This information may include, for example, Average Absolute Error, Average Relative Error percentage, and other relevant summary information. A Summary Metric box (not shown) may enable a user to select summary metrics to be displayed (e.g., it may be set to Relative Error percentage).

Once the user has selected the number and type of fiscal quarters, the "As Of Date," a ticker and the aggregation method, various information may be displayed, preferably on a single screen. For example, as shown in FIG. 24, each analyst with estimates satisfying the criteria specified by the user for a given security are displayed in Aggregation Display 3360. In the performance view shown, out of the list of analysts displayed, a user may select one to obtain more detailed information in Aggregation Display 3360. For example, in FIG. 24, analyst "The Young D" is selected, as shown highlighted. As a result, the detailed data for "The Young D" is simultaneously displayed under a Data Screen 3390. Various fields and types of information displayed in association with the analyst's name may be user specified, such as Period End Date, Actual Reported Earnings/Share, Period Number, Error in Dollars, Absolute Error in Dollars, Bias Error Percentage, Relative Error Percentage, Analyst's follow percentage for the selected ticker, Relative Error Percentile, Error Percentile, and other information. As shown, the period end date, the number of previous periods, earnings information (e.g., actual) in various performance matrix.

In FIG. 25, the user may elect to aggregate by broker in Aggregate area 3380. A list of brokers for the selected ticker is displayed in Aggregation Display 3360. By selecting a broker, detailed data for that broker is displayed in Data Screen 3390. In FIG. 26, the user may elect to aggregate by broker and analyst pair in Aggregate area 3380. A list of broker and analyst pairs for the selected ticker is displayed in Aggregation Display 3360. By selecting a specific pair, detailed information for that pair is displayed in Data Screen 3390.

Some of advantages of the features discussed above are that it enables a user to view performance data over one or a number of periods. When viewing performance over a number of periods, the user may view aggregate metrics over those periods and/or metrics on each period individually. Thus, if a user desires to view for one stock the multiple contributors, the user can select the stock and see each contributor (analyst, broker or analyst/broker pair) who has estimated earnings for this stock in the selected fiscal periods (e.g., the last 3 fiscal years). Alongside each contributor is summary or aggregate performance measures. If the user clicks on one of the contributors for selected stock, the graphical user interface displays the contributor's period by period performance for that stock for each of the periods in the designated set of periods.

When displaying a list of contributors who have published estimates for a stock over the given time period and time frame (e.g., contributors who have made at least one estimate in the last 3 fiscal years), it is often convenient to limit display to only those analyst who have current estimates. The option to toggle between showing all contributors with an estimate and only those with the current estimate may be provided. If, on the other hand, the user desires to analyze a particular contributor's performance over each of the securities followed by that contributor, the system provides the flexibility to do this as well.

For example, in FIG. 26, for the selected contributor/stock pair, the information pertaining to Mr. Young's performance for AAPL while at Prudential Securities can be shown in Data Screen 3390.

Figure 27:
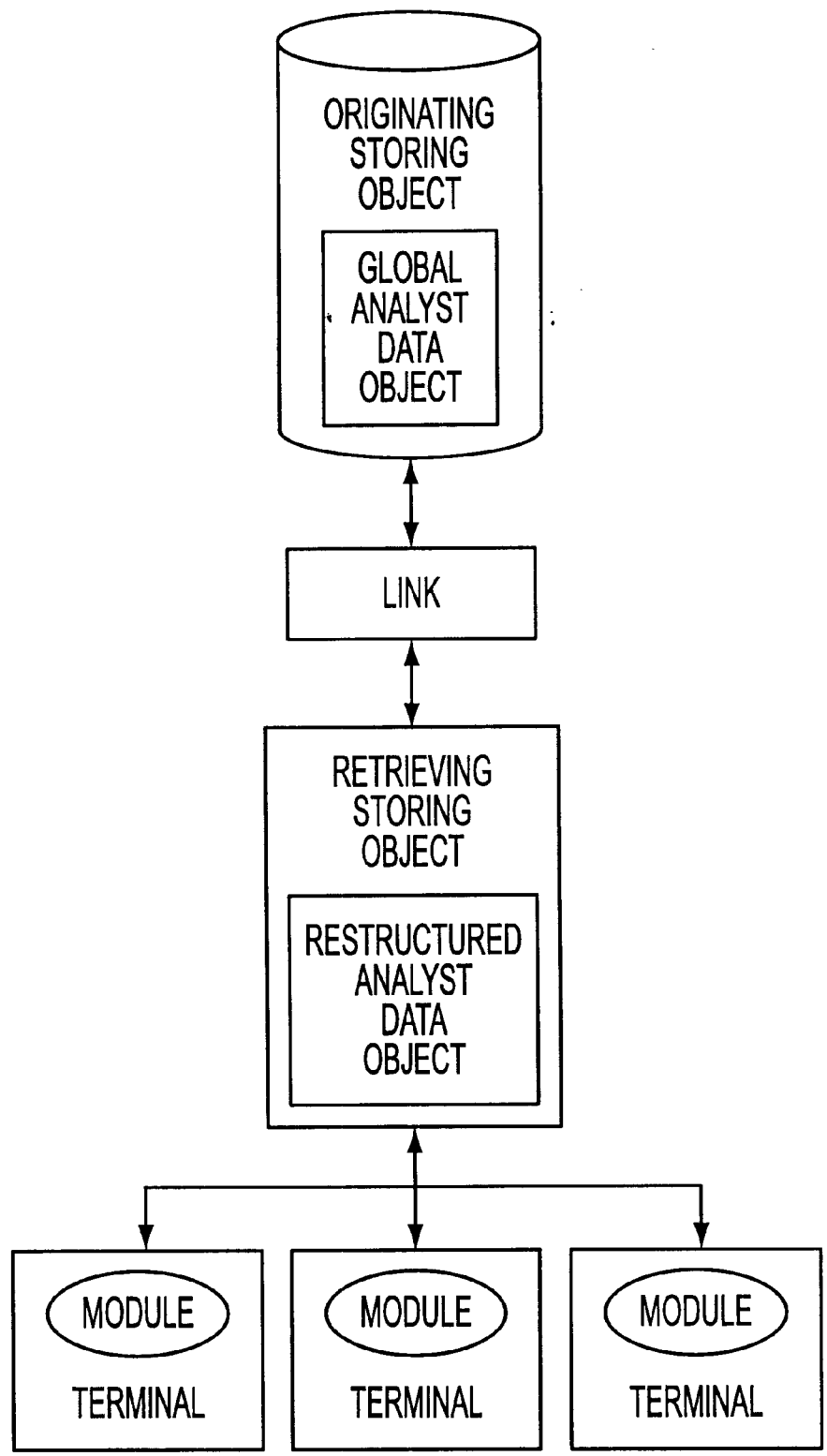
FIG. 27 illustrates a block diagram of a security analyst performance and tracking analysis system in accordance with the present invention.

Various architectural and system implementations of the invention can be used. For example, FIG. 27 is a block diagram illustrating a security analyst performance tracking and analysis system according to one preferred embodiment. In addition, FIG. 27 shows, in a broad sense, the data flow occurring within said system during a typical query for an analyst estimate comparison according to one embodiment.

On an interim basis, which can occur either daily, monthly, or at any other period, a Global Analyst Data Object, containing historical data on analyst estimates, may be transferred or otherwise downloaded, through a telecommunications link or similar method or device, from an Originating Storing Object, such as a commercial database maintained by any one of a number of financial information service providers (FISP) such as IBES, Inc. (IBES) or Fist Call Corporation (First Call), to a Retrieving Storing Object, which will preferably, but not necessarily, take the form of a network server in a computer network such as, for example, a local area network.

The Global Analyst Data Object downloaded from the Originating Storing Object is typically comprised of numerous files and fields relating to historical data relevant to analyst earnings estimates and recommendations. An example of such a historical database is that maintained by financial information services provider IBES. IBES's database, known as the Daily Detail Earnings Estimate History, contains more than ten years of analyst estimate forecasts, compiled from data obtained from more than 200 brokerage houses and more than 2000 individual analysts, for United States companies. These files and fields contain both general and specific information on analyst estimates and related data including, but not limited to, information pertaining to financial instrument type and related identification codes, broker and analyst identification, industry groupings, and detailed information on such variables as the prices of particular securities on specific dates. Importantly, it should be noted that a Global Analyst Data Object may be used which contains analyst data pertaining not only to stocks publicly traded in the United States, but also international stocks and any other type of financial instrument currently in existence or created in the future.

Either during or after the downloading of the Global Analyst Data Object, the database files are manipulated and otherwise processed such that they are restructured according to predetermined data fields, thereby creating a Restructured Analyst Data Object. In this way, each analyst earnings estimate and recommendation is restructured to have a number of predetermined data fields.

As indicated above, the data comprising the Restructured Analyst Data Object will preferably reside on a server in a computer network. Using a computer terminal or other similar input device, a user will be able to access and utilize the application Module comprising the software for the present invention. This Module may or may not reside on the computer terminal operated by the user.

Various architectural and system configurations may be used. Various database techniques may also be used. For example, a predetermined system database may be constructed such that each analyst estimate record in the database contains unique fields related to that estimate. In general, these records may contain a combination of data fields present within a Global Analyst Data Object obtained from the FISP and data fields unique to and created within the system of the present invention. Typically, the fields in this restructured database may include an analyst identifier; an event identifier corresponding to a specific security; an event type and date (e.g., Apple, FY-1995 or Intel, Q2-1997); an estimate date; a raw error indicator which corresponds to an analyst's estimate minus the actual earnings for a particular event; other metrics such as the percent error from an analyst's estimate to either the actual earnings or the consensus error; or other error metrics defined by a user.

The typical system database record may maintain the number of days by which an analyst's earnings estimate precedes a particular earnings event, such as a company's quarterly or annual earnings postings. The accuracy of an estimate made shortly before an earnings event is likely to be more accurate than an earnings estimate made months prior to the earnings event. In this way, users may make meaningful and valuable comparisons between analyst estimates for any number of given time periods preceding a particular earnings event.

Importantly, in addition to the predetermined data fields discussed above, the database of the present invention may also contain and maintain indices for predetermined data relationships and predetermined analyst performance metrics for a plurality of analysts, such as time series estimates and summary measures of those estimates. Accordingly, by utilizing this restructured database, a user will be able to both rank and analyze the performance of a plurality of analysts based upon any metric. Moreover, based on the data contained in the system database, the present invention allows for the rapid visualization of the analyses of analysts' earnings estimates and buy-sell recommendations.

Figure 28:
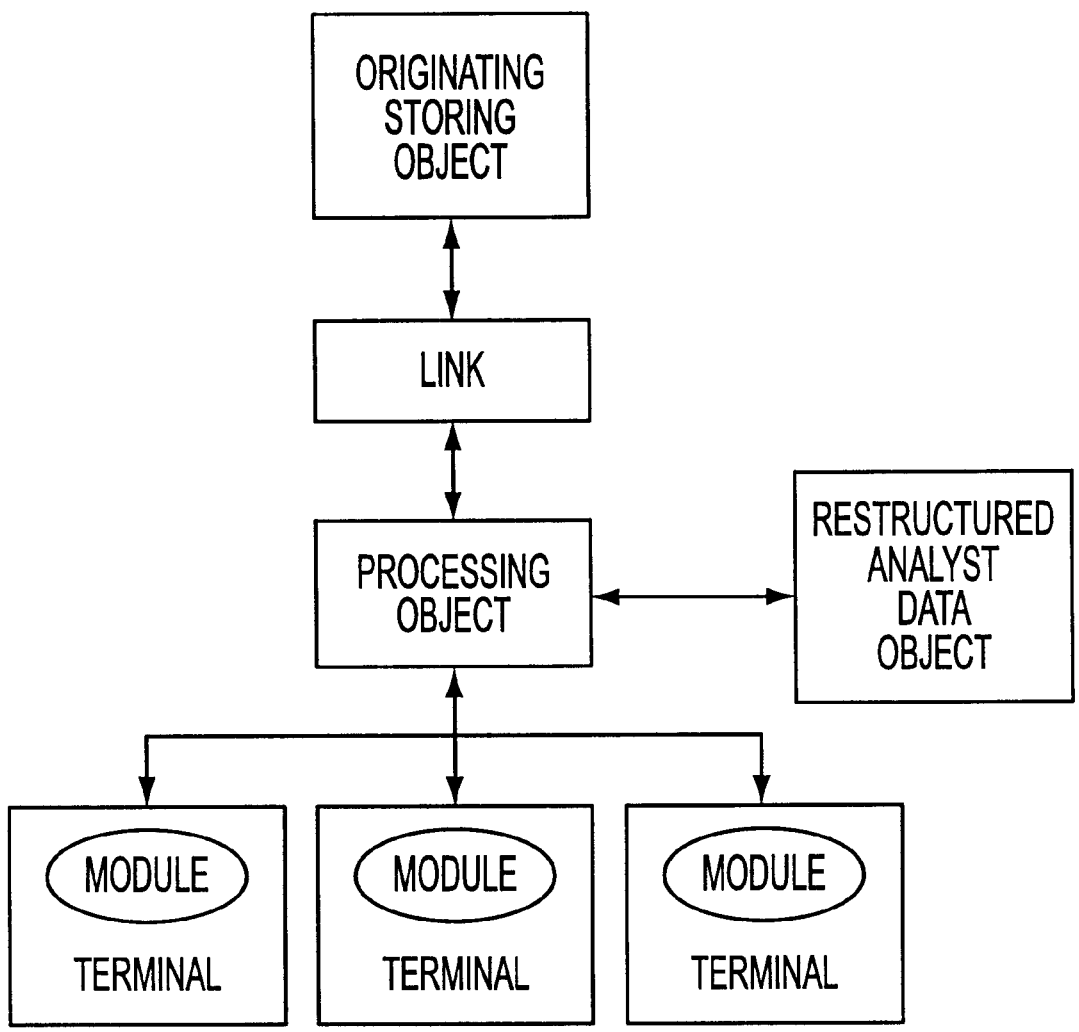
FIGS. 28–30 illustrate system architectures according to various embodiments of the present invention.
Figure 29:
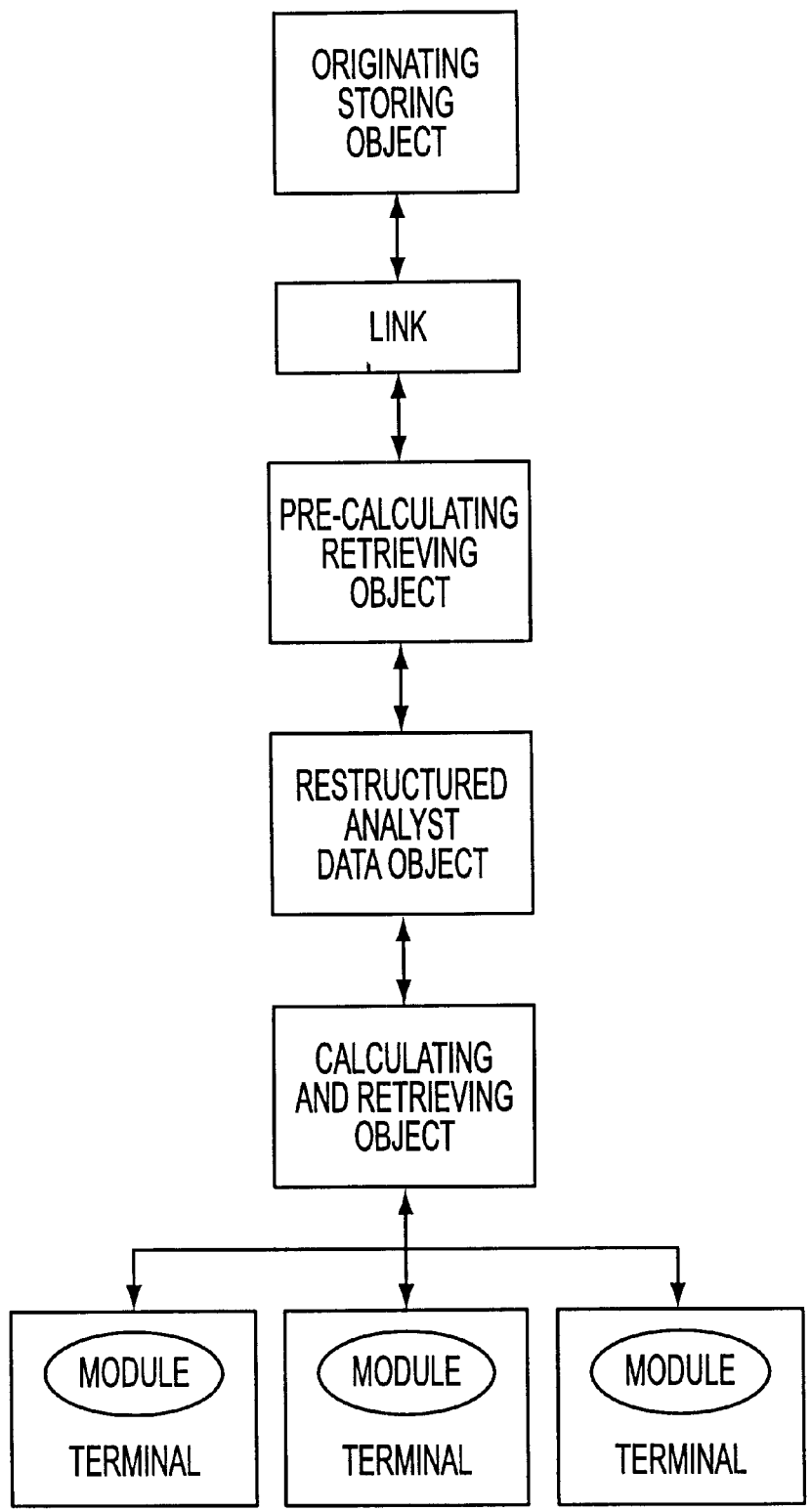
Figure 30:
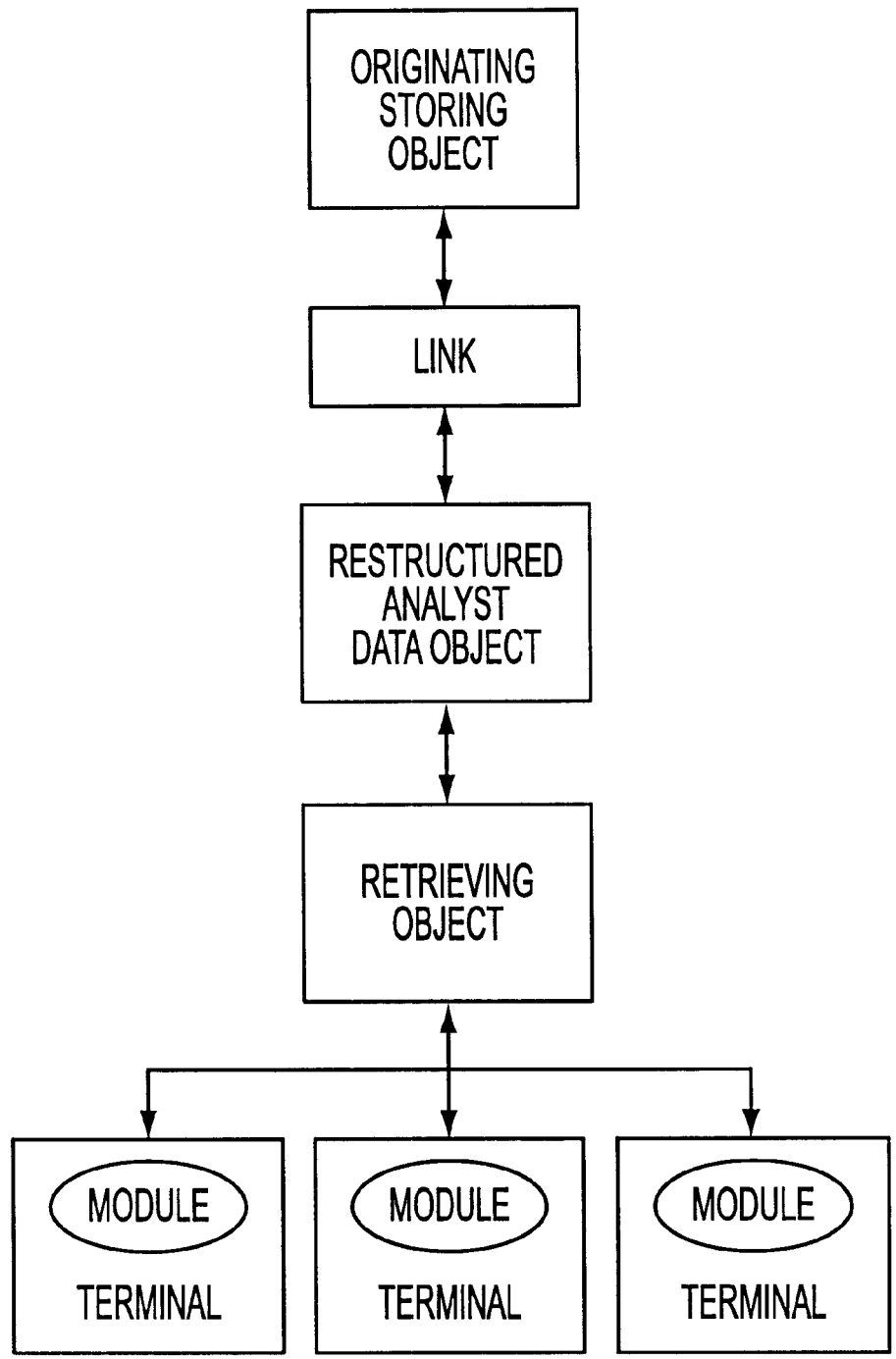

In one embodiment, the architecture of the present invention may comprise various structures consistent with the present invention. Various structures, as depicted in FIGS. 28–30 may be provided. These systems may comprise tiers such as in an Internet based networking environment. The tiers may comprise a Presentation Layer, depicted in FIGS. 28–30 as a plurality of terminals. This tier may be operatively connected to a second tier known as the Application Layer, depicted as the Retrieving Object. Additionally, the Application Layer is preferably operatively connected to a third tier, or Data Layer, which is depicted as the Restructured Analyst Data Object. Other tiers may also be provided as depicted in the Figures.

In one embodiment, historical data accessed from the Originating Storing Object is stored on the Restructured Analyst Data Object in addition to pre-calculated analyst-performance metrics derived from the Originating Storing Object. Because the data acquired directly from the Originating Storing Object may be proprietary of the data provider, the Retrieving Object preferably selectively delivers proprietary data only to those terminals having a license for the proprietary Originating Storing Object data. Also, the Retrieving Object preferably delivers only the pre-calculated analyst performance metrics derived from the Originating Storing Object to those terminals not having a license for the proprietary data. Using such a terminal and application module, a user may access and query the Restructured Analyst Data Object to perform any one of the numerous functions able to be performed by the present invention.

The pre-calculated data may comprise error metrics for securities predictions for earnings estimates and recommendations. In a preferred embodiment, the rows of the database are grouped into contributors, including analysts, brokers, and combinations thereof, and further divided into a predetermined number of time segments. A possible composition for the number of time segments. Each row comprises multiple error metrics calculated over a range of time periods. Error metrics may comprise various metrics including a raw error indicator (analyst estimate minus the actual earnings for a particular event), error percent to actual earnings, percent available (percent of time that an analyst had an estimate or recommendation available in the relevant time frame), error percent to consensus, and the number of days between the estimate of an event and the actual event, for example. Average error metrics may also be stored. Table 1 below provides one embodiment of average error metrics that may be maintained as well as other metrics that may be stored.

TABLE 1

| | Event | 0–3 | 3–6 | 6–12 | 0–12 | 0–24 | Not pre-calculated (Calculated on-the-fly) | Comparable(across stocks, time periods) |
|---|---|---|---|---|---|---|---|---|
| Avg-Error $ | | X | X | X | X | X | | |
| Avg-Abs Err $ | | X | X | X | X | X | | |
| Avg-Abs Err %ile | | X | X | X | X | X | | X |
| Avg-Error % | | X | X | X | X | X | X | |
| Avg-Abs Err % | | X | X | X | X | X | X | |
| Avg-Rel Error % | | X | X | X | X | X | | X |
| Avg-Bias Error % | | X | X | X | X | X | | X |
| Actual-Divisor (for % calcs) | X | | | | | | | |
| Swings | | | | | | | X | X |
| Hit % | | | | | | | X | X |
| Total Estimates | | | | | | | X | |
| Follow % | | X | X | X | X | X | | X |
| LeadLagScore | | | | | | | X | X |
| MTBR | | | | | | X | | X |
| Best Date | | | | | | | X | |
| Best Error (Rel Err %) | | | | | | | X | |
| Year first followed | X | | | | | | | |

The calculations to derive these error metrics are provided in Table 2. Example ranges, analysis of these values and characteristics are provided although other ranges, analysis and characteristics may also be provided.

TABLE 2

| | Formula | Range | Analyzing | Characteristic |
|---|---|---|---|---|
| Error $ | $$\frac{\sum_{t1}^{t2}(Est_T - Act_{Event})}{(\# \text{ Samples}) * PctAvail}$$ | Any | Closer to 0 is better | Error in dollars and cents |
| Abs Error $ | $$\frac{\sum_{t1}^{t2}|(Est_T - Act_{Event})|}{(\# \text{ Samples}) * PctAvail}$$ | 0 to Any | Closer to 0 is better. | Absolute Value of Error in $ and cents. When average is taken over interval, negative and positive errors do not cancel out preserves magnitude of error but not sign. |
| Rel Error Pct | $$\frac{\sum(|Est_T - Act_{Event}| - |Con_T - Act_{Event}|)}{(\# \text{ Samples}) * PctAvail * Divisor}$$ | Any | Larger negative Numbers are better | Error Compared to the Consensus Error |
| Bias Error Percent | If analyst's estimate is further from the actual than the consensus estimate is, then Biaserror = Relative Error % Else Biaserror = 0 Average Bias Error % For period t1 . . . t2 = $$\frac{\sum_{t1}^{t2} BiasError}{(\# \text{ Samples}) * PctAvail}$$ | Any. Usually a low number | Closer to 0 is better. | Relative Error % only if the Analyst is further from the actual than the consensus. |

Additionally, other metrics including leadlag factor, swings, hits, hit percent, and mean time between revisions may be included as metrics. Table 3 below described these metrics, how they are calculated, analysis for these metrics, and a range for these metrics.

TABLE 3

| | Formula | Analysis | Range |
|---|---|---|---|
| Leadlag Factor | $$\frac{(Leads - Lags)}{TotalEsts}$$ | Closer to 1 is better 1 = Always Leads, −1 Always Lags | −1.0 to +1.0 |
| Swings (i.e., number of times in period that analyst "stuck neck out" more than [SwingStdDevs = 1.5] standard deviations away from the consensus as measured [n = 5] days after estimate date T.) | A Swing is defined as an estimate that satisfies this equation $$\frac{|Est_T - Cons_{T+N}|}{StdDev_{T+N}} > SwingStdDevs$$ Defaults SwingStdDevs = 1.5 and N = 5 | Many swings indicate that analyst is willing to express an opinion independent from the pack. (It does not indicate quality.) A low number of swings may indicate an analyst that follows the pack. | Positive Integer, Or 0. |
| Hits | A Hit is a Swing that is closer to the actual than the consensus. If $|Est_t - Act| < |Cons_{t+N} - Act|$ Then Hit Else Miss | — | Positive Integer or 0 |
| Hit Percent | $$\frac{Hits}{Swings} \times 100\%$$ | 100% indicates all Hits 0% indicates all misses NA indicates no Swings | 0–100% |
| MTBR - Mean Time Between Revisions | $$\frac{TotalDaysActive}{TotalEstimates}$$ | Average in our current database is 89.1 days | 0–365 days |

These metrics are understood as follows:

Error $—The difference between $Est_t$ and the Actual. Expressed in dollars.

Abs Err $—The absolute value of Error $ at a point in time.

Bias Error Percentage—If Consensus>Actual, then Bias Error equals Relative Error %, else it is 0. If Consensus<Actual, then Bias Error equals Relative Error %, else it is 0.

Actual-Divisor (Applies to Err %, ABS(Err %), and RelErr %)—To facilitate cross-stock and cross-period comparison of error, we provide metrics that normalize estimates & error by the size of the actual earnings. Of course, for small actual values, errors become exaggerated. To avoid this, we limit the divisor to be no less than 0.40 cents for fiscal year events and no less than 0.10 for fiscal quarter events. Relative Error Percentage—The difference between the analysts error and the consensus error, divided by the Actual-Divisor.

Swings—Often, major revisions (N Std Dev away from consensus) occur simultaneously for multiple analysts. For example, this may be the case when a company reports a large earning surprise or issues a warning about upcoming growth. "Swings," which are bold estimates that differ greatly from the consensus, are differentiated from major revisions that occur concurrently with, or near to, major revisions from other analysts. To achieve this, the system may measure whether an analyst estimate or revision is N standard deviations away from the consensus N (typically 5) days after the day the analyst's estimate was made. Swings may be measured over the 24 months prior to the report date. Unlike other error metrics which are calculated by sampling (continued) estimates over an interval and computing the corresponding average Best Date—The day in which the analyst's error (RelErr %) was lowest in the 24 month prior to the report date for that event.

Best Error—The value of the analyst's lowest RelErr % at the corresponding Best Date.

Further, a lead lag score may be provided. In calculating the lead lag score, Table 4 represents calculations with the following understanding: Co represents the consensus on the day of the estimate in question, $C_1$ represents the consensus on the n-th day prior to the day of the estimate in question, and $C_2$ represents the consensus on the n-th day following the day of the estimate in question. These conditions are considered in this order to determine if an estimate is leading, lagging, or neither:

TABLE 4

| # | Condition | Formula | Picture | Classified as |
|---|---|---|---|---|
| 1 | Change in consensus, from n days prior to n days flowing estimate, must be at least Min %, (default = 5%). Else "neither" | $\frac{|c_2 - c_1|}{\text{MAX}(\text{FudgeFctr}, |c_1|)} > \text{Min \%}$ | | Else Neither |
| 2 | Consensus change prior to the estimate must not be different in direction from change after the estimate. | (C2 > C1) AND (C2 >= C0) OR (C2 < C1) AND (C2 <= C0) | | Else Neither |
| 3 | Number of Estimates/Revs Between [t − n to t + n] minus [# estimates at t] >= 2 | $\sum_{t-n}^{t+n} \text{Est} - \text{EstCount}_{t0} \geq 2$ | | Else Neither |
| 4 | If the Number of Estimates prior to the Estimate Date in the time frame are greater than the number of estimates after the report date in the time frame. Then this estimate is a lagging estimate | $\sum_{t+1}^{t+n} \text{Est} > \sum_{t-n}^{t-1} \text{Est}$ | | Lagging |
| 5 | If the Number of Estimates prior to the Estimate Date in the time frame are less than the number of estimates after the report date in the time frame. Then this estimate is a Leading estimate | $\sum_{t+1}^{t+n} \text{Est} < \sum_{t-n}^{t-1} \text{Est}$ | | Leading |
| 6 | If the Number of Estimates prior to the Estimate Date in the time frame are equal to the number of estimates after the report date in the time frame. Then this estimate is neither a leading nor lagging estimate. | $\sum_{t+1}^{t+n} \text{Est} = \sum_{t-n}^{t-1} \text{Est}$ | | Neither | error, Swings may be determined by considering only the actual estimates or revisions. The default number of Std Dev is 1.5.

Hit Percent—A hit is a swing that proves to be closer to the actual than the consensus at N days after the date of the swing.

Total Estimates—The total number of estimates made by the analyst in the prior 24 months for the event. Confirmations are not included. An estimate pre-existing exactly 24 months prior to the report are counted in the total.

Follow Percent—In each time frame (0 to 3, 3 to 6, 6 to 12, 0 to 12, 0 to 24 months) we calculate the total availability of the analysts estimates during that time. Follow Pct equals the days the analyst estimate was available in the timeframe divided by the total number of days in the timeframe.

MTBR—Mean Time between Revisions—Measures frequency of analyst revision in the year prior to the report date. Equals the number of days in which there was an active estimate in the year prior to the report date divided by the Total Estimates.

For each analyst, each new estimate or revision made within 24 months of a report date for a fiscal period is classified either as Leading, Lagging or Neither according to the logic above. The LeadLagFactor is the number of Leading estimates minus the number of Lagging over the total estimates. If all estimates were lagging, the LeadLagFactor may be assigned a value of −1.0. If all estimates were leading, the LeadLagFactor may be assigned a value of +1.0. If all estimates were "neither" or if the number of Leading Estimates equals the number of Lagging estimates, the LeadLagFactor may be assigned a value of 0.0. Estimates already current at 24 months prior to the report date may not be included.

$$LeadLagScore = \frac{\text{Leads} - \text{Lags}}{TotalEstimatesForAnalyst}$$

Figure 31:
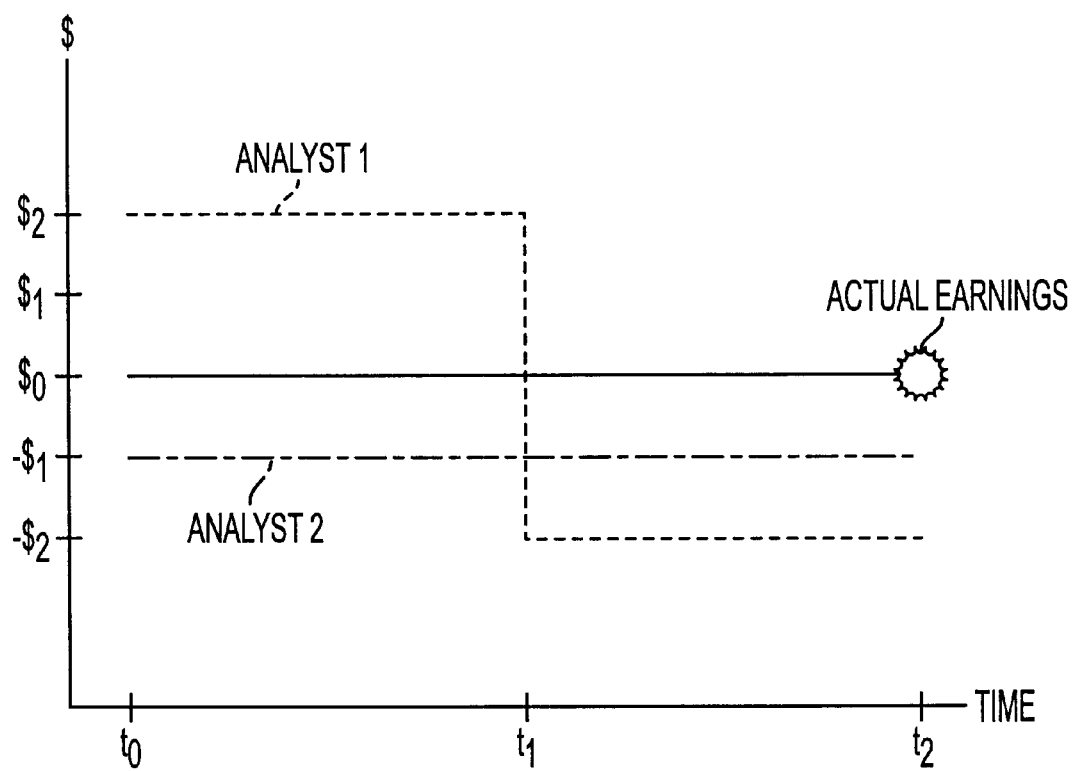
FIGS. 31–33 illustrate graphs of comparative performance by two analysts with an actual outcome according to an embodiment of the present invention.
Figure 32:
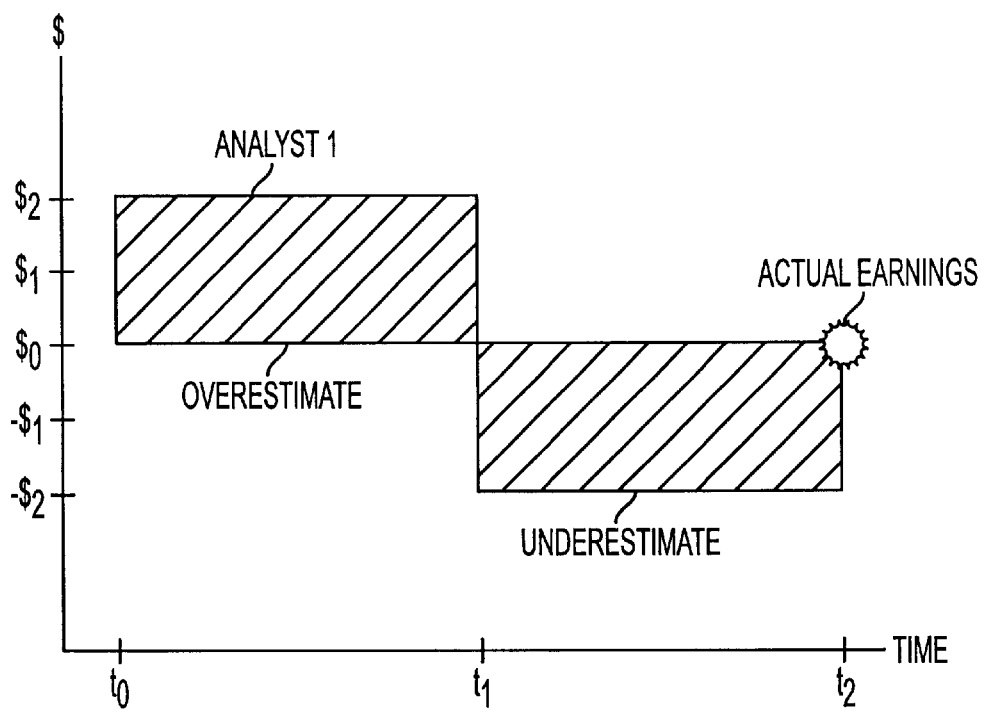
Figure 33:
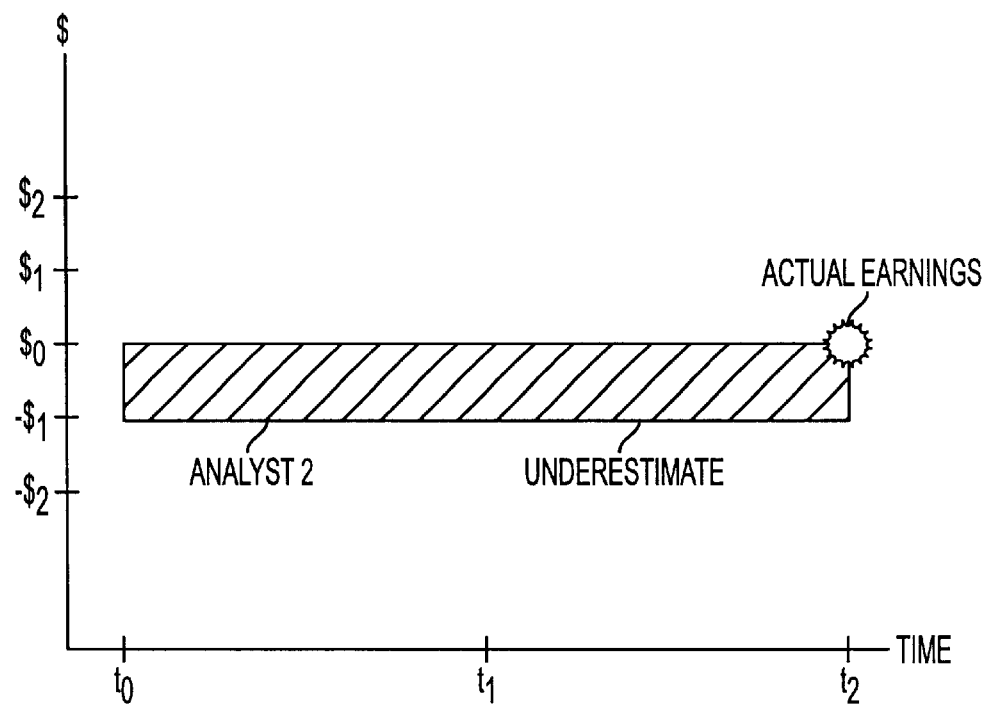

FIGS. 31–33 depict an example of one purpose between the two different types of error calculation. In FIG. 31, two analysts have made predictions concerning the earnings of a particular security. Their predictions, in dollars, are shown on the y-axis where $\$_0$ is the actual earnings, whereas the time at which the analysts made their predictions is shown along the x-axis. The difference between each of the depicted adjacent markings on the y-axis is equal to $, and the difference between each of the depicted x-axis markings is equal to T. The first analyst initially ($t_0$) predicted above the actual earnings by $\$_2$, and at time $t_1$ modified the prediction to an estimate below ($-\$_2$) the actual earning. The second analyst predicted earnings slightly below the actual earnings for the entire period shown.

Turning to FIG. 32, which highlights the error associated with the first analyst's predictions, it is shown that the first analyst has an average error equal to zero because the extent of the overestimate is approximately equal to the extent of the underestimate. This raw error metric is preferably calculated as follows:

$$\sum_{t0}^{m} (\text{Estimate} - \text{Actual})$$

By substituting the values shown in FIG. 32, the overestimate is found to be $(\$_2-\$_0)*(t_1-t_0)$ or 2$T and the underestimate is found to be $(-\$_2-\$_0)*(t_2-t_1)$ or $-2\$T$. Accordingly, the first analyst would receive a raw error of 0 and would accordingly be given no adjustment factor. In determining the weighting factor, however, the following equation which represents the absolute error metric, is preferably used:

$$\sum_{t0}^{m} |(\text{Estimate} - \text{Actual})|$$

Again substituting the values for the first analyst, an absolute error of 4$T is found. Applying the same analysis to the second analyst leads to a raw error of $-2\$T$ which could in turn be used to calculate an adjustment factor. Similarly, because the second analyst consistently underestimated the actual earnings, the second analyst would have an absolute error of $-2\$T$. Because the absolute error of the second analyst is half as great as the absolute error of the first analyst, the second analyst is preferably assigned a weighting factor greater than the weighting factor of the first analyst.

Because analysts start making predictions on a given security at different times, it is possible that a particular analyst will not have made predictions about a particular security for the entire duration over which an error analysis is being performed. In a preferred embodiment, it is possible to make proportional adjustments to various error analysis based on the percentage of time that a given analyst has been tracking a security.

Similarly, because analysts start making predictions on earnings at different times, it is similarly possible that certain analysts will not have made earnings estimates at a time when an unanticipated event lead to a significant error. In a preferred embodiment, the effect of such unanticipated events can be filtered by comparing the analysts predictions to a consensus estimate. Such a comparison is termed a relative error metric. The following equation provides an example of a relative error metric:

$$\sum_{t0}^{m} \frac{(|\text{Estimate} - \text{Actual}| - |\text{Consensus} - \text{Actual}|)}{\text{Actual}}$$

The relative error metric shows how a particular analyst performed in relation to the other analysts who were tracking a particular security over the analyzed period of time. The purpose of utilizing the actual earnings in the denominator of a preferred embodiment is to enable errors to be normalized so that comparisons can be made across different securities. Because small actual earnings can lead to exaggerated errors, it is possible to establish a minimum actual value, for purposes of this error metric, to prevent such exaggerated errors. For example, if the actual earnings were 0, then any analyst tracking the security would have an infinite error, so a value of, for example, $0.40 could be used to provide useful information from the analysis.

In another embodiment of the invention, a user may rank, measure, and analyze the historical accuracy of a single or plurality of analysts' buy-sell recommendations in various ways. As an initial matter, a user may control and otherwise define how recommendation descriptions used by a plurality of analysts are normalized and otherwise translated into scaled recommendation numbers.

Specifically, depending on the employer of an individual analyst, said analyst, when either upgrading or downgrading a particular security, will use varying descriptions to make his recommendation. For example, analysts at an investment firm may issue recommendations using the following descriptions, predetermined by the firm: strong buy, buy, neutral, source of funds, or sell. In contrast, analysts at a different investment firm may issue recommendations using the following descriptions, also predetermined by the firm: priority list, recommended list, trading buy, market outperform, market perform, and market underperform. FISPs such as First Call translate and otherwise normalize the recommendation descriptions of the numerous analysts to a scale ranging from 1 to 5, with the following descriptions: 1 (buy), 2 (buy/hold), 3 (hold), 4 (hold/sell), and 5 (sell). The FISPs then calculate an average recommendation by calculating the mean of all analysts' current recommendations as translated to this 1 to 5 scale.

In the present invention, relatively recent recommendation upgrades or downgrades may be assigned a relatively high weighting factor while older recommendations may receive a weight of zero. By using these factors, an improved custom composite recommendation may be determined which more accurately reflects the action (e.g., buy, sell, hold etc.) that a user should take with respect to a security. In addition, a user may control the recommendation normalization process, if so desired, to replace the normalization performed by an FISP.

Moreover, using either the FISP generated recommendation scale or user defined scale, a user will have the ability to measure the historical profitability of a single or plurality of analysts' recommendations. For example, a user may create a graph illustrating the average percent error of an analyst's recommendation as compared to the average recommendation.

Users will also have the ability to create and test portfolio creation rules. Specifically, a user may choose a security and then set up purchase and/or selling instructions that the system will make automatically. For example, a user can instruct the system to purchase a security when a specific analyst issues a recommendation of "2," double his investment if the recommendation is upgraded to "1," and sell all or a certain percentage of the security if and when the analyst downgrades his recommendation to "3" or lower.

Figure 34:
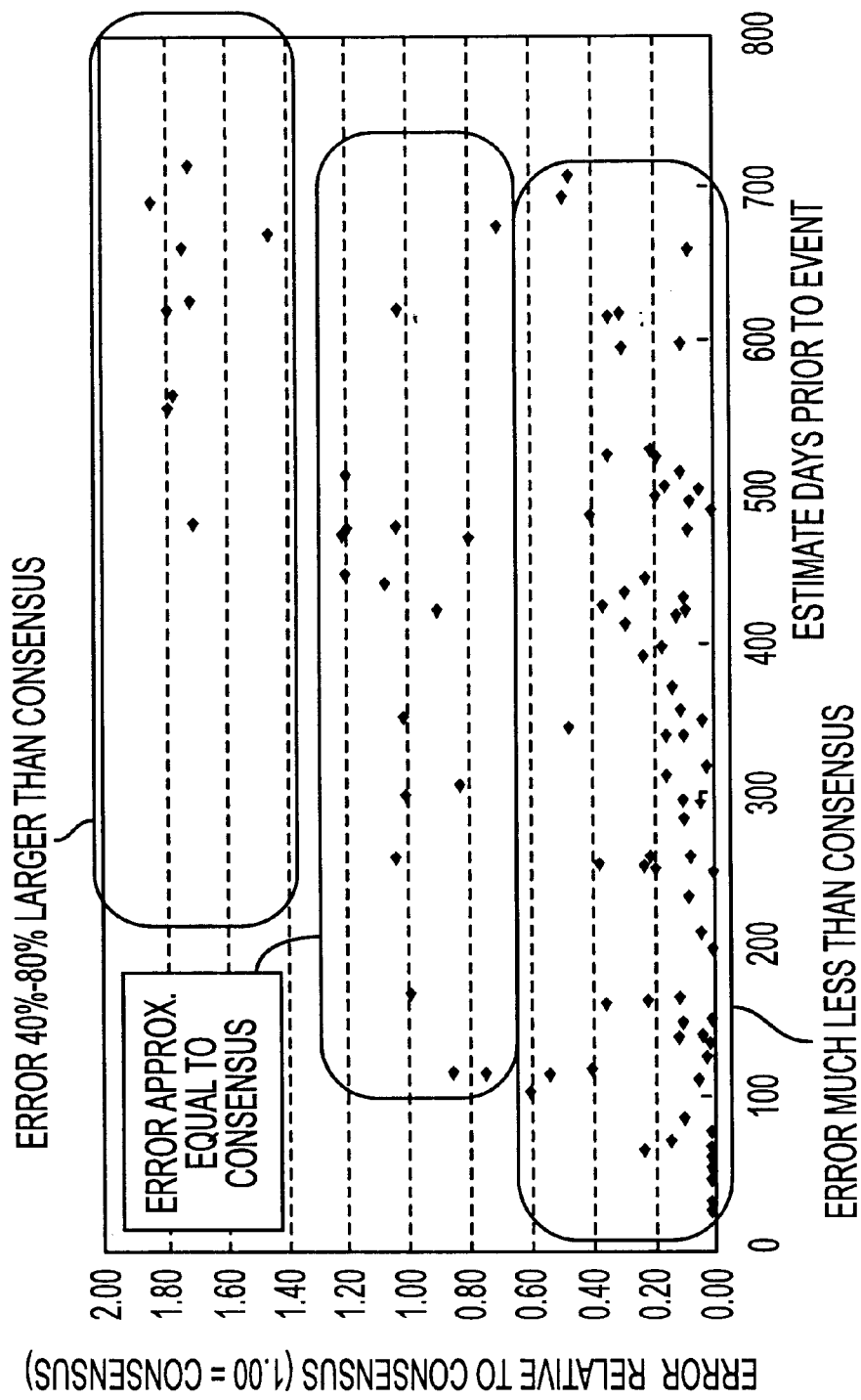
FIG. 34 illustrates a scatterplot graph according to an embodiment of the present invention.

FIG. 34 provides an example of a scatterplot graph created with the present invention. This scatterplot is generated using the following equation:

$$\sum_{t0}^{tn} BiasError$$

where bias error is equal to relative error if relative error is greater than the consensus error. If the relative error is less than the consensus error, then the bias error is assigned a value of zero over the selected time period. The consensus error is calculated the same as raw error is icalculated for an individual analyst, except that the consensus estimate is used instead of the analyst's estimate. The bias error is useful in determining how consistently a given analyst or group of analysts outperforms the consensus for a particular security.

Another option available in a preferred embodiment is the ability to exclude one or more analysts. For example, if a particular analyst had an extreme error during a period of analysis that a user is evaluating, then the consensus error might be too reflective of that individual analyst's error. Accordingly, a majority of analysts may have bias errors approximately equal to zero which indicates that they are outperforming the consensus estimate. If a user wants to filter out an analyst's estimate for this or any other reason, it is possible to exclude the analyst's estimate from a particular metric analysis.

In a preferred embodiment, there are additional metrics which may be used to evaluate how effectively an analyst acquires and reacts to information. One metric that serves to accomplish this task is the leadlag Factor. Preferably, the leadlag Factor is calculated as follows:

$$\frac{(Leads - Lags)}{TotalEstimates}$$

where leads is the number of times that an analyst makes an estimate revision before the majority of the analysts following a particular security, lags is the number of times that an analyst makes an estimate revision after the majority of the analysts following a particular security, and total estimates represents the number of predictions that the analyst has made. In a preferred embodiment, a user may select a leadlag factor based on a number of different variables, including which securities, which analysts, which time periods, or any combination thereof.

Another metric that is useful in predicting how an analyst acquires and reacts to information is the hit percent. A hit percent is an evaluation of the number of times that an analyst successfully revises earnings. In a preferred embodiment, a swing is preferably an estimate that is outside a predetermined standard deviation of the mean of the consensus estimate. In a most preferred embodiment, a predetermined standard deviation of the consensus estimate is approximately 1.5. A hit is preferably a swing in which the analyst's estimate is closer to the actual earnings than the consensus estimate. A hit percent can then be determined by dividing the number of hits by the number of swings, and multiplying the result by 100%.

As discussed above, the system may provide the user with the option of viewing a large amount of information in a variety of different formats.

Other embodiments and uses of the invention will be apparent to those skilled in the art from consideration of the specification and practice of the invention disclosed herein. Accordingly, the specification and examples set forth above should be considered exemplary only. The scope of the invention is only limited by the claims appended hereto.

What is claimed is:

1. A graphical user interface for use with a computer-implemented system for creating a model to generate an enhanced composite prediction relating to a security based on current predictions provided by a plurality of contributors and rules or exclusion factors, wherein at least one of the rules or exclusion factors relates to historical information relating to a contributor, wherein the model comprises user-defined rules that are applied to some or all of the contributors' predictions to create the enhanced composite prediction, the graphical user interface comprising:

means for enabling a user to specify rules or exclusion factors by which to exclude one or more contributors' predictions;

means for enabling a user to specify rules or factors by which to assign a weight to each non-excluded contributor's prediction, where such weights are used to generate a weighted average of the predictions to produce the enhanced composite prediction; and a computer-implemented graphical display for displaying the user-defined rules or factors used to generate the enhanced composite prediction.

2. The graphical user interface of claim 1 wherein the predictions comprise security analysts' earnings estimates, and the exclusion factors include an exclusion for estimates older than a user specified period or an exclusion for estimates older than a user-specified amount of time before or after a company's last earnings report date.

3. The graphical user interface of claim 1 wherein the exclusion factors include an exclusion for predictions more than a user-specified number of standard deviations away from a mean.

4. The graphical user interface of claim 1 wherein the exclusion factors include a user-selectable option to exclude predictions that are older than a date of a beginning date of a last-detected cluster of prediction revisions.

5. The graphical user interface of claim 4 wherein the definition of a cluster is user definable.

6. The graphical user interface of claim 5 further comprising means for the user to specify a time parameter for determining whether predictions are to be considered part of the same cluster or cluster candidate.

7. The graphical user interface of claim 6, further comprising means for enabling the user to specify a time period between a date of at least one prediction, and a date of at least a second prediction, in order for the predictions to be considered part of the same cluster or cluster candidate.

8. The gphical user interface of claim 5 further comprising means for enabling the user to specify the parameters to qualify a cluster candidate as a cluster.

9. The graphical user interface of claim 8 wherein the parameters enable a user to specify restrictive, qualifying criteria on prediction revisions, including one or more of the condition that only revisions in the same direction can be considered part of the same cluster, or the condition that only revisions of at least a user-specified magnitude can be considered part of the same cluster.

10. The graphical user interface of claim 5 further comprising means for enabling a user to specify the minimum number of new predictions or qualifying prediction revisions that are required to define a cluster.

11. The graphical user interface of claim 10 comprising a means for allowing the number of new predictions or qualifying prediction revisions to be either a fixed number or a variable number depending on the number of contributors with active predictions as of the day for which the enhanced composite prediction is being calculated.

12. The graphical user interface of claim 9 wherein the variable number may be specified as a percentage of current contributors or by any means of mapping a number of current contributors to a required number of new predictions or qualifying revisions.

13. The graphical user interface of claim 1 further comprising means for enabling a user to specify adjustments to be made to one or more non-excluded predictions, where the adjustments are based on one or more factors.

14. The graphical user interface of claim 13, wherein the factors are based on one or more of historical contributor bias, historical aggregate contributor bias as a function of time prior to period report date, contributor's firm's relationship with a security's issuer, or a security's historical performance relative to consensus estimates.

15. The graphical user interface of claim 1, wherein the rules for assigning weights to each non-excluded contributor's prediction is determined by one or more user-defined weighting factors.

16. The graphical user interface of claim 15, wherein each contributor receives an N-score for each weighting factor to provide the ability to meaningfully combine scores on factors that have different intrinsic units.

17. The graphical user interface of claim 15, wherein each weighting factor can be assigned a user-defined weight.

18. The graphical user interface of claim 17 wherein the weighting factors include one or more of accuracy and age of estimates.

19. The graphical user interface of claim 17 wherein a set of weights is used to combine the N-scores of each factor into the final weight for each contributor.

20. The graphical user interface of claim 15, wherein the factors comprise one or more of an accuracy metric, status metric, a broker list, contributor experience, and estimate age.

21. The graphical user interface of claim 20 wherein the status metric comprises an all-star list.

22. The graphical user interface of claim 21 further comprising means for enabling a user to specify a cutoff.

23. The graphical user interface of claim 20 wherein the broker list comprises a list of brokers by group, where each group is assigned a different factor score and the weighting factor is defined by the brokerage firm with which a contributor is associated.

24. The graphical user interface of claim 23 wherein a user can assign N-scores to each broker or group of brokers and store the set of N-scores in a broker list for use in other models.

25. The graphical user interface of claim 24 wherein a predetermined number of brokers receive a factor score of 1 and others get one or more other factor scores.

26. The graphical user interface of claim 24 further comprising means for displaying a list of brokers by group, and the contributors or number of contributors associated with the broker.

27. The graphical user interface of claim 20 wherein a contributor experience factor is user defined, the graphical user interface comprising means for enabling a user to specify a predetermined period type and a scoring system to define the experience factor.

28. The graphical user interface of claim 27 wherein the experience factor comprises the number of quarters or years for which the contributor had previously made predictions for a particular security.

29. The graphical user interface of claim 28 comprising means for enabling a user to specify a function that converts the number of periods of contributor coverage for a security into an N-score for the contributor experience factor for each contributor.

30. The graphical user interface of claim 27 wherein the scoring system comprises means for enabling a user to specify a first score for contributors having less than a first predetermined number of periods of experience with a given security and at least a second score for contributors having greater than a second number of periods of experience with the given security.

31. The graphical user interface of claim 15, wherein the user can define a weighting factor based on each contributor's status in a published survey.

32. The graphical user interface of claim 31, wherein the survey includes levels of status designation and wherein the user can assign an N-score to each level of status designation including non-inclusion.

33. The graphical user interface of claim 15, wherein one or more weighting factors are based on historical accuracy of contributor's predictions based on user-specified criteria.

34. The graphical user interface of claim 33 wherein the user-specified criteria includes the number and type of previous periods and the time prior to each prior period's report date over which to measure accuracy.

35. The graphical user interface of claim 34 comprising means for converting accuracy scores to N-scores according to user-specified criteria.

36. The graphical user interface of claim 15, further comprising means for enabling a user to assign an N-score, proportionally by an accuracy metric.

37. The graphical user interface of claim 15, further comprising means for enabling the user to create more than one type of accuracy-based weighting factor.

38. The graphical user interface of claim 15, further comprising an estimate age factor, the estimate age factor being user selectable to be constant or proportional.

* * * * *